(12) United States Patent
Meylan et al.

(10) Patent No.: US 10,116,578 B2
(45) Date of Patent: Oct. 30, 2018

(54) TECHNIQUES FOR OPTIMIZING WIRELESS WIDE AREA NETWORK-WIRELESS LOCAL AREA NETWORK AGGREGATION

(71) Applicant: QUALCOMM Incorporated, San Diego, CA (US)

(72) Inventors: Arnaud Meylan, San Diego, CA (US); Srinivas Reddy Mudireddy, San Diego, CA (US); Vaibhav Kumar, Encinitas, CA (US); Hariharan Sukumar, San Diego, CA (US); Alok Mitra, San Diego, CA (US); Umang Sureshbhai Patel, Santa Clara, CA (US); Sivaramakrishna Veerepalli, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 15/277,507

(22) Filed: Sep. 27, 2016

(65) Prior Publication Data

US 2017/0118133 A1 Apr. 27, 2017

Related U.S. Application Data

(60) Provisional application No. 62/337,698, filed on May 17, 2016, provisional application No. 62/245,203, filed on Oct. 22, 2015.

(51) Int. Cl.
*H04L 12/863* (2013.01)
*H04W 28/06* (2009.01)
(Continued)

(52) U.S. Cl.
CPC .......... *H04L 47/624* (2013.01); *H04W 28/06* (2013.01); *H04W 88/06* (2013.01); *H04W 88/10* (2013.01); *H04W 84/12* (2013.01)

(58) Field of Classification Search
None
See application file for complete search history.

(56) References Cited

U.S. PATENT DOCUMENTS 7,293,061 B2   11/2007   Dowling et al.
7,965,693 B2   6/2011    Jiang et al.
(Continued)

FOREIGN PATENT DOCUMENTS

WO   WO-2012064772 A1   5/2012
WO   WO-2013145031 A1   10/2013

OTHER PUBLICATIONS

Sharma P., et al., "Aggregating Bandwidth for Multihomed Mobile Collaborative Communities," Mar. 2007, 35 pages.
(Continued)

*Primary Examiner* — Eunsook Choi
(74) *Attorney, Agent, or Firm* — Dalei Dongo; Holland & Hart

(57) ABSTRACT

Techniques are described for wireless communication at a wireless communication device. One method includes receiving wireless wide area network (WWAN) packets at a WWAN processing subsystem of the wireless communication device; transferring wireless local area network (WLAN) packet information from a WLAN processing subsystem of the wireless communication device to the WWAN processing subsystem, the WLAN packet information comprising a subset of data associated with WLAN packets; performing a reordering process in the WWAN processing subsystem, the reordering process based at least in part on the received WWAN packets and the WLAN packets that correspond to the transferred WLAN packet
(Continued)

information; and providing an indication of the reordered WWAN packets and the WLAN packets to an application processing subsystem of the wireless communication device.

30 Claims, 28 Drawing Sheets

(51) Int. Cl.
H04W 88/06 (2009.01)
H04W 88/10 (2009.01)
H04W 84/12 (2009.01)

(56) References Cited

U.S. PATENT DOCUMENTS

| | | | |
|---|---|---|---|
| 2014/0050086 A1* | 2/2014 | Himayat | H04N 21/2365 |
| | | | 370/230 |
| 2014/0219284 A1 | 8/2014 | Chau et al. | |
| 2015/0117357 A1 | 4/2015 | Ozturk et al. | |
| 2016/0337254 A1* | 11/2016 | Karaki | H04L 47/283 |
| 2016/0338074 A1* | 11/2016 | Chou | H04W 76/27 |
| 2017/0078914 A1* | 3/2017 | Fujishiro | H04W 28/04 |
| 2017/0099625 A1* | 4/2017 | Li | H04W 28/08 |

OTHER PUBLICATIONS

ISA/EP, International Search Report and Written Opinion of the International Searching Authority, Int'l Application No. PCT/US2016/054137, dated Dec. 16, 2016, European Patent Office, Rijswijk, NL, 12 pgs.

* cited by examiner

TECHNIQUES FOR OPTIMIZING WIRELESS WIDE AREA NETWORK-WIRELESS LOCAL AREA NETWORK AGGREGATION

CROSS REFERENCES

The present Application for Patent claims priority to U.S. Provisional Patent Application No. 62/245,203 by Meylan et al., entitled "Techniques for Optimizing WWAN-WLAN Aggregation," filed Oct. 22, 2015, and to U.S. Provisional Patent Application No. 62/337,698 by Meylan et al., entitled "Techniques For Optimizing WWAN-WLAN Aggregation" filed May 17, 2016 and assigned to the assignee hereof, which is each hereby incorporated by reference in its entirety.

BACKGROUND

Field of the Disclosure

The present disclosure, for example, relates to wireless communication systems, and more particularly to techniques for optimizing wireless wide area network (WWAN)-wireless local area network (WLAN) aggregation.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE) devices. A base station may communicate with UEs on downlink channels (e.g., for transmissions from a base station to a UE) and uplink channels (e.g., for transmissions from a UE to a base station).

In some examples, a UE may communicate with a base station and a WLAN access point in parallel, with the WLAN access point providing WLAN termination for a WWAN of which the base station is a member. In these examples, the UE may aggregate packets (e.g., packet data convergence protocol (PDCP) protocol data units (PDUs)) received over the WWAN and the WLAN. When the WWAN includes a Long Term Evolution (LTE) or LTE-Advance (LTE-A) network, the aggregation may be referred to as LTE-Wi-Fi aggregation (LWA).

SUMMARY

WLAN packets are transmitted, for example, over a WLAN in-order. However, WWAN packets may be transmitted over a WWAN out-of-order. A UE that receives a transmission partly over a WWAN and partly over a WLAN therefore needs to perform WWAN-WLAN aggregation, including a reordering process. When performing the reordering process, WWAN packets may be reordered with respect to one another, and with respect to a sequence of in-order WLAN packets. The present disclosure relates to techniques for optimizing WWAN-WLAN aggregation by performing a WWAN-WLAN packet reordering process in a WWAN processing subsystem. The WWAN packets may be received by the WWAN processing subsystem, and the WLAN packets may be received by a WLAN processing subsystem and transferred to the WWAN processing subsystem. In some examples, the WLAN packets may not be transferred to the WWAN processing subsystem in their entirety and instead metadata, another subset of data associated with the WLAN packets, or some combination may be transferred to the WWAN processing subsystem; or, WLAN packet information may not be stored in a memory of the WWAN processing subsystem and may instead by temporarily cached at the WWAN processing subsystem. After performing a reordering process based on WWAN packets and WLAN packets, or after performing a reordering process based on WWAN metadata and WLAN metadata, the WWAN processing subsystem may provide an indication of the reordered WWAN packets and WLAN packets (e.g., in-order WWAN packets and WLAN packets, in-order identifiers of the WWAN packets and WLAN packets) to an application processing subsystem.

In one example, a method for wireless communication at a wireless communication device is described. The method may include receiving WWAN packets at a WWAN processing subsystem of the wireless communication device; transferring WLAN packet information from a WLAN processing subsystem of the wireless communication device to the WWAN processing subsystem; performing a reordering process in the WWAN processing subsystem, the reordering process based at least in part on the received WWAN packets and WLAN packets that correspond to the transferred WLAN packet information; and providing an indication of the reordered WWAN packets and the WLAN packets to an application processing subsystem of the wireless communication device. In some examples, the WLAN packet information may include a subset of data associated with WLAN packets.

In some examples of the method, the WLAN packet information may be transferred from the WLAN processing subsystem to the WWAN processing subsystem: under control of the WWAN processing subsystem, under control of the application processing subsystem, or under a combination thereof. In some examples, the method may include determining, at the WWAN processing subsystem, a mobility set for receiving the WLAN packets at the WLAN processing subsystem, and indicating the mobility set to the WLAN processing subsystem. In some examples, the method may include receiving, from the WLAN processing subsystem, an indication of association or disassociation with a basic service set identifier (BSSID) selected from the mobility set. In some examples, the WLAN packet information transferred from the WLAN processing subsystem to the WWAN processing subsystem may include PDCP information. In some examples, the method may include deciphering the WLAN packets and the WWAN packets in the WWAN processing subsystem. In some examples, the WLAN packet information transferred from the WLAN processing subsystem to the WWAN processing subsystem may include WLAN packet metadata. In some examples, the subset of data may include WLAN packet metadata. In some examples, the WLAN packet metadata may include WLAN packet headers. In some examples, the indication of the reordered WLAN packets and WWAN packets may include ordered WLAN packet headers and WWAN packet headers and WWAN packets. In some examples, the WLAN packet information transferred from the WLAN processing subsystem to the WWAN processing subsystem may include WLAN packets. In some examples, the indication of the reordered WLAN packets and WWAN packets may include ordered WLAN packets and WWAN packets.

In some examples of the method, the WLAN packet information may be transferred from the WLAN processing subsystem to the WWAN processing subsystem in blocks of information corresponding to subsets of WLAN packets. In some examples, the method may include signaling to the WLAN processing subsystem, after transferring a block of information to the WWAN processing subsystem, that memory of the WLAN processing subsystem used to store the block of information is available for reuse. In some examples, the method may include deciphering a transferred block of information in the WWAN processing subsystem, and signaling to the WLAN processing subsystem, after transferring the block of information to the WWAN processing subsystem, that memory of the WLAN processing subsystem used to store the block of information is available for reuse. In some examples, the method may include receiving, from the application processing subsystem, a WLAN packet information block availability indicator. In some examples, the method may include identifying a gap between a highest sequence number of a received WWAN packet and a lowest sequence number reference in the transferred WLAN packet information, and regulating transfer of additional WLAN packet information from the WLAN processing subsystem to the WWAN processing subsystem based at least in part on the identified gap.

In some examples, the method may include receiving the WLAN packets at the WLAN processing subsystem, and associating the WLAN packets with time-stamps of receipt at the WLAN processing subsystem. In these examples, the transferred WLAN packet information may include the time-stamps of receipt at the WLAN processing subsystem. In some examples, the method may include starting a reordering timer, at the WWAN processing subsystem, based at least in part on a gap in time-stamps included in the transferred WLAN packet information. In some examples, the method may include at least one of: storing the WLAN packet information in a main memory of the WWAN processing subsystem while performing the reordering; caching the WLAN packet information in a cache memory of the WWAN processing subsystem while performing the reordering; buffering the WLAN packet information in the WWAN processing subsystem while performing the reordering; or a combination thereof. In some examples, the indication of the reordered WLAN packets and WWAN packets may include a block of in-order packet identifiers. In some examples, the method may include signaling to the WLAN processing subsystem that memory of the WLAN processing subsystem used to store WLAN packet information corresponding to multiple WLAN packets is available for reuse, the signaling including at least one of: indicating a block of multiple WLAN packet identifiers or indicating a block of multiple memory locations. In some examples, the WWAN processing subsystem may include a WWAN modem. In some examples, the application processing subsystem may provide at least a part of the WLAN processing subsystem.

In one example, an apparatus for wireless communication at a wireless communication device is described. The apparatus may include means for receiving WWAN packets at a WWAN processing subsystem of the wireless communication device; means for transferring WLAN packet information from a WLAN processing subsystem of the wireless communication device to the WWAN processing subsystem; means for performing a reordering process in the WWAN processing subsystem, the reordering process based at least in part on the received WWAN packets and WLAN packets that correspond to the transferred WLAN packet information; and means for providing an indication of the reordered WWAN packets and the WLAN packets to an application processing subsystem of the wireless communication device. In some examples, the WLAN packet information may include a subset of data associated with WLAN packets.

In some examples of the apparatus, the WLAN packet information may be transferred from the WLAN processing subsystem to the WWAN processing subsystem: under control of the WWAN processing subsystem, under control of the application processing subsystem, or under a combination thereof. In some examples, the apparatus may include means for determining, at the WWAN processing subsystem, a mobility set for receiving the WLAN packets at the WLAN processing subsystem, and means for indicating the mobility set to the WLAN processing subsystem. In some examples, the apparatus may include means for receiving, from the WLAN processing subsystem, an indication of association or disassociation with a BSSID selected from the mobility set. In some examples, the WLAN packet information transferred from the WLAN processing subsystem to the WWAN processing subsystem may include PDCP information. In some examples, the apparatus may include means for deciphering the WLAN packets and the WWAN packets in the WWAN processing subsystem. In some examples, the WLAN packet information transferred from the WLAN processing subsystem to the WWAN processing subsystem may include WLAN packet metadata. In some examples, the subset of data may include WLAN packet metadata. In some examples, the WLAN packet metadata may include WLAN packet headers. In some examples, the indication of the reordered WLAN packets and WWAN packets may include ordered WLAN packet headers and WWAN packet headers and WWAN packets. In some examples, the WLAN packet information transferred from the WLAN processing subsystem to the WWAN processing subsystem may include WLAN packets. In some examples, the indication of the reordered WLAN packets and WWAN packets may include ordered WLAN packets and WWAN packets.

In some examples, the WLAN packet information may be transferred from the WLAN processing subsystem to the WWAN processing subsystem in blocks of information corresponding to subsets of WLAN packets. In some examples, the apparatus may include means for signaling to the WLAN processing subsystem, after transferring a block of information to the WWAN processing subsystem, that memory of the WLAN processing subsystem used to store the block of information is available for reuse. In some examples, the apparatus may include means for deciphering a transferred block of information in the WWAN processing subsystem, and means for signaling to the WLAN processing subsystem, after transferring the block of information to the WWAN processing subsystem, that memory of the WLAN processing subsystem used to store the block of information is available for reuse. In some examples, the apparatus may include means for receiving, from the application processing subsystem, a WLAN packet information block availability indicator. In some examples, the apparatus may include means for identifying a gap between a highest sequence number of a received WWAN packet and a lowest sequence number reference in the transferred WLAN packet information, and means for regulating transfer of additional WLAN packet information from the WLAN processing subsystem to the WWAN processing subsystem based at least in part on the identified gap.

In some examples, the apparatus may include means for receiving the WLAN packets at the WLAN processing subsystem, and means for associating the WLAN packets with time-stamps of receipt at the WLAN processing subsystem. In these examples, the transferred WLAN packet information may include the time-stamps of receipt at the WLAN processing subsystem. In some examples, the apparatus may include means for starting a reordering timer, at the WWAN processing subsystem, based at least in part on a gap in time-stamps included in the transferred WLAN packet information. In some examples, the apparatus may include at least one of: means for storing the WLAN packet information in a main memory of the WWAN processing subsystem while performing the reordering; means for caching the WLAN packet information in a cache memory of the WWAN processing subsystem while performing the reordering; means for buffering the WLAN packet information in the WWAN processing subsystem while performing the reordering; or a combination thereof. In some examples, the indication of the reordered WLAN packets and WWAN packets may include a block of in-order packet identifiers. In some examples, the apparatus may include means for signaling to the WLAN processing subsystem that memory of the WLAN processing subsystem used to store WLAN packet information corresponding to multiple WLAN packets is available for reuse, the means for signaling including at least one of: means for indicating a block of multiple WLAN packet identifiers or means for indicating a block of multiple memory locations. In some examples, the WWAN processing subsystem may include a WWAN modem. In some examples, the application processing subsystem may provide at least a part of the WLAN processing subsystem.

In one example, another apparatus for wireless communication at a wireless communication device is described. The apparatus may include a processor, and memory in electronic communication with the processor. The processor and the memory may be configured to receive WWAN packets at a WWAN processing subsystem of the wireless communication device; to transfer WLAN packet information from a WLAN processing subsystem of the wireless communication device to the WWAN processing subsystem; to perform a reordering process in the WWAN processing subsystem, the reordering process based at least in part on the received WWAN packets and WLAN packets that correspond to the transferred WLAN packet information; and to provide an indication of the reordered WWAN packets and the WLAN packets to an application processing subsystem of the wireless communication device. In some examples, the WLAN packet information may include a subset of data associated with WLAN packets.

In some examples of the apparatus, the WLAN packet information may be transferred from the WLAN processing subsystem to the WWAN processing subsystem: under control of the WWAN processing subsystem, under control of the application processing subsystem, or under a combination thereof. In some examples, the WLAN packet information transferred from the WLAN processing subsystem to the WWAN processing subsystem may include PDCP information. In some examples, the processor and the memory may be configured to decipher the WLAN packets and the WWAN packets in the WWAN processing subsystem. In some examples, the WLAN packet information transferred from the WLAN processing subsystem to the WWAN processing subsystem may include WLAN packet metadata. In some examples, the subset of data may include WLAN packet metadata. In some examples, the WLAN packet metadata may include WLAN packet headers. In some examples, the indication of the reordered WLAN packets and WWAN packets may include ordered WLAN packet headers and WWAN packet headers and WWAN packets. In some examples, the WLAN packet information may be transferred from the WLAN processing subsystem to the WWAN processing subsystem in blocks of information corresponding to subsets of WLAN packets.

In some examples of the apparatus, the processor and the memory may be configured to identify a gap between a highest sequence number of a received WWAN packet and a lowest sequence number reference in the transferred WLAN packet information, and to regulate transfer of additional WLAN packet information from the WLAN processing subsystem to the WWAN processing subsystem based at least in part on the identified gap. In some examples, the processor and the memory may be configured to receive the WLAN packets at the WLAN processing subsystem, and to associate the WLAN packets with time-stamps of receipt at the WLAN processing subsystem. In these examples, the transferred WLAN packet information may include the time-stamps of receipt at the WLAN processing subsystem. In some examples, the processor and the memory may be configured to: store the WLAN packet information in a main memory of the WWAN processing subsystem while performing the reordering; cache the WLAN packet information in a cache memory of the WWAN processing subsystem while performing the reordering; buffer the WLAN packet information in the WWAN processing subsystem while performing the reordering; or a combination thereof. In some examples, the indication of the reordered WLAN packets and WWAN packets may include a block of in-order packet identifiers. In some examples, the processor and the memory may be configured to: signal to the WLAN processing subsystem that memory of the WLAN processing subsystem used to store WLAN packet information corresponding to multiple WLAN packets is available for reuse, the signaling including at least one of: indicating a block of multiple WLAN packet identifiers or indicating a block of multiple memory locations.

In one example, a non-transitory computer-readable medium storing computer-executable code for wireless communication at a wireless communication device is described. The code may be executable by a processor to receive WWAN packets at a WWAN processing subsystem of the wireless communication device; to transfer WLAN packet information from a WLAN processing subsystem of the wireless communication device to the WWAN processing subsystem; to perform a reordering process in the WWAN processing subsystem, the reordering process based at least in part on the received WWAN packets and WLAN packets that correspond to the transferred WLAN packet information; and to provide an indication of the reordered WWAN packets and the WLAN packets to an application processing subsystem of the wireless communication device. In some examples, the WLAN packet information may include a subset of data associated with WLAN packets.

In some examples of the non-transitory computer-readable medium, the WLAN packet information transferred from the WLAN processing subsystem to the WWAN processing subsystem may include WLAN packet metadata. In some examples, the subset of data may include WLAN packet metadata. In some examples, the WLAN packet information may be transferred from the WLAN processing subsystem to the WWAN processing subsystem in blocks of information corresponding to subsets of WLAN packets. In some examples, the indication of the reordered WLAN packets and WWAN packets may include a block of in-order packet identifiers.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a UE receives a transmission partly over a WWAN and partly over a WLAN and performs a WWAN-WLAN aggregation process, including a reordering process. In examples, the UE may receive WWAN packets associated with the transmission over a dedicated (or licensed) radio frequency spectrum band, and may receive WLAN packets associated with the transmission over a shared (or unlicensed) radio frequency spectrum band. The dedicated radio frequency spectrum band may include a radio frequency spectrum band licensed to some users for some uses. The shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner.

The present disclosure relates to techniques for optimizing WWAN-WLAN aggregation by performing a WWAN-WLAN packet reordering process in a WWAN processing subsystem. The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
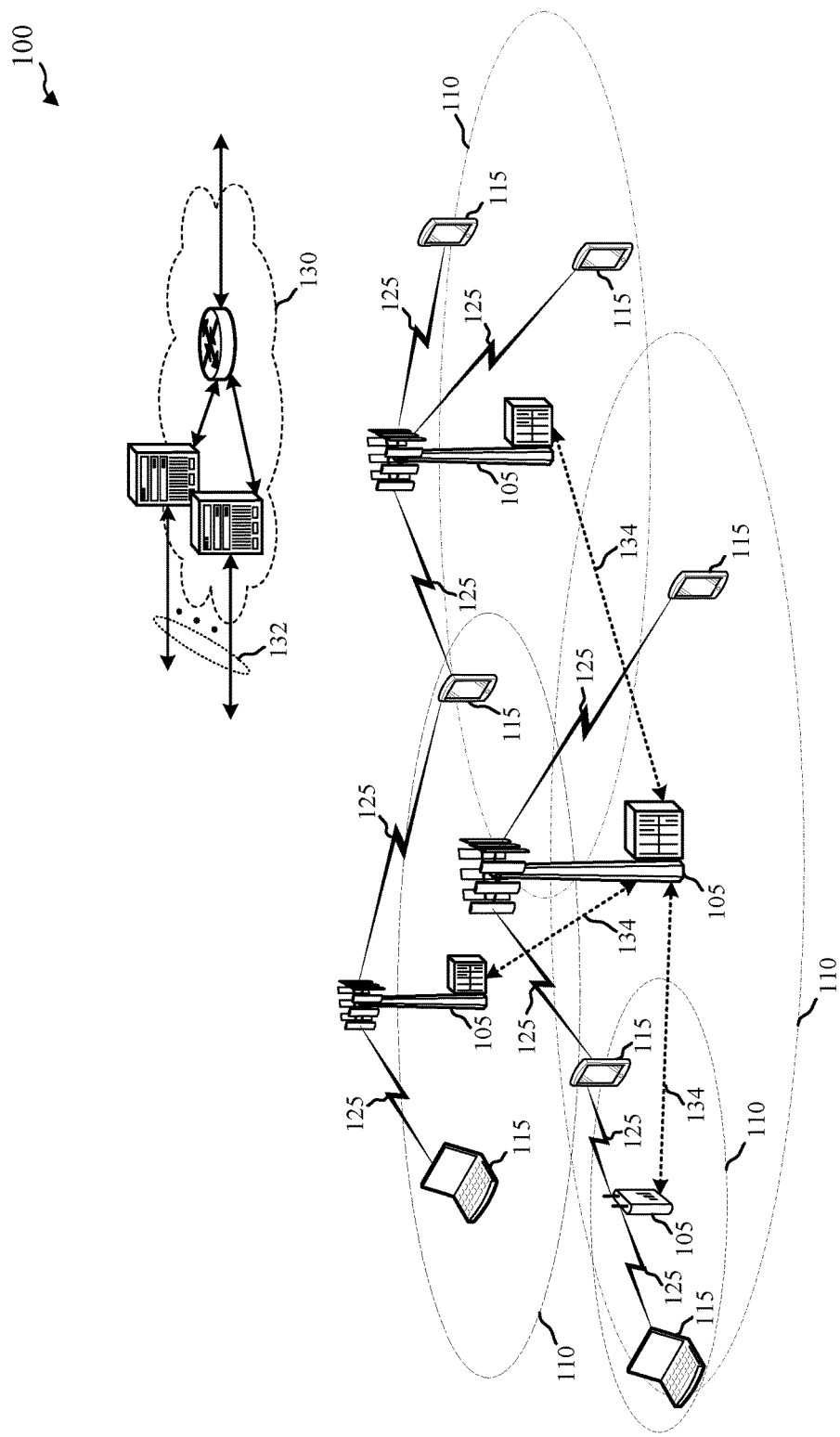
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe a base station 105, while the term UE may be used to describe a UE 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

In some examples, the wireless communication system 100 may include a WLAN. In a WLAN, the term access point (AP) may be used to describe a base station 105, while the term station (STA) may be used to describe the UEs 115.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In some examples, the wireless communication system 100 may support operation over a dedicated radio frequency spectrum band (e.g., a radio frequency spectrum band for which transmitting apparatuses may not contend for access because the radio frequency spectrum band is licensed to some users for some uses (e.g., a licensed radio frequency spectrum band usable for LTE/LTE-A communications)) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)).

In some examples of the wireless communication system 100, a UE 115 may receive and aggregate WWAN packets and WLAN packets included in a transmission. The WWAN packets may be received by a WWAN processing subsystem of the UE 115, and the WLAN packets may be received by a WLAN processing subsystem of the UE 115. In some examples, the WWAN processing subsystem may transfer WLAN packet information from the WLAN processing subsystem to the WWAN processing subsystem, and may perform a reordering process in the WWAN processing subsystem (e.g., a reordering process based on sequence numbers associated with received packets). In some examples, the transferred WLAN packet information may include a subset of data associated with WLAN packets. The reordering process may be based at least in part on the received WWAN packets, and on WLAN packets that correspond to the transferred WLAN packet information. When the WWAN processing subsystem completes the reordering process, or a portion of the reordering process, the WWAN processing subsystem may provide an indication of the reordered WWAN packets and the WLAN packets to an application processing subsystem of the UE 115. The received transmission may include, for example, a voice call or a data transmission.

Figure 2:
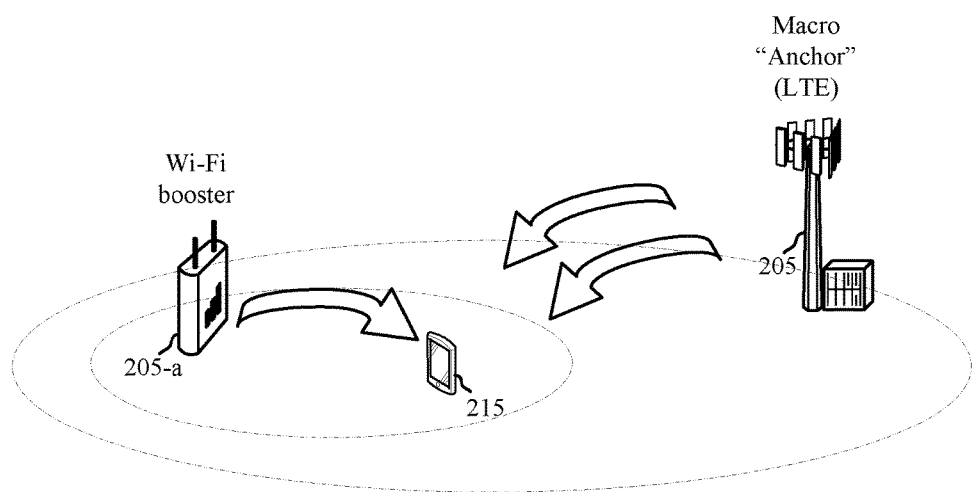
FIG. 2 illustrates an example of a wireless communication system using LWA, in accordance with various aspects of the present disclosure.

FIG. 2 illustrates an example of a wireless communication system 200 using LWA, in accordance with various aspects of the present disclosure. The wireless communication system 200 may be an example of a portion of the wireless communication system 200 and may include a LTE/LTE-A macro "anchor" base station 205, a UE 215, and a Wi-Fi booster 205-a (a type of WLAN access point) in some examples. The base station 205 and Wi-Fi booster 205-a may be examples of aspects of the base stations 105 described with reference to FIG. 1, and the UE 215 may be an example of aspects of the UEs 115 described with reference to FIG. 1.

The Wi-Fi booster 205-a may be fully managed by the LTE/LTE-A network in which the base station 205 operates, and may be managed as an LTE/LTE-A network extension. The Wi-Fi booster 205-a may therefore operate as an additional opportunistic booster of LTE/LTE-A capacity. The base station 205 may provide the UE 215 access to a carrier (e.g., a licensed carrier) in a dedicated (or licensed) radio frequency spectrum band, and the Wi-Fi booster 205-a may provide the UE 215 access to a carrier (e.g., an unlicensed carrier) in a shared (or unlicensed) radio frequency spectrum band. The unlicensed carrier may be provided using an Institute of Electrical and Electronic Engineers (IEEE) Standard 802.11 PHY/MAC (or unlicensed lower layers). The licensed carrier and unlicensed carrier may be aggregated, using LWA, to form an aggregated pipe coordinated at the Radio Access Network (RAN) level. The LTE/LTE-A network operator may be provided full control of managing resources of the base station 205 and Wi-Fi booster 205-a. The Wi-Fi booster 205-a may be collocated or non-collocated with the base station 205.

Figure 3:
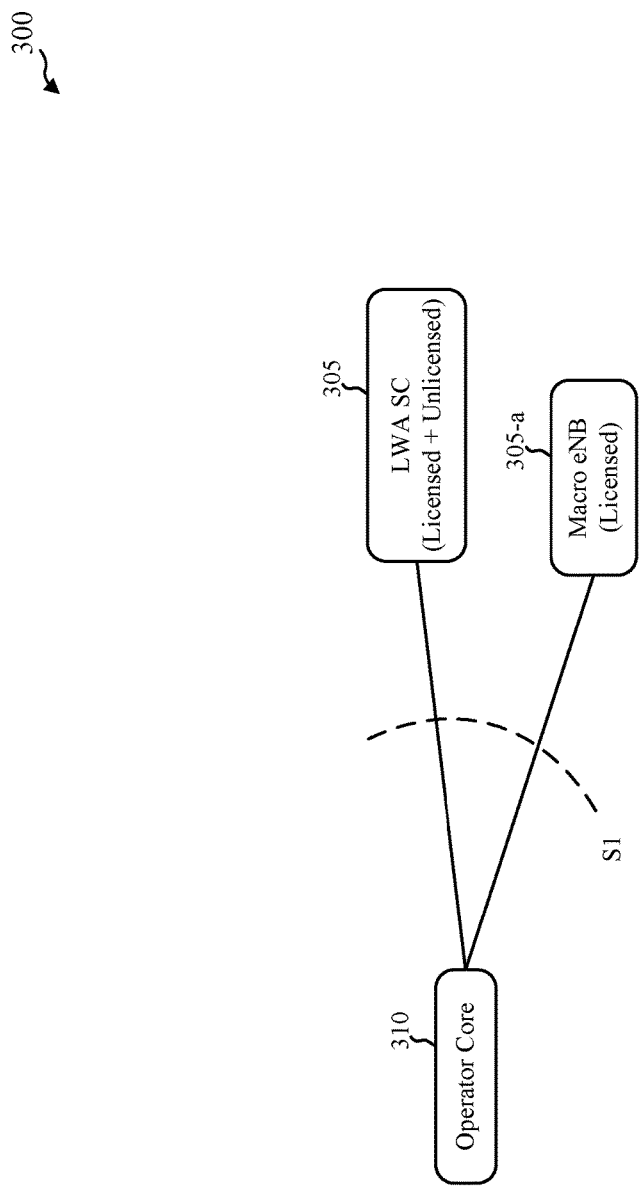
FIG. 3 illustrates an example of a LWA deployment mode using a small cell architecture, in accordance with various aspects of the present disclosure.

FIG. 3 illustrates an example of a LWA deployment mode using a small cell architecture 300, in accordance with various aspects of the present disclosure. An operator core 310, which may be an example of aspects of the core network 130 described with reference to FIG. 1, may communicate with a macro base station 305-a (or eNB) communicating over a dedicated (or licensed) radio frequency spectrum band and a LWA small cell (SC) 305 communicating over the dedicated (or licensed) radio frequency spectrum band and a shared (or unlicensed) radio frequency spectrum band. Communications between the operator core and the macro base station 305-a or LWA SC 305 may be made over a backhaul link using, e.g., a S1 interface.

Figure 4:
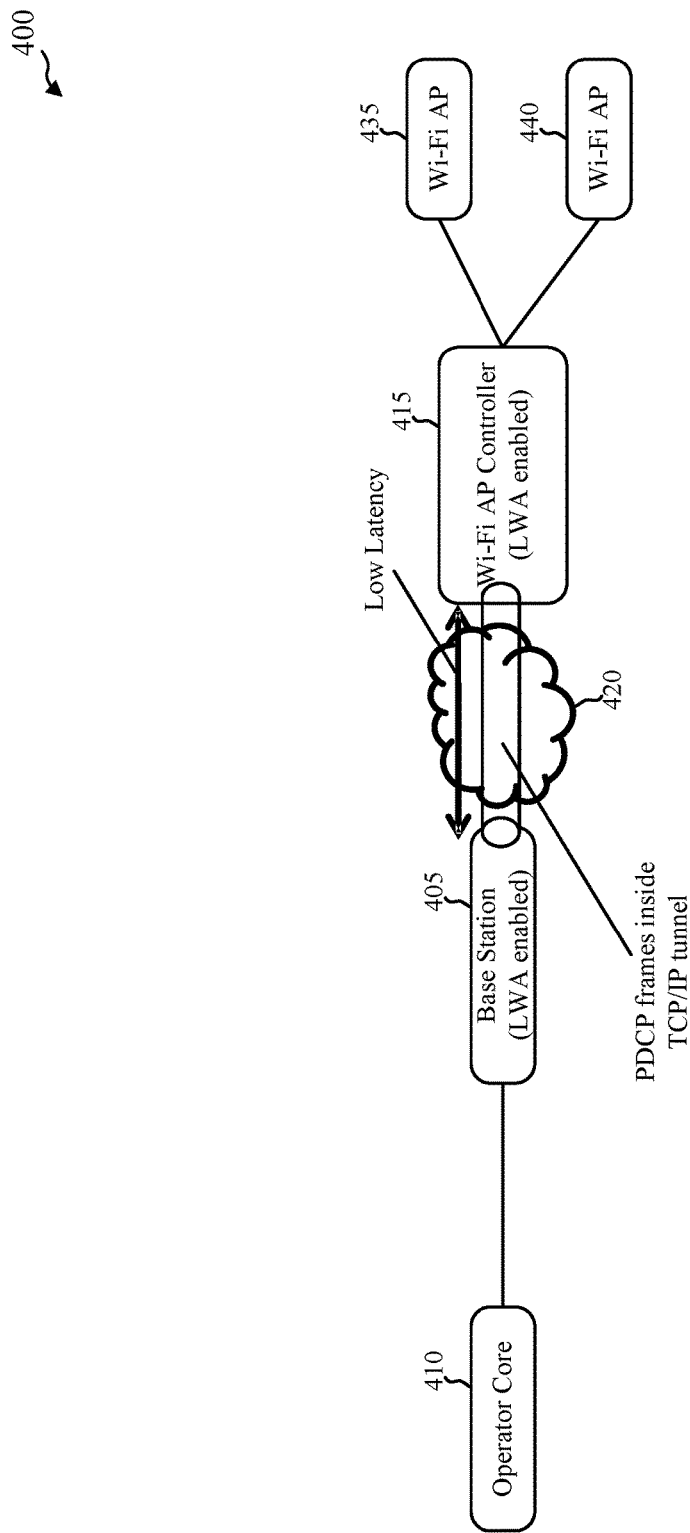
FIG. 4 illustrates an example of a LWA deployment mode using a dual connectivity architecture, in accordance with various aspects of the present disclosure.

FIG. 4 illustrates an example of a LWA deployment mode using a dual connectivity architecture 400, in accordance with various aspects of the present disclosure. An operator core 410, which may be an example of aspects of the core network 130 described with reference to FIG. 1, may communicate with a LWA-enabled base station 405 (or eNB), and the LWA-enabled base station 405 may communicate bi-directionally with a LWA-enabled Wi-Fi AP controller 415. The LWA-enabled Wi-Fi AP controller 415 may communicate with a set of Wi-Fi APs (e.g., a first Wi-Fi AP 435 and a second Wi-Fi AP 440). A TCP/IP tunnel 420 may be established between the LWA-enabled base station 405 and the LWA-enabled Wi-FI AP controller 415, to transport PDCP frames from LTE/LTE-A to WLAN (using, e.g., an X2 interface). In some examples, the TCP/IP tunnel 420 may have a low latency. For example, a maximum one-way latency from the LWA-enabled base station 405 to the LWA-enabled Wi-Fi AP controller 415 may be 10 milliseconds (ms).

Figure 5:
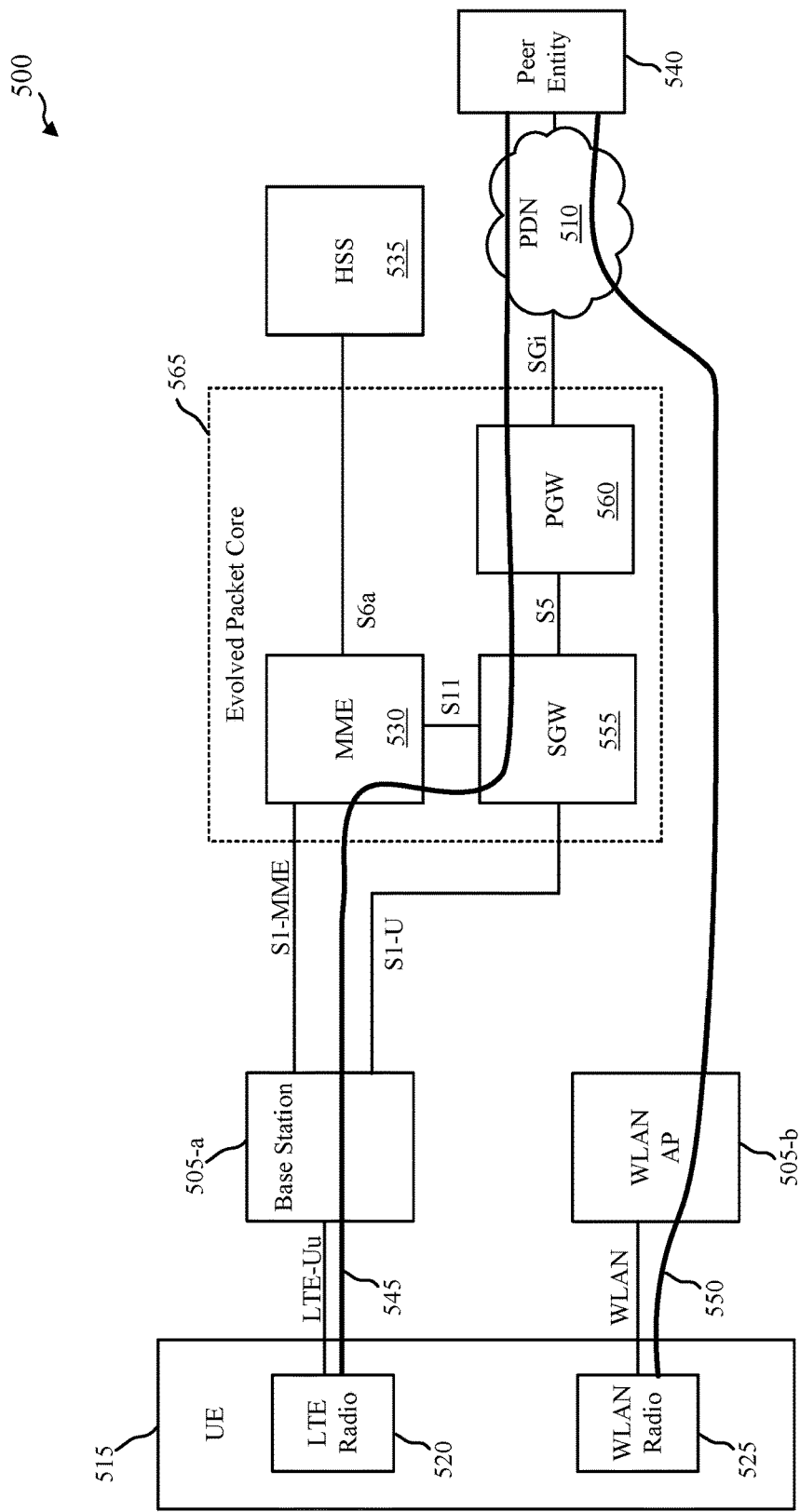
FIG. 5 and FIG. 6 are block diagrams (e.g., a first block diagram and a second block diagram) conceptually illustrating examples of a first data path and a second data path between a UE and a packet data network (PDN) (e.g., the Internet), in accordance with various aspects of the present disclosure.
Figure 6:
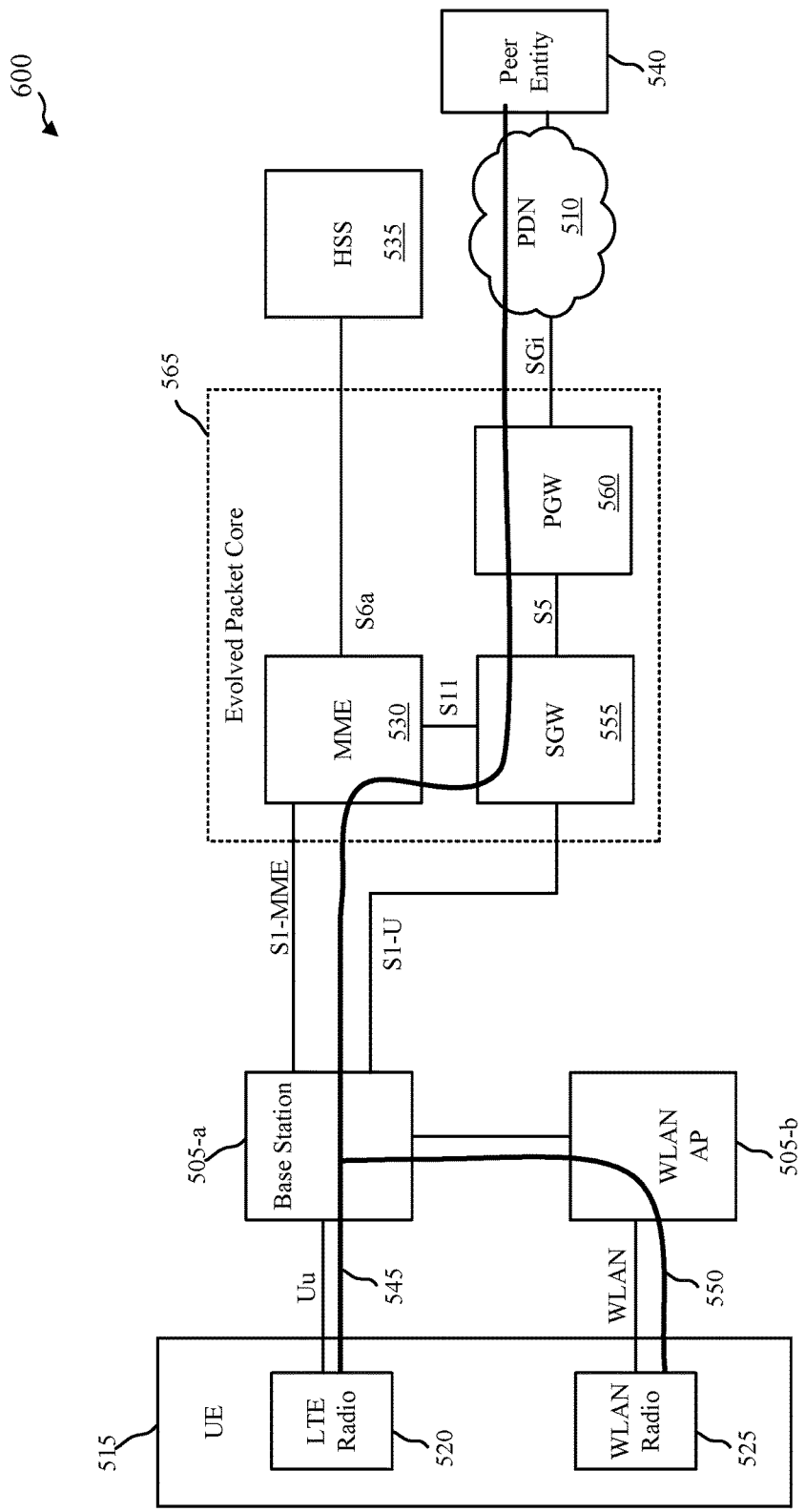

FIG. 5 and FIG. 6 are block diagrams (e.g., a first block diagram 500 and a second block diagram 600) conceptually illustrating examples of a first data path 545 and a second data path 550 between a UE 515 and a packet data network (PDN) 510 (e.g., the Internet), in accordance with various aspects of the present disclosure. The first data path 545 and the second data path 550 are shown within the context of a wireless communication system that aggregates WLAN and LTE radio access technologies. In each example, the wireless communication system described with reference to FIG. 5 or 6 may include a multi-mode UE 515, a base station 505-a (or eNB), a WLAN AP 505-b, an evolved packet core (EPC) 565, a PDN 510, and a peer entity 540. The EPC 565 of each example may include a mobility management entity (MME) 530, a serving gateway (SGW) 555, and a PDN gateway (PGW) 560. A home subscriber system (HSS) 535 may be communicatively coupled with the MME 530. The UE 515 of each example may include an LTE radio 520 and a WLAN radio 525.

Referring specifically to FIG. 5, the base station 505-a and AP 630 may be capable of providing the UE 515 with access to the PDN 510 using the aggregation of one or more LTE component carriers or one or more WLAN component carriers. Using this access to the PDN 510, the UE 515 may communicate with the peer entity 540. The base station 505-a may provide access to the PDN 510 through the EPC 565 (e.g., through first data path 545), and the WLAN AP 505-b may provide direct access to the PDN 510 (e.g., through second data path 550).

In some examples, the MME 530 may be the control node that processes the signaling between the UE 515 and the EPC 565. For example, the MME 530 may provide bearer and connection management. The MME 530 may, therefore, be responsible for idle mode UE tracking and paging, bearer activation and deactivation, and SGW selection for the UE 515. The MME 530 may communicate with the base station 505-a over an S1-MME interface. The MME 530 may additionally authenticate the UE 515 and implement Non-Access Stratum (NAS) signaling with the UE 515.

In some examples, the HSS 535 may, among other functions, store subscriber data, manage roaming restrictions, manage accessible access point names (APNs) for a subscriber, and associate subscribers with MMES 530. The HSS 535 may communicate with the MME 530 over an S6a interface defined by the Evolved Packet System (EPS) architecture standardized by the 3GPP organization.

In some examples, all user IP packets transmitted over LTE may be transferred through base station 505-a to the SGW 555, which may be connected to the PDN gateway 560 over an S5 signaling interface and the MME 530 over an S11 signaling interface. The SGW 555 may reside in the user plane and act as a mobility anchor for inter-base station handovers and handovers between different access technologies. The PDN gateway 560 may provide UE IP address allocation as well as other functions.

In some examples, the PDN gateway 560 may provide connectivity to one or more external packet data networks, such as PDN 510, over a SGi signaling interface. The PDN 510 may include the Internet, an Intranet, an IP Multimedia Subsystem (IMS), a Packet-Switched (PS) Streaming Service (PSS), and/or other types of PDNs.

In the present example, user plane data between the UE 515 and the EPC 565 may traverse the same set of one or more EPS bearers, irrespective of whether the traffic flows over first data path 545 of the LTE link or second data path 550 of the WLAN link. Signaling or control plane data related to the set of one or more EPS bearers may be transmitted between the LTE radio 520 of the UE 515 and the MME 530 of the EPC 565, by way of the base station 505-a.

FIG. 6 illustrates a state of the wireless communication system shown in FIG. 5, in which the base station 505-a and WLAN AP 505-b are collocated or otherwise in high-speed communication with each other. In this example, EPS bearer-related data between the UE 515 and the WLAN AP 505-b may be routed to the base station 505-a, and then to the EPC 565. In this way, all EPS bearer-related data may be forwarded along the same path between the base station 505-a, the EPC 565, the PDN 510, and the peer entity 540.

Figure 7:
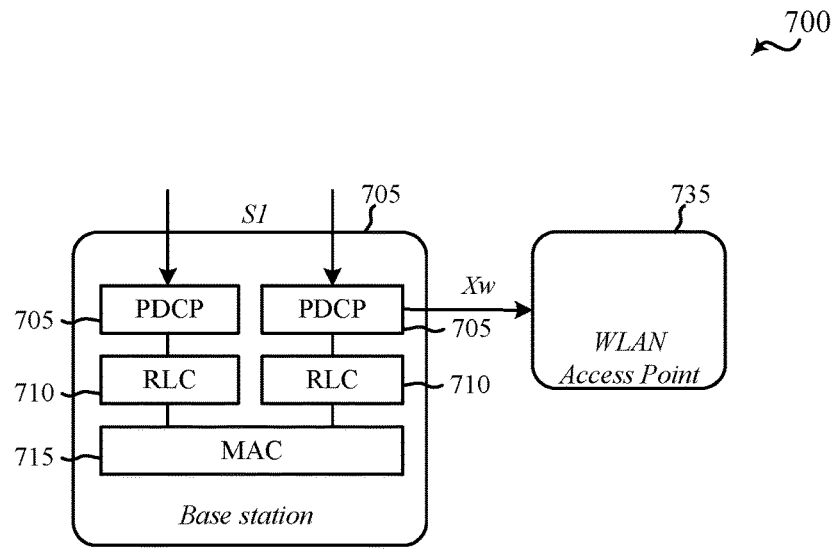
FIG. 7 illustrates a block diagram of a LWA-enabled base station (e.g., an eNB), in accordance with various aspects of the present disclosure.

FIG. 7 illustrates a block diagram 700 of a LWA-enabled base station 705 (e.g., an eNB), in accordance with various aspects of the present disclosure. The LWA-enabled base station 705 may include a PDCP layer 710, a RLC layer 715, and a MAC layer 720 (as well as other layers). The LWA-enabled base station 705 may receive PDCP PDUs from an operator core at the PDCP layer 710. The PDCP PDUs may be received from the operator core over a S1 interface. Aggregation for LTE/LTE-A and WLAN may occur at the PDCP layer 710 (e.g., the LWA-enabled base station 705 may prepare PDCP PDUs that are transferred to a UE PDCP entity via the LTE/LTE-A RLC/MAC layers and/or a WLAN).

For a non-collocated base station 705 and WLAN access point 735, the WLAN access point 735 may provide WLAN termination (WT) for the LTE/LTE-A network in which the base station 705 operates, and the WT may define a logical entity to which the base station 705 is connected via a standardized interface ($X_W$). For LWA, and in some examples, the only CN interface may be a S1 interface, terminated at the base station 705 (but this may not preclude an implementation of "legacy" WLAN interworking (e.g., S2a, S2b, or NSWO) in the same WLAN). In some examples, an eNB-assisted authentication between UE and WLAN access point 735 (or WT) may be provided without CN interaction.

In a control plane, mobility and radio resource management may be handled, for example, as follows. A base station may configure a WLAN mobility set (e.g., via identifiers SSID, HESSID, or basic service set identifier (BSSID)), where the UE can change WLAN access points within the set without informing the base station. When moving between WLAN mobility sets, the UE may report measurements and follow base station direction to move to a next mobility set. An event trigger may be based on Wi-Fi Received Signal Strength Indicator (RSSI), with the UE reporting RSSI and other broadcasted metrics from WLAN (e.g., load, backhaul capacity, etc.). With respect to WLAN status reporting, a UE may reports its WLAN status when the UE is unable to comply or continue with a base station configuration with LWA. The status changes can be triggered by, for example, a user turning off Wi-Fi, a user connecting to another WLAN, or loss of connection to the LWA WLAN.

In a user plane, a bearer ID may be added to a PDCP PDU by the base station, to support multiple bearers in LWA. In some examples, aggregation may support uplink transmissions on LTE/LTE-A only. For a LWA bearer, and in some examples, 3GPP LTE/LTE-A Release-12 dual connectivity PDCP re-ordering behavior may be adopted as a baseline. In some examples, flow control on the $X_W$ interface may be defined. Flow control based on UE feedback, without using $X_W$ feedback may be for further study (FFS). A new Ethertype may identify PDCP PDUs transmitted over WLAN (e.g., to help a UE distinguish LWA packets from other WLAN packets).

Figure 8:
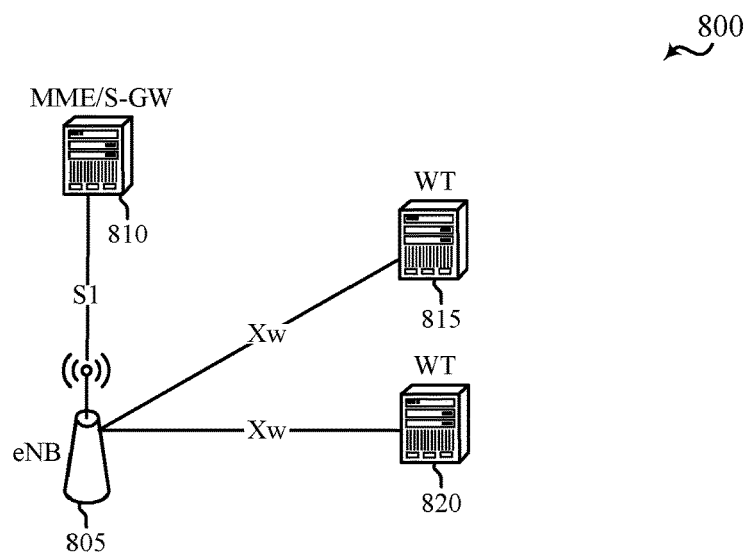
FIG. 8 illustrates an example of a wireless communication system, in accordance with various aspects of the present disclosure.

FIG. 8 illustrates an example of a wireless communication system 800, in accordance with various aspects of the present disclosure. The wireless communication system 800 may include a base station 805 (e.g., an eNB), a MME/S-GW 810, and a number of WLAN access points (e.g., a first WLAN access point 815 and a second WLAN access point 820) providing WT for a LTE/LTE-A network of which the base station 805 is a member.

The base station 805 may communicate with each WLAN access point 815, 820 (or WT) using a $X_W$ interface. The $X_W$ interface may support dual connectivity X2 architecture. The $X_W$ interface may have properties such as: the $X_W$ interface may include both user ($X_W$-U) and control plane ($X_W$-C) components; a base station (or eNB) may connect to multiple WTs and vice versa; GTP-U over user datagram protocol (UDP) may be used for user plane with one tunnel per bearer; or stream control transmission protocol (SCTP) may be used for $X_W$-C.

Figure 9:
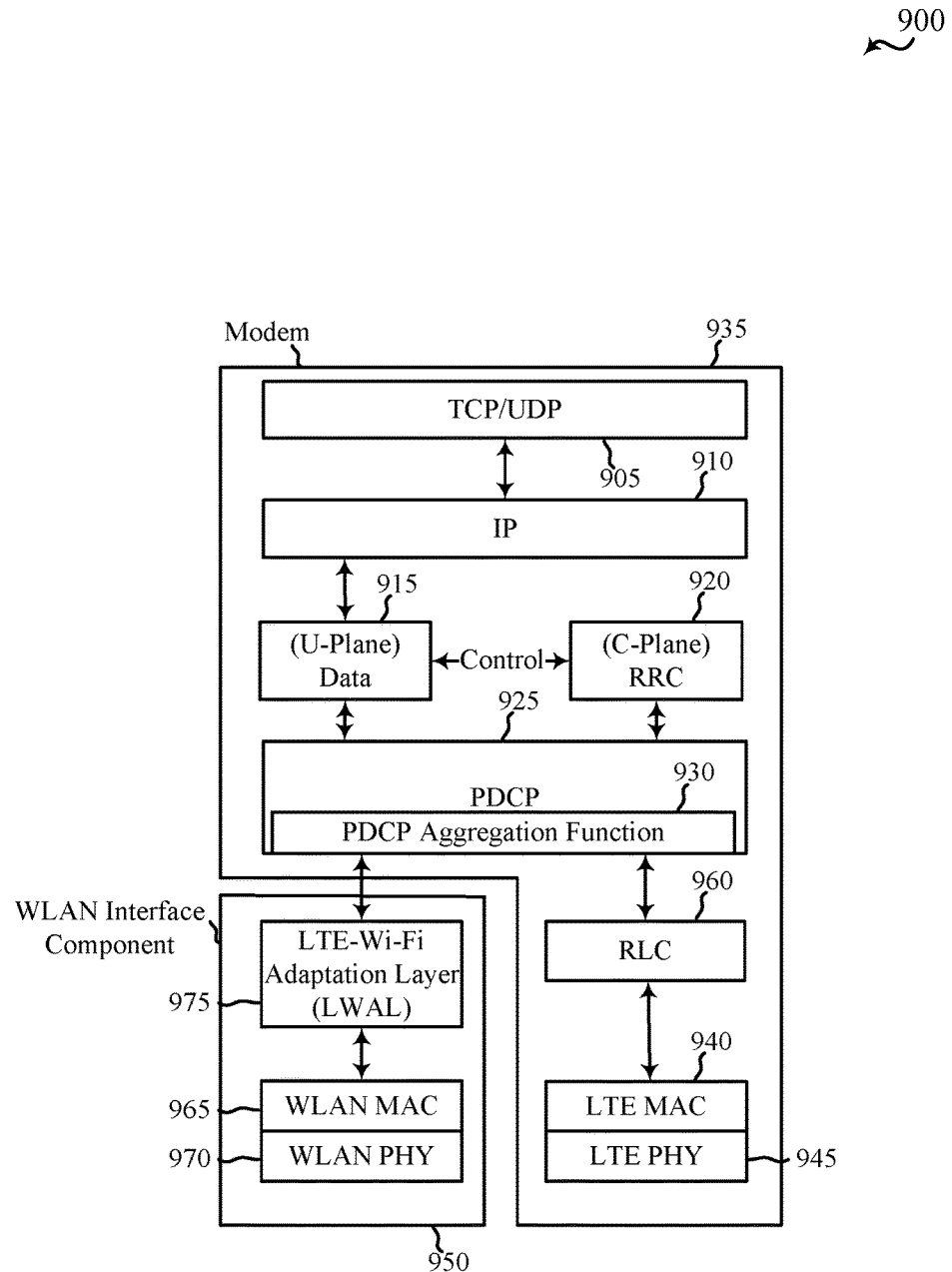
FIG. 9 illustrates an example protocol stack of a LWA-enabled apparatus, in accordance with various aspects of the present disclosure.

FIG. 9 illustrates an example protocol stack 900 of a LWA-enabled apparatus, in accordance with various aspects of the present disclosure. The protocol stack 900 may include a TCP/UDP layer 905, an IP layer 910, a control plane layer (including a data control plane layer (U-Plane 915) and a RRC control plane layer (C-Plane 920), and a PDCP layer 925. The TCP/UDP layer 905 may communicate bi-directionally with the IP layer 910. The IP layer 910 may communicate bi-directionally with the data control plane layer (U-Plane 915). The data plane control plane layer (U-Plane 915) may communicate bi-directionally with the RRC layer (C-Plane 920). Each of the data control plane layer (U-Plane 915) and the RRC layer (C-Plane 920) may communicate bi-directionally with the PDCP layer 925. The PDCP layer 925 may include a PDCP aggregation component 930 (or function) for communicating with lower layers.

The PDCP layer 925 or PDCP aggregation component 930 may provide a LTE/LTE-A interface, and may communicate bi-directionally with LTE/LTE-A PHY/MAC layers (e.g., a LTE MAC layer 940 and LTE PHY layer 945), and/or with the bi-directional communication optionally occurring via a LTE/LTE-A RLC layer 960. The PDCP layer 925 or PDCP aggregation component 930 may also provide a WLAN interface, and may communicate bi-directionally with, WLAN PHY/MAC layers (e.g., a WLAN MAC layer 965 and WLAN PHY layer 970). Communication between the PDCP layer 925 or PDCP aggregation component 930 and the WLAN PHY/MAC layers may occur via a LTE-WLAN aggregation layer (or LTE-Wi-Fi aggregation layer (LWAL)) 975.

In some examples, the LTE-WLAN adaptation layer and WLAN PHY/MAC layers may be provided by a WLAN interface component 950, and the remainder of the layers may be provided by a modem 935, with the WLAN interface component 950 being connected to the modem 935. WLAN packets may therefore need to be transferred from a memory of the WLAN interface component 950 to the modem 935, or from the modem 935 to the WLAN interface component 950. Some of the techniques described in the present disclosure improve the efficiency of packet transfers between the WLAN interface component 950 and the modem 935.

Figure 10:
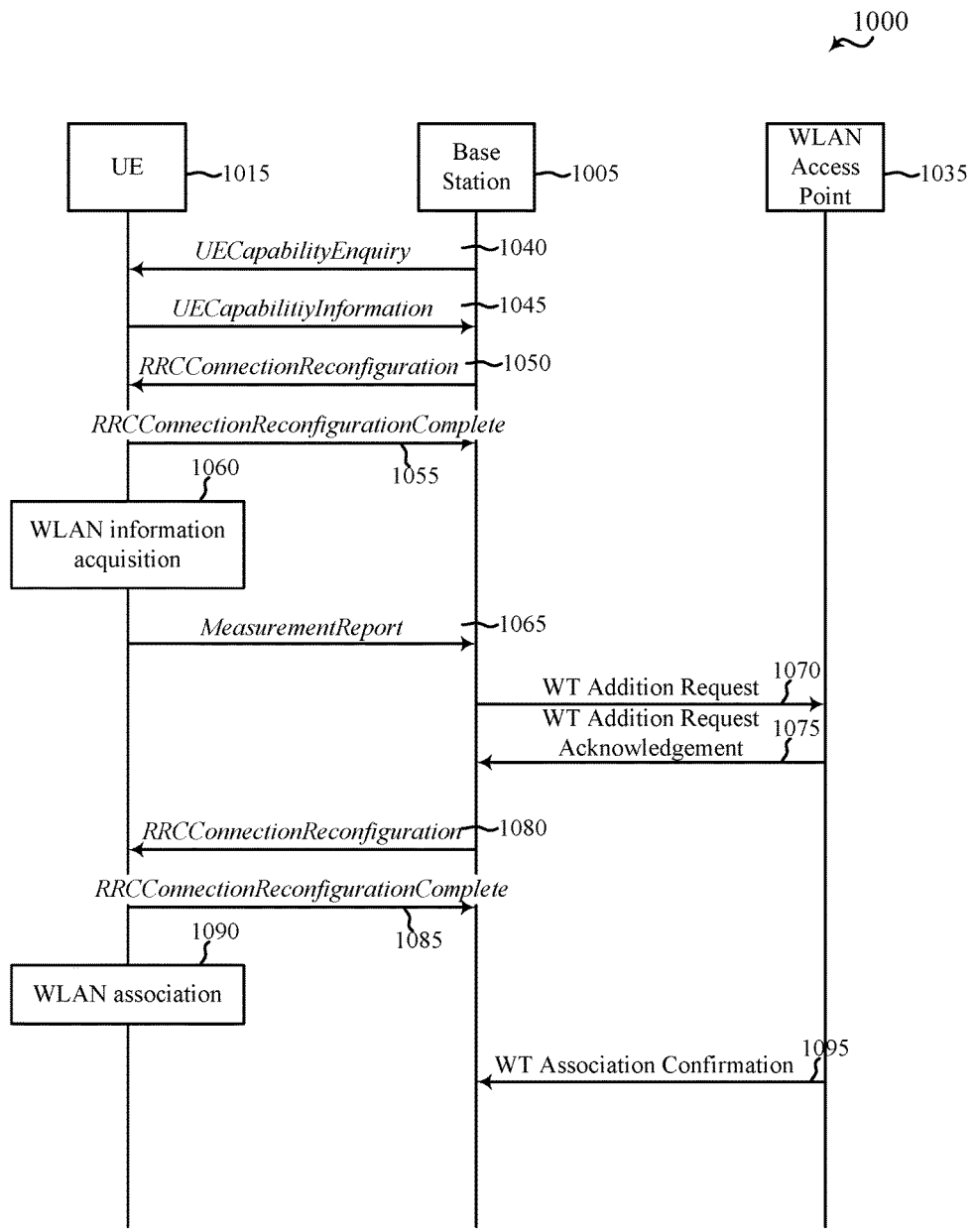
FIG. 10 illustrates an example LWA call flow in which a WLAN access point, providing WLAN termination (WT) for a LTE/LTE-A network, is allocated to a UE, in accordance with various aspects of the present disclosure.
Figure 11:
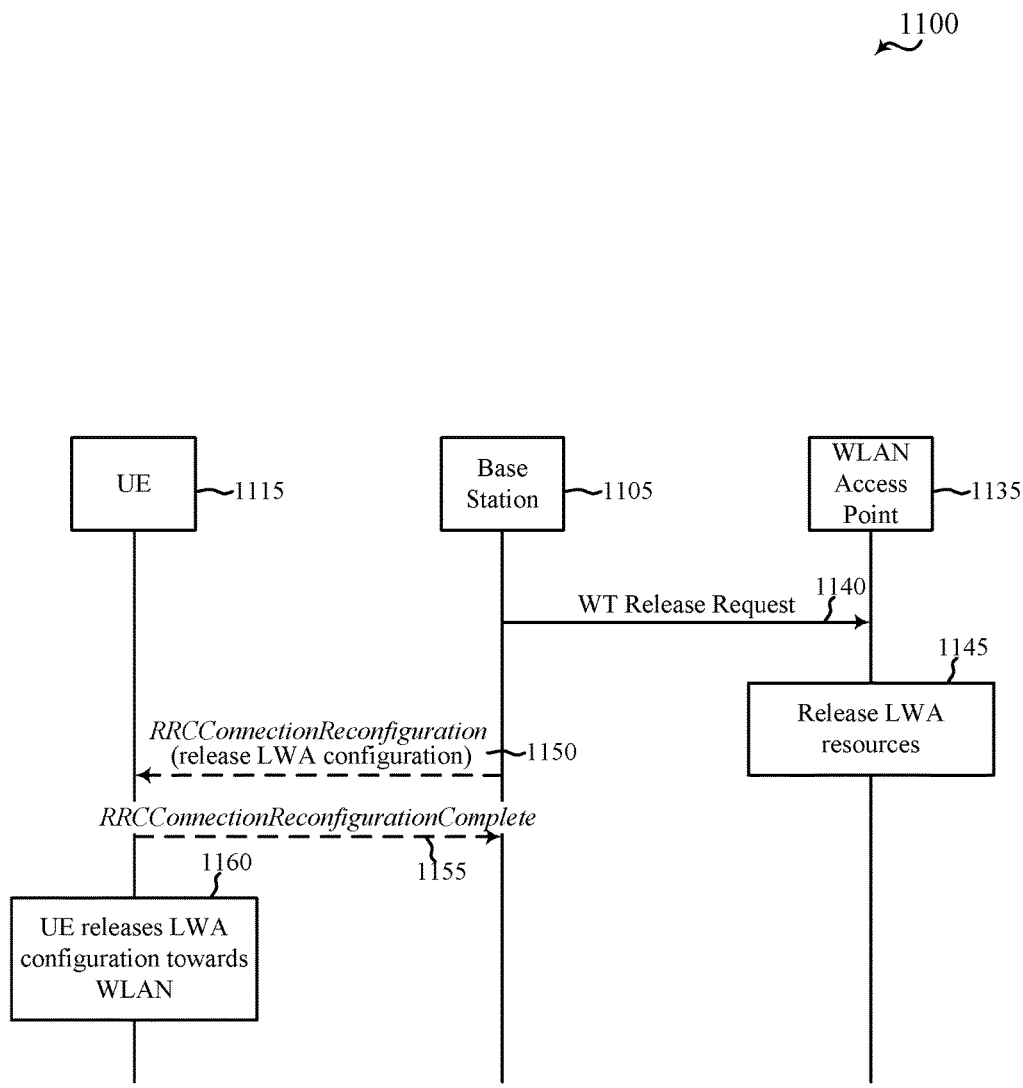
FIG. 11 illustrates an example LWA call flow in which a WLAN access point providing WLAN termination (WT) for a LTE/LTE-A network is de-allocated with respect to a UE, in accordance with various aspects of the present disclosure.
Figure 12:
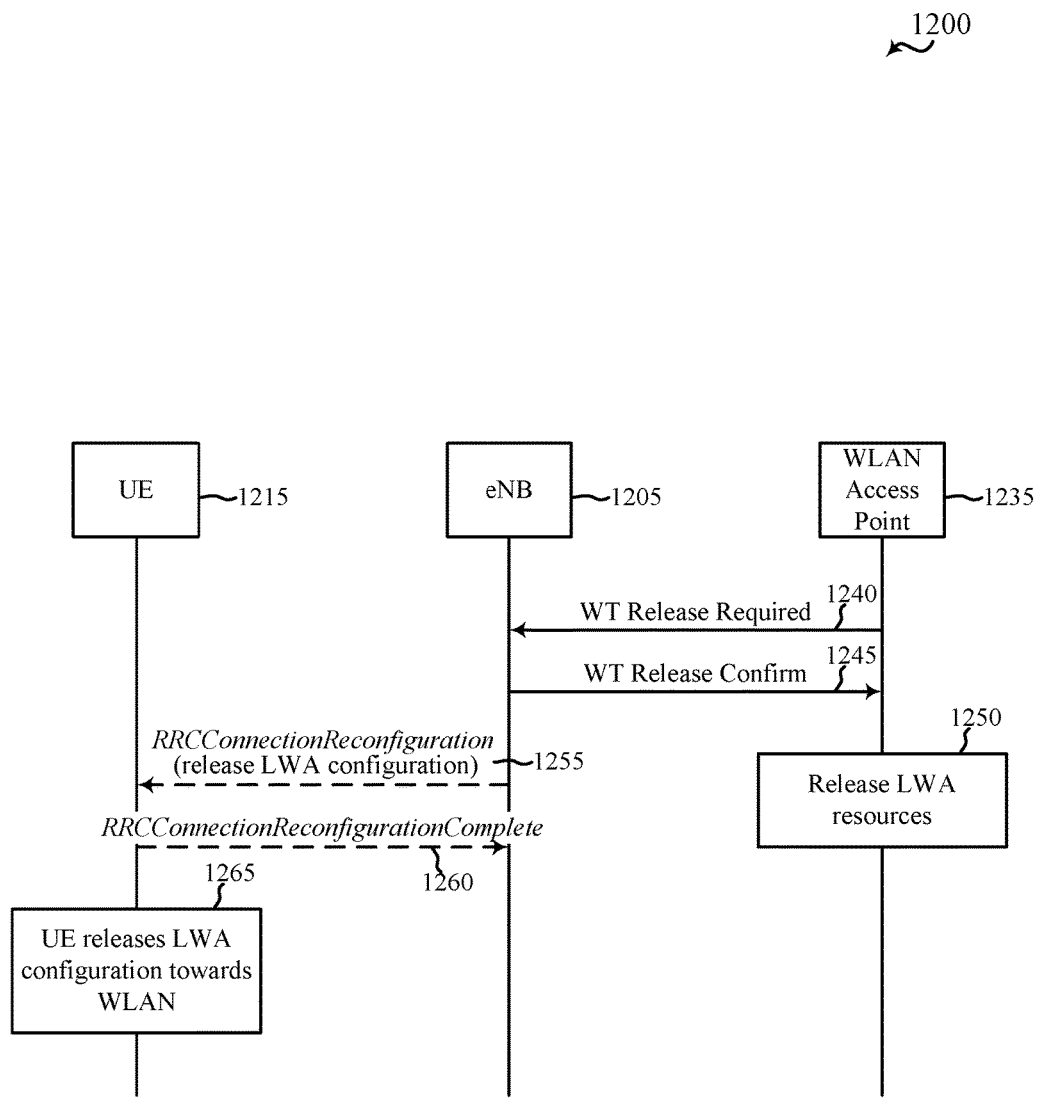
FIG. 12 illustrates an example LWA call flow in which a WLAN access point, providing WLAN termination (WT) for a LTE/LTE-A network, initiates de-allocation of the WLAN access point with respect to a UE, in accordance with various aspects of the present disclosure.

FIGS. 10, 11, and 12 illustrate various high level LWA call flows. FIG. 10 illustrates an example LWA call flow 1000 in which a WLAN access point 1035, providing WLAN termination (WT) for a LTE/LTE-A network, is allocated to a UE 1015, in accordance with various aspects of the present disclosure. The LWA call flow 1000 shows messages transmitted between the UE 1015, a base station 1005 (e.g., an eNB), and the WLAN access point 1035.

The LWA call flow 1000 may include transmission of a UE capability enquiry (UECapabilityEnquiry) 1040 from the base station 1005 to the UE 1015. The UE 1015 may respond to the UE capability enquiry 1040 by indicating its capability to operate in a LWA mode (e.g., in UECapabilityInformation 1045). When the UE capability information indicates the UE 1015 is capable of operating in a LWA mode, the base station 1005 may transmit RRC connection reconfiguration information (RRCConnectionReconfiguration 1050) to the UE 1015. After performing a first RRC connection reconfiguration in response to the RRC connection reconfiguration information, the UE 1015 may acknowledge completion of the RRC connection reconfiguration (e.g., in a first RRCConnectionReconfigurationComplete message 1055).

Following the first RRC connection reconfiguration, the UE may acquire WLAN information at 1060 (e.g., measurements of WLAN signals received from one or more WLAN access points) and transmit a measurement report (e.g., a MeasurementReport 1065) to the base station 1005. The base station 1005 may identify a WLAN access point 1035 for providing WT and transmit a WT addition request 1070 to the identified WLAN access point 1035. In response, the WLAN access point 1035 may acknowledge the WT addition request 1070 (e.g., at 1075). The base station 1005 may then transmit additional RRC connection reconfiguration information (RRCConnectionReconfiguration 1080) to the UE 1015. After performing an RRC connection reconfiguration in response to the RRC connection reconfiguration information, the UE 1015 may acknowledge completion of the RRC connection reconfiguration (e.g., in a second RRCConnectionReconfigurationComplete message 1085).

At 1090, following the second RRC connection reconfiguration, the UE may associate with the WLAN access point 1035; and at 1095, the WLAN access point 1035 may confirm, to the base station 1005, a WT association with the UE 1015.

FIG. 11 illustrates an example LWA call flow 1100 in which a WLAN access point 1135 providing WLAN termination (WT) for a LTE/LTE-A network is de-allocated with respect to a UE 1115, in accordance with various aspects of the present disclosure. The LWA call flow 1100 shows messages transmitted between a UE 1115, a base station 1105 (e.g., an eNB), and the WLAN access point 1135.

The LWA call flow 1100 may include transmission of a WT Release Request message 1140 from the base station 1105 to the WLAN access point 1135. In response to receiving the WT Release Request message 1140, the WLAN access point 1135 may release LWA resources at 1145. The base station 1105 may also transmit RRC connection reconfiguration information (e.g., RRCConnectionReconfiguration 1150) to the UE 1115. The RRC connection reconfiguration information may include a "release LWA configuration." After performing an RRC connection reconfiguration in response to the RRC connection reconfiguration information, the UE 1115 may acknowledge completion of the RRC connection reconfiguration (e.g., in a RRCConnectionReconfigurationComplete message 1155). At 1160, the UE 1115 may release its LWA configuration with the WLAN access point 1135.

FIG. 12 illustrates an example LWA call flow 1200 in which a WLAN access point 1235, providing WLAN termination (WT) for a LTE/LTE-A network, initiates de-allocation of the WLAN access point 1235 with respect to a UE 1215, in accordance with various aspects of the present disclosure. The LWA call flow 1200 shows messages transmitted between a UE 1215, a base station 1205 (e.g., an eNB), and the WLAN access point 1235.

The LWA call flow 1200 may include transmission of a WT Release Required message 1240 from the WLAN access point 1235 to the base station 1205. In response to receiving the WT Release Required message 1240, the base station 1205 may transmit a WT Release Confirm message 1245 to the WLAN access point 1235. In response to receiving the WT Release Confirm message 1245, the WLAN access point 1235 may release LWA resources at 1250. In response to receiving the WT Release Required message 1240, the base station 1205 may transmit RRC connection reconfiguration information (e.g., RRCConnectionReconfiguration 1255) to the UE 1215. The RRC connection reconfiguration information may include a "release LWA configuration." After performing an RRC connection reconfiguration in response to the RRC connection reconfiguration information, the UE 1215 may acknowledge completion of the RRC connection reconfiguration (e.g., in a RRCConnectionReconfigurationComplete message 1260). At 1265, She UE 1215 may release its LWA configuration with the WLAN access point 1265.

Figure 13:
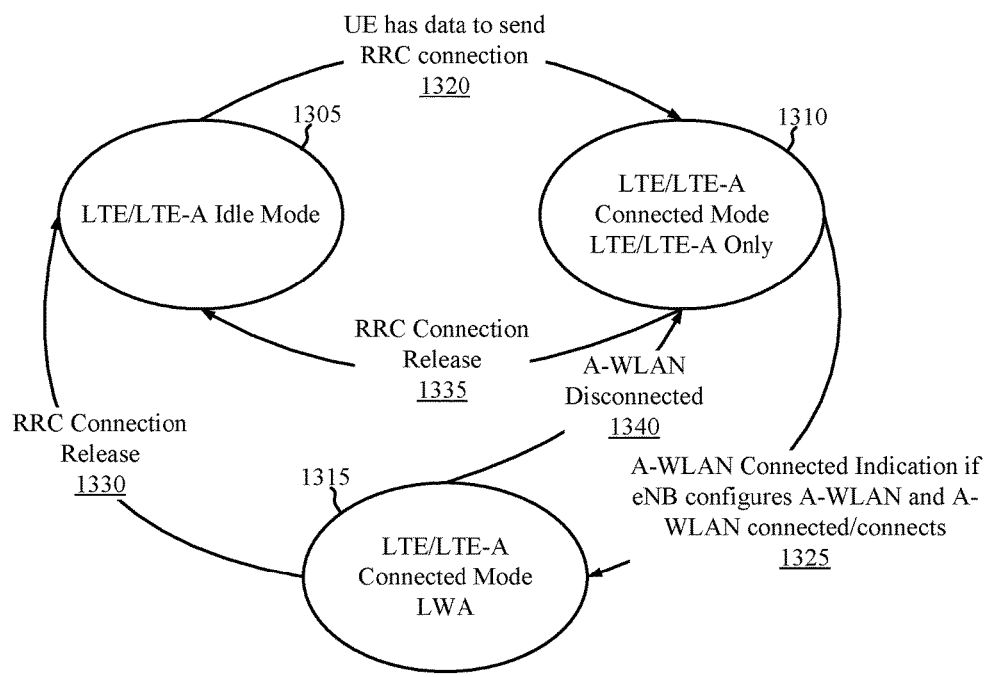
FIG. 13 illustrates a state diagram of LTE/LTE-A idle and connected states, in accordance with various aspects of the present disclosure.

FIG. 13 illustrates a state diagram 1300 of LTE/LTE-A idle and connected states, in accordance with various aspects of the present disclosure. The state diagram 1300 includes a LTE/LTE-A idle mode state 1305, a LTE/LTE-A connected mode state 1310 using LTE/LTE-A, and a LTE/LTE-A connected mode state 1315 using LWA. The LTE/LTE-A connected mode state 1315 using LWA may be a sub-state of the LTE/LTE-A connected mode state 1310 using LTE/LTE-A.

When in the LTE/LTE-A idle mode state 1305, a UE may identify data to send (at 1320) and establish a RRC connection with a base station (e.g., an eNB). Upon establishing the RRC connection, the UE may transition to the LTE/LTE-A connected mode state 1310 using LTE/LTE-A. In some examples, the base station may provide the UE with one or more uplink grants for transmitting data to the base station. In some examples, the base station may allocate a WLAN access point to provide WT for the UE (at 1325) and initiate a transition of the UE from the LTE/LTE-A connected mode state 1310 using LTE/LTE-A to the LTE/LTE-A connected mode state 1315 using LWA. The UE may then be enabled to transmit data to the base station or the WLAN access point, as determined by the base station.

When the UE has no more data to transmit, the base station or WLAN access point may de-allocate (and disconnect) the WT and initiate a RRC connection release (at 1330). The RRC connection release may initiate (at 1340) the UE's transition from the LTE/LTE-A connected mode state 1315 using LWA to the LTE/LTE-A connected mode state 1310 using LTE/LTE-A. The base station may also initiate a RRC connection release at 1335, which may cause the UE to transition from the LTE/LTE-A connected mode state using LTE/LTE-A to the LTE/LTE-A idle mode state 1305.

In some examples, association with an A-WLAN may only be attempted when a UE is in the LTE/LTE-A connected mode state 1310 using LTE/LTE-A. In some examples, a UE may not autonomously enter the LTE/LTE-A connected mode state 1315 using LWA. In some examples, a high level operating system (HLOS) driven WLAN connection may take priority over an A-WLAN connection.

As shown in FIG. 9, PDCP functionality may reside in a modem (e.g., in a WWAN processing subsystem). When re-ordering packets that are received over a LTE/LTE-A interface and a WLAN interface, PDCP packets received via the WLAN interface may be routed through the modem. Re-ordering and deciphering of the PDCP packets may then be performed by the modem. In some examples, PDCP packets received by a WLAN interface component may be transferred to an intake memory associated with an application processor subsystem (i.e., an application processing subsystem), and from the intake memory to a modem memory associated with the modem (or to a cache or buffer associated with the modem). After PDCP packet re-ordering and deciphering is performed by the modem, a hardware (HW) accelerator of the modem (or similar functionality provided by HW, software (SW), firmware (FW), or a combination thereof) may write in-order IP packets from the modem memory to a destination memory associated with the application processor subsystem.

In an alternative to transferring entire PDCP packets from the intake memory to the modem memory, a subset of the data associated with WLAN packets (e.g., PDCP packet headers and/or metadata, another subset of associated data) may be transferred from the intake memory to the modem memory (or to a cache or buffer associated with the modem), and re-ordering may be based on the subset of the data (e.g., PDCP packet headers and/or metadata). In some examples, the subset of the data (e.g., metadata) may be generated by the WLAN subsystem. For example, the WLAN subsystem may generate an aggregate or block of metadata that indicates the status of a plurality of received PDCP PDUs. In some examples, the metadata may be formatted as described with reference to FIG. 20. Signaling metadata associated with a block of PDCP PDUs can provide greater efficiency compared with using and indicating (e.g., separately signaling) metadata for each received PDCP PDU. For example, signaling metadata associated with a block of PDCP PDUs may limit the number of interrupts used to handle (e.g., signal) metadata for the PDCP PDUs. PDCP packets stored in the intake memory may be deciphered and transferred from the intake memory to the destination memory based at least in part on a PDCP packet re-ordering generated by the modem. The modem may provide information to a WLAN driver in order to free the memory associated with a block of metadata for reuse.

In some examples, a control interface and a data interface may be provided between an application processor subsystem and a modem. The control interface may be used to pass, from the modem to the application processor subsystem, one or more of an indication of LWA enablement/disablement or an indication of a mobility set (e.g., SSID/BSSID/HESSID). The control interface may also be used to pass, from the application processor subsystem to the modem, an association/disassociation with a specific BSSID. The control interface may also be used to pass WLAN measurement requests (from the modem to the application processor subsystem) and WLAN measurement responses (from the application processor subsystem to the modem). The data interface may be used to pass one or more of the following: PDCP PDUs (from the application processor subsystem to the modem for PDCP processing); bearer identifiers (IDs) in LWA headers of PDCP PDUs, to identify the appropriate PDCP instance to forward to; or in-order IP packets (from the modem to the application processor subsystem).

Figure 14:
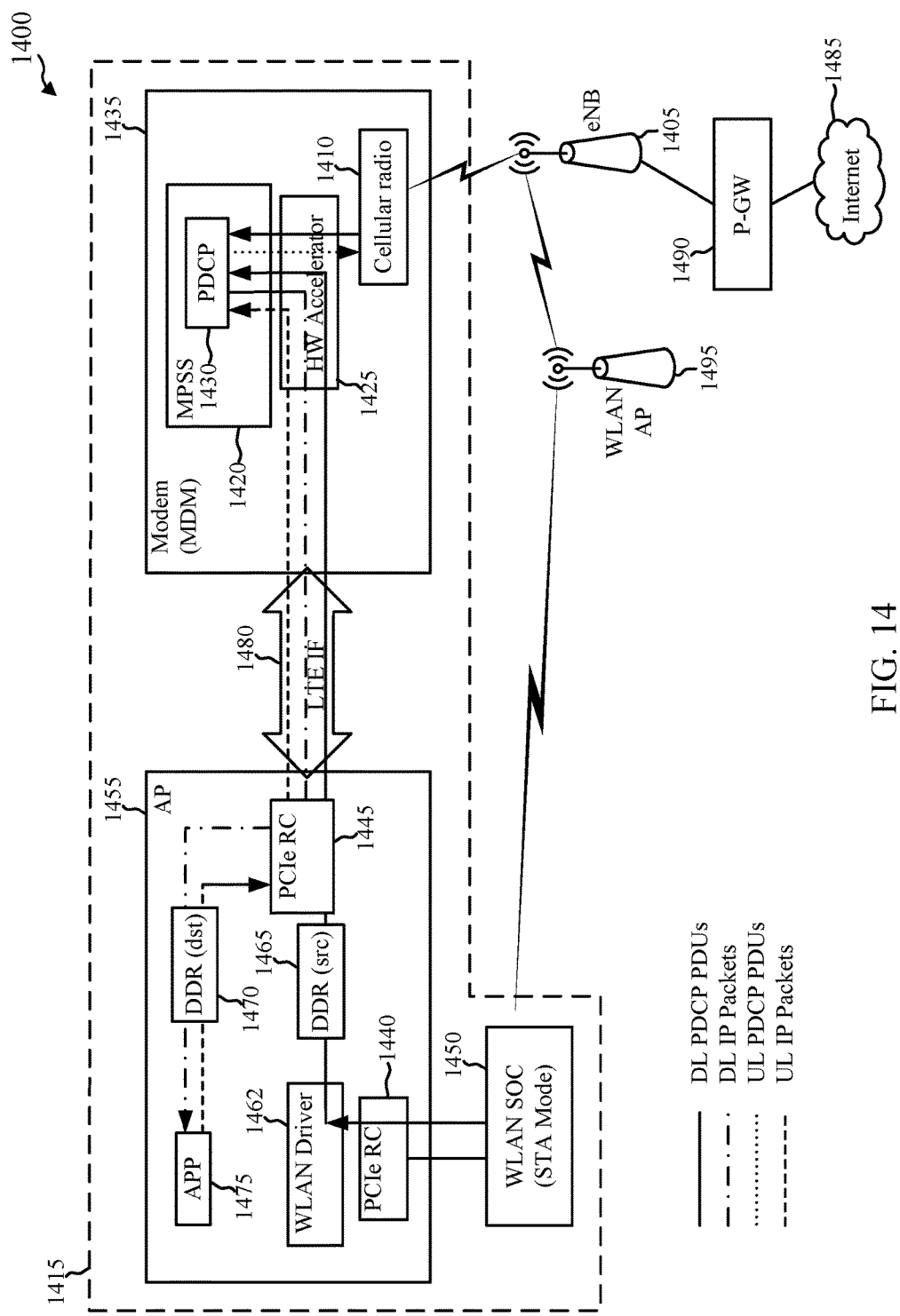
FIG. 14 illustrates a data plane block diagram of an apparatus (e.g., a UE) operating in a LWA mode, in accordance with various aspects of the present disclosure.

FIG. 14 illustrates a data plane block diagram 1400 of an apparatus (e.g., a UE 1415) operating in a LWA mode, in accordance with various aspects of the present disclosure. The apparatus includes a modem 1435 (e.g., a WWAN processing subsystem), a WLAN interface component 1450, and an application processor subsystem 1455 (e.g., an application processing subsystem). The WLAN interface component 1450 and portions of the application processor subsystem 1455 may define a WLAN processing subsystem.

The modem 1435 may include a cellular radio 1410, a modem processor subsystem (MPSS) 1420, and HW accelerator 1425 (e.g., an IP packet assembler (IPA), or functionality similar to that of a HW accelerator provided by HW, SW, FW, or a combination thereof). The MPSS 1420 may include a PDCP layer (PDCPL) including a PDCP aggregation component 1430. The application processor subsystem 1455 may include a first PCIe component 1440, a second PCIe component 1445, a WLAN driver 1462, an intake memory 1465 (e.g., a double data rate (DDR) source (src) memory), a destination memory 1470 (e.g., a DDR destination (dst) memory), and an application processor (APP) 1475. The WLAN interface component 1450 may communicate with the application processor subsystem 1455 using a first interface (e.g., the first PCIe component 1440), and the modem 1435 may communicate with the application processor subsystem 1455 using a second interface (e.g., a LTE/LTE-A interface 1480 established over a PCIe interface).

In a downlink mode of operation, a base station 1405 of a LTE/LTE-A network may receive PDCP PDUs from the Internet 1485 (or other network) via a packet gateway (P-GW) 1490. The base station 1405 may forward a first set of the PDCP PDUs to the UE 1415 over a dedicated (or licensed) radio frequency spectrum band, such as a LTE/LTE-A radio frequency spectrum band. The first set of PDCP PDUs may be received by the cellular radio 1410 of the modem 1435 and forwarded, by the HW accelerator 1425, to the PDCP aggregation component 1430 of the MPSS 1420. The base station 1405 may forward a second set of PDCP PDUs to a WLAN access point 1495, which WLAN access point 1495 may forward the second set of the PDCP PDUs to the UE 1415 as WLAN (PDCP PDU) packets over a shared (or unlicensed) radio frequency spectrum band, such as a WLAN radio frequency spectrum band. The second set of PDCP PDUs may be received by the WLAN interface component 1450 and transferred to the application processor subsystem 1455 via the first PCIe component 1440 and the WLAN driver 1462. Upon transfer to the application processor subsystem 1455, the PDCP PDUs in the second set of PDCP PDUs may be stored in the intake memory 1465. The HW accelerator 1425 may retrieve PDCP PDUs in the second set of PDCP PDUs via the second PCIe component 1445 and the LTE/LTE-A interface 1480. The PDCP aggregation component 1430 may re-order and decipher the PDCP PDUs of the first set of PDCP PDUs and the second set of PDCP PDUs and transfer in-order IP packets to the application processor subsystem 1455 via the HW accelerator 1425, LTE/LTE-A interface 1480, and second PCIe component 1445 The in-order IP packets may be stored in the destination memory 1470 for retrieval by the application processor 1475.

In an uplink mode of operation, the application processor 1475 may store in-order IP packets in the destination memory 1470. The HW accelerator 1425 may retrieve the in-order IP packets via the second PCIe component 1445 and the LTE/LTE-A interface 1480. The PDCP layer may generate a plurality of PDCP PDUs from the in-order IP packets, for transmission to the base station 1405 via the HW accelerator 1425, the cellular radio 1410, and the dedicated (or licensed) radio frequency spectrum band.

Figure 15:
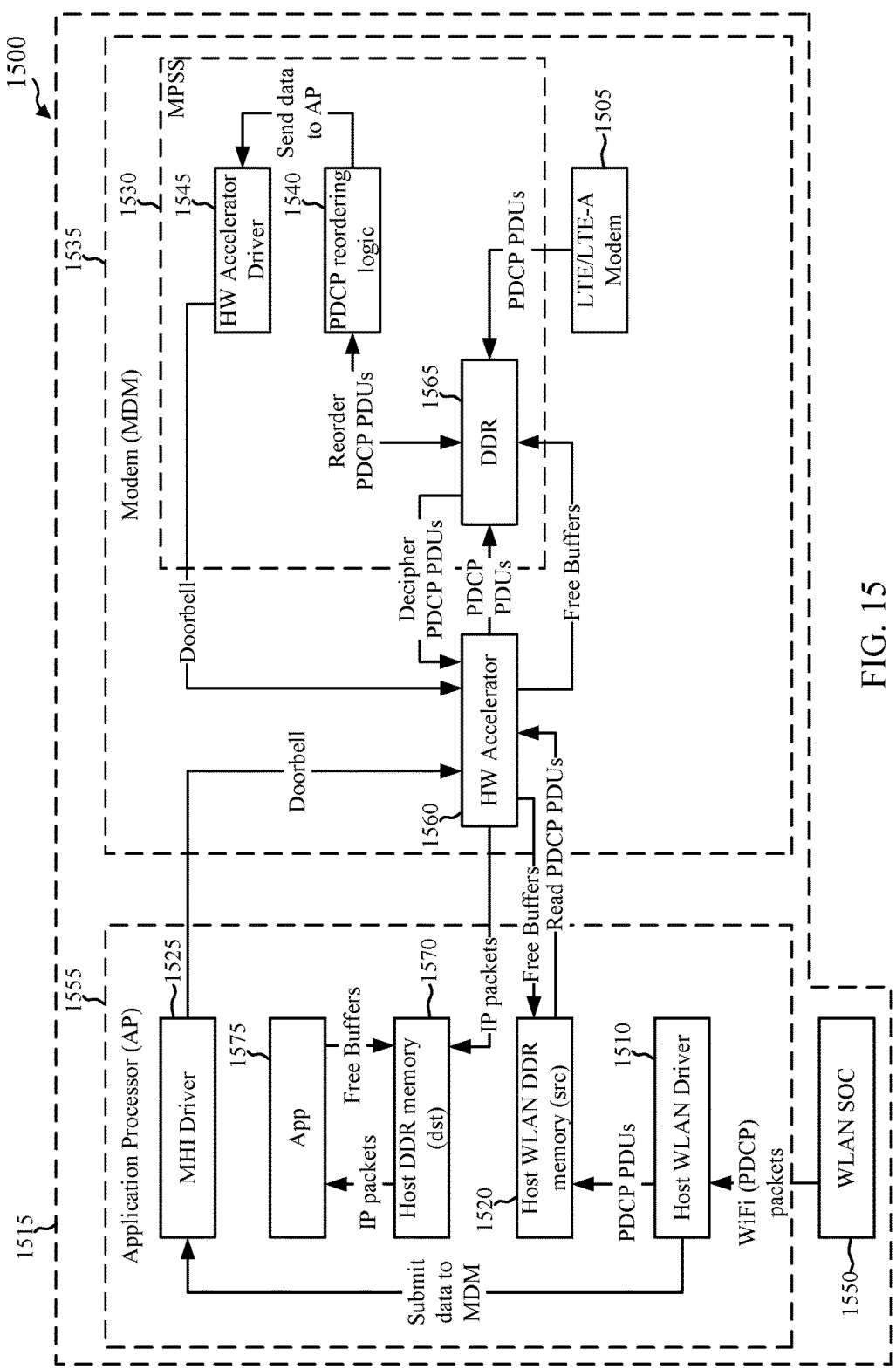
FIG. 15 shows a block diagram of a UE that receives PDCP PDUs while operating in a LWA mode, in accordance with various aspects of the present disclosure.

FIG. 15 shows a block diagram 1500 of a UE 1515 that receives PDCP PDUs while operating in a LWA mode, in accordance with various aspects of the present disclosure. The UE 1515 includes a modem 1535 (e.g., a WWAN processing subsystem), a WLAN interface component 1550, and an application processor subsystem 1555 (e.g., an application processing subsystem), which may be examples of aspects of the modem 1435, the WLAN interface component 1450, and the application processor subsystem 1455 described with reference to FIG. 14. The WLAN interface component 1450 and portions of the application processor subsystem 1455 may define a WLAN processing subsystem. The modem 1535 may include a LTE/LTE-A modem 1505.

The LTE/LTE-A modem 1505 may receive WWAN (PDCP PDU) packets over a dedicated (or licensed) radio frequency spectrum band, such as a LTE/LTE-A radio frequency spectrum band, and the WLAN interface component 1550 may receive WLAN (PDCP PDU) packets (e.g., Wi-Fi (PDCP) packets) over a shared (or unlicensed) radio frequency spectrum band, such as a WLAN radio frequency spectrum band. The WLAN (PDCP PDU) packets may be transferred from the WLAN interface component 1550 to the application processor subsystem 1555 via the WLAN driver 1510, which may store the PDCP PDUs in the intake memory 1520 (e.g., host WLAN DDR memory (src)), and signal the storage of PDCP PDUs in the intake memory 1520 to a modem host interface (MHI) driver 1525. The MHI driver 1525 may signal (e.g., provide a doorbell) to a HW accelerator 1560 of the modem 1535 that PDCP PDUs have been stored in the intake memory. In some examples, the HW accelerator 1560 may include an IP packet assembler (IPA), or functionality similar to that provided by the HW accelerator may be provided by HW, SW, FW, or a combination thereof. The HW accelerator 1560 may perform a read operation to retrieve PDCP PDUs stored in the intake memory 1520, and may perform a write operation to store the PDCP PDUs in a modem memory 1565 (e.g., DDR). Upon retrieving PDCP PDUs from the intake memory 1520, the HW accelerator 1560 may free the buffers of the intake memory 1520 that were used to store the retrieved PDCP PDUs. PDCP reordering logic 1540 of the MPSS 1530 may re-order the PDCP PDUs stored in the modem memory 1565 (which PDCP PDUs may include PDCP PDUs received from the LTE/LTE-A modem 1505 and/or the WLAN interface component 1550). Upon re-ordering a group of PDCP PDUs in the modem memory 1565, the PDCP reordering logic 1540 may notify the HW accelerator driver 1545, which may notify the HW accelerator 1560 (e.g., provide a doorbell). The HW accelerator 1560 may then perform a read operation to retrieve the re-ordered PDCP PDUs from the modem memory 1565, and may free the buffers of the modem memory 1565 that were used to store the retrieved PDCP PDUs. The HW accelerator 1560 may also decipher the re-ordered PDCP PDUs. The HW accelerator 1560 may write in-order IP packets based on the re-ordered PDCP PDUs to a destination memory 1570 (e.g., host DDR memory (dst)) associated with the application processor subsystem 1555. The in-order IP packets may be retrieved by an APP 1575 of the application processor subsystem 1555. Upon retrieving in-order IP packets from the destination memory 1570, the APP 1575 may free the buffers of the destination memory 1570 that were used to store the in-order IP packets.

Due to WLAN automatic repeat request (ARQ) processes, a large number of PDCP PDUs associated with a big burst of WLAN packets may build up in the intake memory 1520 of an application processor subsystem 1555. In some examples, this build-up of PDCP PDUs may be alleviated by providing a modem memory 1565 that is equal or greater in size than the intake memory 1520, and off-loading PDCP PDUs from the intake memory 1520 to mitigate PDCP PDU build-up. In other examples, the size of the modem memory 1565 may be decreased by implementing a flow control between the modem 1535 and the application processor subsystem 1555. For example, a one megabit (1 Mbit) block of a 10 Mbit build-up of PDCP PDUs buffered in the intake memory 1520 may be transferred to the modem memory 1565. PDCP PDUs received from the application processor subsystem 1555 and PDCP PDUs received directly by the modem 1535 (e.g., via the LTE/LTE-A modem 1505) may then be re-ordered and deciphered, and a 1 Mbit block of in-order IP packets may be written to the destination memory 1570 of the application processor subsystem 1555. Upon freeing the buffers used to store the 1 Mbit block written to the destination memory 1570, a next 1 Mbit block of PDCP PDUs may be transferred from the intake memory 1520 to the modem memory 1565.

Flow control between the modem 1535 and the application processor subsystem 1555 may also be used to retrieve a number of PDCP PDUs from the intake memory 1520, and based at least in part on subframe numbers (SNs) associated with the PDCP PDUs, determine whether to retrieve additional PDCP PDUs from the intake memory 1520. For example, if a highest SN of a PDCP PDU received by the LTE/LTE-A modem 1505 is 100, and a SN associated with a last PDCP PDU retrieved from the intake memory 1520 is 200, no more PDCP PDUs may be retrieved from the intake memory 1520 until the LTE/LTE-A modem 1505 receives a PDCP PDU associated with SN 199 or a re-ordering timer expires. This is because WLAN (PDCP PDU) packets are delivered in SN order, and there is no need to retrieve additional PDCP PDUs from the intake memory 1520 when the next PDCP PDU needed in the re-ordering process will be received at the LTE/LTE-A modem 1505.

In some examples, different types of flow control may be provided between the modem 1535 and the application processor subsystem 1555, such as a combination of the flow control types described above.

Figure 16:
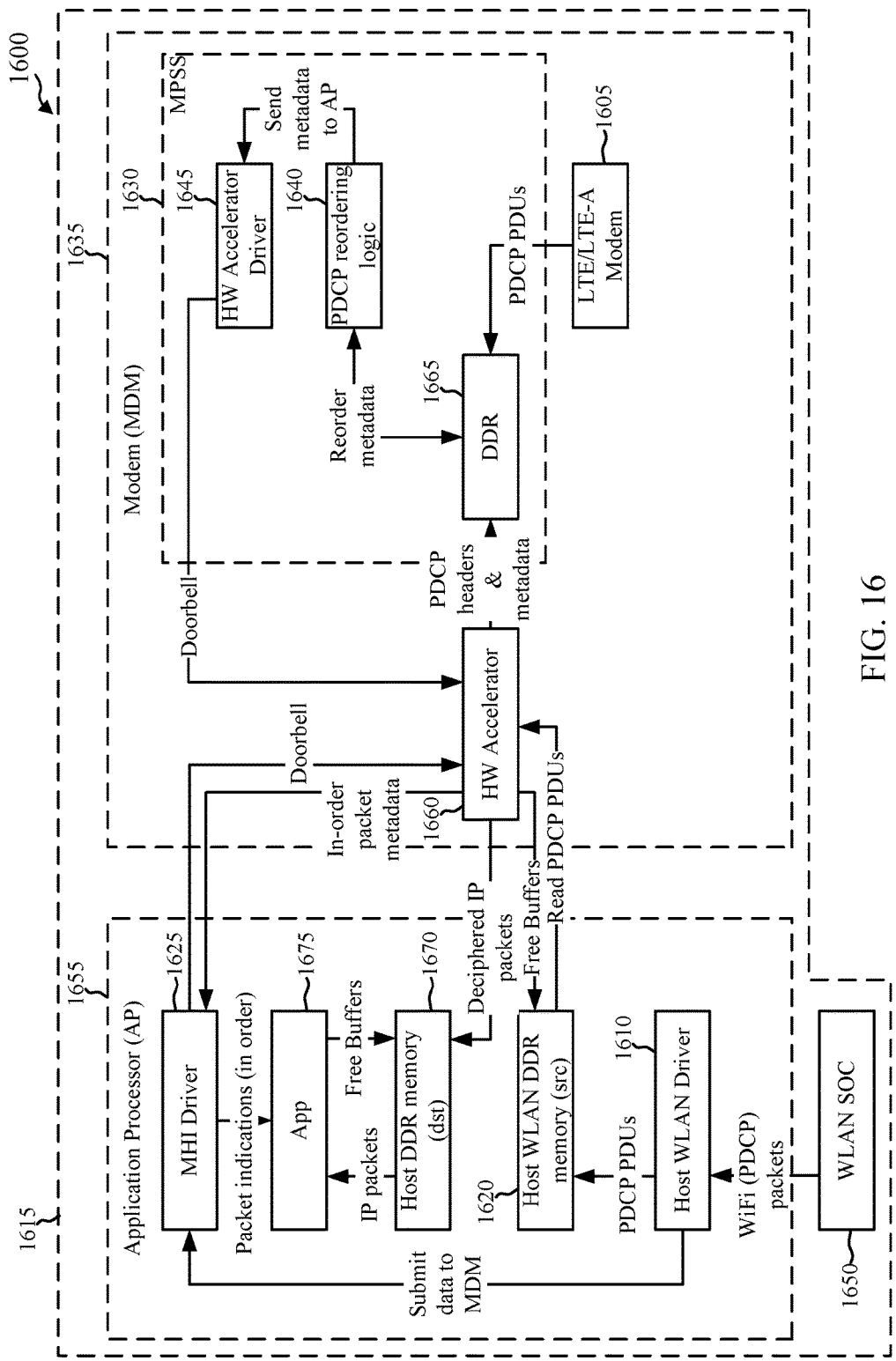
FIG. 16 shows a block diagram of a UE that receives PDCP PDUs while operating in a LWA mode, in accordance with various aspects of the present disclosure.

FIG. 16 shows a block diagram 1600 of a UE 1615 that receives PDCP PDUs while operating in a LWA mode, in accordance with various aspects of the present disclosure. The UE 1615 includes a modem 1635 (e.g., a WWAN processing subsystem), a WLAN interface component 1650, and an application processor subsystem 1655 (e.g., an application processing subsystem), which may be examples of aspects of the modem 1435, the WLAN interface component 1450, and the application processor subsystem 1455 described with reference to FIG. 14. The WLAN interface component 1450 and portions of the application processor subsystem 1455 may define a WLAN processing subsystem. The modem 1635 may include a LTE/LTE-A modem 1605.

The LTE/LTE-A modem 1605 may receive WWAN (PDCP PDU) packets over a dedicated (or licensed) radio frequency spectrum band, such as a LTE/LTE-A radio frequency spectrum band, and the WLAN interface component 1650 may receive WLAN (PDCP PDU) packets (e.g., Wi-Fi (PDCP) packets) over a shared (or unlicensed) radio frequency spectrum band, such as a WLAN radio frequency spectrum band. The WLAN (PDCP PDU) packets may be transferred from the WLAN interface component 1650 to the application processor subsystem 1655 via the WLAN driver 1610, which may store the PDCP PDUs in the intake memory 1620 (e.g., host WLAN DDR memory (src)), and signal the storage of PDCP PDUs in the intake memory 1620 to a modem host interface (MHI) driver 1625. The MHI driver 1625 may signal (e.g., provide a doorbell) to a HW accelerator 1660 of the modem 1635 that PDCP PDUs (and in some examples, a block of PDCP PDUs) have been stored in the intake memory 1620. In some examples, the HW accelerator 1560 may include an IP packet assembler (IPA), or functionality similar to that provided by the HW accelerator may be provided by HW, SW, FW, or a combination thereof. The HW accelerator 1660 may perform a read operation to retrieve PDCP PDUs stored in the intake memory 1620 (and in some examples, retrieve a block of PDCP PDUs), decipher the PDCP PDUs, and temporarily cache the PDCP PDUs (e.g., in static random access memory (SRAM)). Upon retrieving PDCP PDUs from the intake memory 1620, the HW accelerator 1660 may free the buffers of the intake memory 1620 that were used to store the retrieved PDCP PDUs. After deciphering the PDCP PDUs, the HW accelerator 1660 may write deciphered packets to the destination memory 1670 (e.g., host DDR memory (dst)) associated with the application processor subsystem 1655. The HW accelerator 1660 may then read and parse the PDCP PDUs, including LWA headers of the PDCP PDUs, and provide metadata or another subset of data associated with the WLAN packets to the modem memory 1665 (e.g., DDR) and/or PDCP reordering logic 1640. The PDCP reordering logic 1640 of the MPSS 1630 may re-order the PDCP PDU metadata stored in the modem memory 1665 (which metadata may include metadata for PDCP PDUs received from the LTE/LTE-A modem 1605 and/or the WLAN interface component 1650). Upon re-ordering a group of PDCP PDU metadata in the modem memory 1665 (or in a cache memory), the PDCP reordering logic 1640 may notify the HW accelerator driver 1645, which may notify the HW accelerator 1660 (e.g., provide a doorbell). The HW accelerator 1660 may then perform a read operation to retrieve the re-ordered PDCP PDU metadata and WWAN (PDCP PDU) packets from the modem memory 1665 or PDCP reordering logic 1640, and may free the buffers of the modem memory 1665 or PDCP reordering logic 1640 that were used to store the retrieved PDCP PDU metadata and WWAN (PDCP PDU) packets. The HW accelerator 1660 may also decipher the re-ordered PDCP PDUs (e.g., if deciphering was not performed earlier). The HW accelerator 1660 may provide in-order IP packet metadata based on the re-ordered PDCP PDU metadata to the MHI driver 1625, and may write WWAN (PDCP PDU) packets to the destination memory 1670 associated with the application processor subsystem 1655. The in-order IP packet metadata may be provided, by the MHI driver 1625, to an APP 1675 of the application processor subsystem 1655. Upon retrieving in-order IP packets from the destination memory 1670, the APP 1675 may free the buffers of the destination memory 1670 that were used to store the in-order IP packets.

Figure 17:
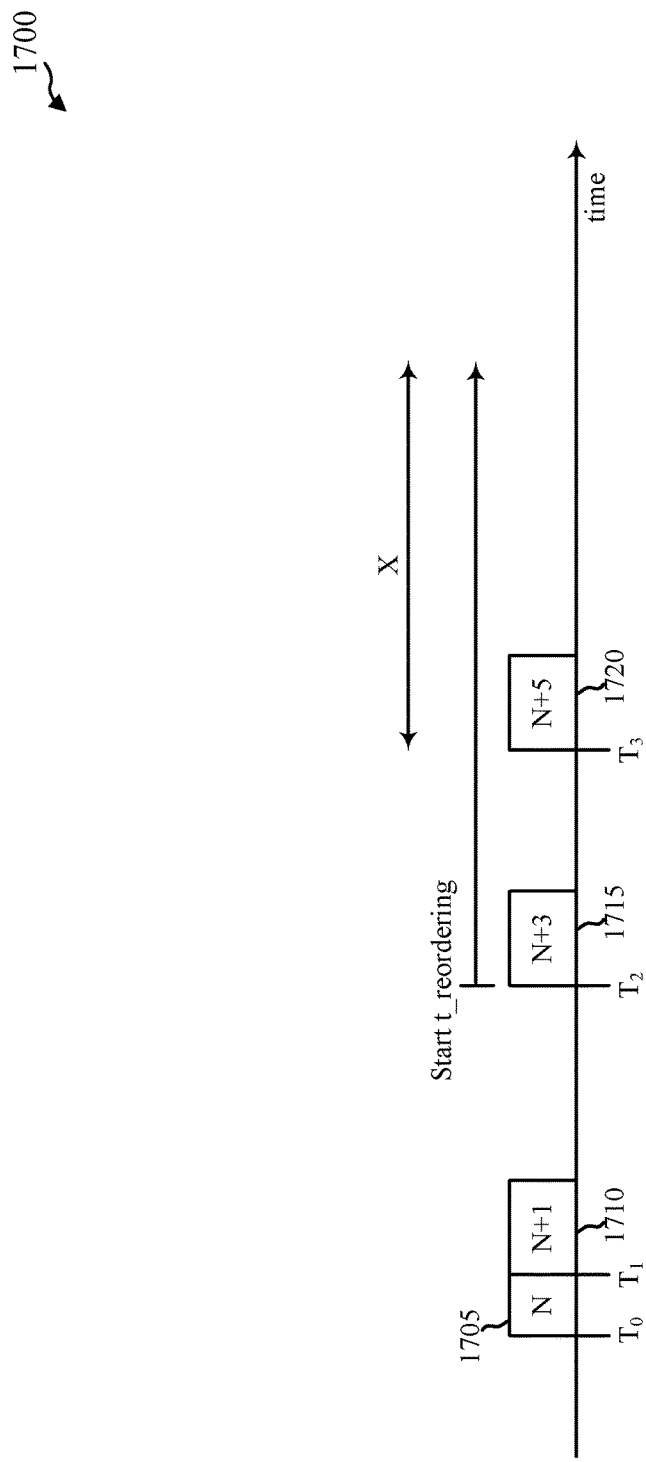
FIG. 17 illustrates a timeline of PDCP PDUs transferred from an application processor subsystem to a modem, and the start and restart of a re-ordering timer (i.e., a timer that determines how long a re-ordering process will wait to receive a missing PDCP PDU over a LTE/LTE-A network before indicating the PDCP PDU is missing), in accordance with various aspects of the present disclosure.

FIG. 17 illustrates a timeline 1700 of PDCP PDUs transferred from an application processor subsystem to a modem, and the start and restart of a re-ordering timer (i.e., a timer that determines how long a re-ordering process will wait to receive a missing PDCP PDU over a LTE/LTE-A network before indicating the PDCP PDU is missing), in accordance with various aspects of the present disclosure.

As shown in FIG. 17, a PDCP PDU 1705 associated with SN N may be transferred from the application processor subsystem to the modem at a time $T_0$; a PDCP PDU 1710 associated with a SN N+1 may be transferred from the application processor subsystem to the modem at a time $T_1$; a PDCP PDU 1715 associated with a SN N+3 may be transferred from the application processor subsystem to the modem at a time $T_2$; and a PDCP PDU 1720 associated with a SN N+5 may be transferred from the application processor subsystem to the modem at a time $T_3$. By way of example, the re-ordering timer may not be running when the PDCP PDU 1705 associated with the SN N and the PDCP PDU 1710 associated with the SN N+1 are transferred from the application processor subsystem to the modem. However, because the PDCP PDU 1715 associated with the SN N+3 is received before a PDCP PDU associated with a SN N+2, the re-ordering timer may be started, with a value of t_reordering, at or shortly after time $T_2$. Upon receipt of the PDCP PDU 1720 associated with the SN N+5 before a PDCP PDU associated with a SN N+4, while the re-ordering timer continues to run and has a remaining duration X, the duration X may be logged, and when the re-ordering timer expires, the re-ordering timer may be started with a delta timer value of t_reordering-X.

Figure 18:
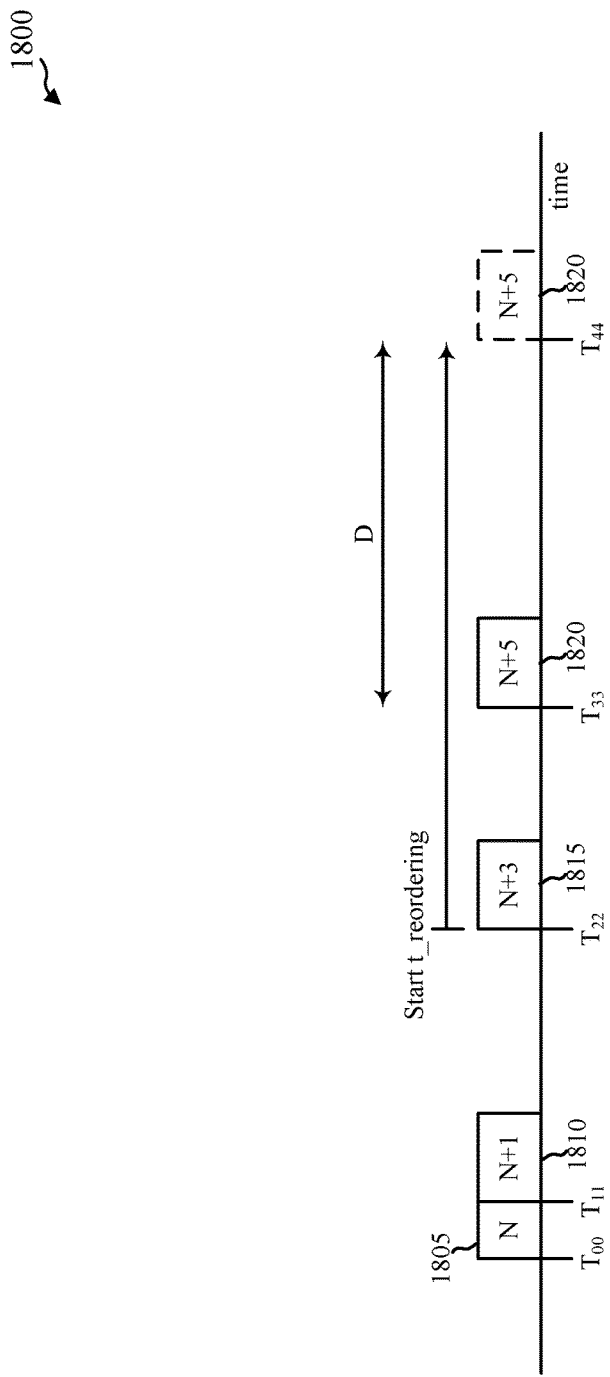
FIG. 18 illustrates a timeline of PDCP PDUs received by an application processor subsystem (e.g., an application processing subsystem), and the start and restart of a re-ordering timer, in accordance with various aspects of the present disclosure.

FIG. 18 illustrates a timeline 1800 of PDCP PDUs received by an application processor subsystem (e.g., an application processing subsystem), and the start and restart of a re-ordering timer, in accordance with various aspects of the present disclosure.

As shown in FIG. 18, a PDCP PDU 1805 associated with SN N may be received by the application processor subsystem at a time $T_{00}$; a PDCP PDU 1810 associated with a SN N+1 may be received by the application processor subsystem at a time $T_{11}$; a PDCP PDU 1815 associated with a SN N+3 may be received by the application processor subsystem at a time $T_{22}$, and a PDCP PDU 1820 associated with a SN N+5 may be received by the application processor subsystem at a time $T_{33}$. By way of example, the re-ordering timer may not be running when the PDCP PDU 1805 associated with the SN N and the PDCP PDU 1810 associated with the SN N+1 are received by the application processor subsystem. However, because the PDCP PDU 1815 associated with the SN N+3 is received before a PDCP PDU associated with a SN N+2, the re-ordering timer may be started, with a value of t_reordering, at or shortly after time $T_{22}$. Upon receipt of the PDCP PDU 1820 associated with the SN N+5 before a PDCP PDU associated with a SN N+4, while the re-ordering timer continues to run and has a remaining duration D, the duration D may be logged, and when the re-ordering timer expires, the re-ordering timer may be started with a delta timer value of t_reordering-D.

When PDCP PDUs received by the application processor subsystem are transferred to a modem for re-ordering, the modem may log a time of receipt of a PDCP PDU as the time the PDCP PDU is transferred from the application processor subsystem to the modem. When PDCP PDUs are not transferred from the application processor subsystem individually, with equal processing delays after being received by the application processor subsystem (e.g., when PDCP PDUs are allowed to build up in an intake memory of the application processor subsystem, and are transferred to the modem in a block transfer), the times of receipt of the PDCP PDUs by the modem may not logically correlate with the times of receipt of the PDCP PDUs by the application processor subsystem. To address this, PDCP PDUs may be transferred from the application processor subsystem to the modem with associated times of receipt by the application processor subsystem. Thus, even when the PDCP PDU 1820 associated with SN N+5 is transferred from the application processor subsystem to the modem at time $T_{44}$, a decision to restart the re-ordering time upon receipt of the PDCP PDU 1820 associated with the SN N+5 will be based at least in part on whether the re-ordering timer is running at time $T_{33}$, and based at least in part on the duration D, thus accounting for the time the PDCP PDU 1802 associated with the SN N+5 sits in the intake memory of the application processor subsystem.

The data plane and data flow described with reference to FIGS. 14 and 15 involve two transfers through the HW accelerator of each DL PDCP PDU received over the WLAN (e.g., a first transfer when transferring the PDCP PDU from the application processor subsystem to the modem, and a second transfer when transferring an in-order IP packet from the modem to the application processor subsystem). The two transfers involve twice the bandwidth used to transfer a DL PDCP PDU received over the LTE/LTE-A network to the application processor subsystem. Reducing the quantity of DL PDCP PDU data transferred through the HW accelerator can reduce a peak data throughput requirement of the HW accelerator and provide more power-efficient operation. In some examples, the quantity of DL PDCP PDU data transferred through the HW accelerator can be reduced by limiting the data transferred from the application processor subsystem to the modem to PDCP PDU headers, metadata, and/or another subset of data associated with WLAN packets, and transferring PDCP PDUs from an intake memory associated with the application processor subsystem to a destination memory associated with the application processor subsystem based at least in part on a PDCP packet re-ordering generated by the modem.

Figure 19:
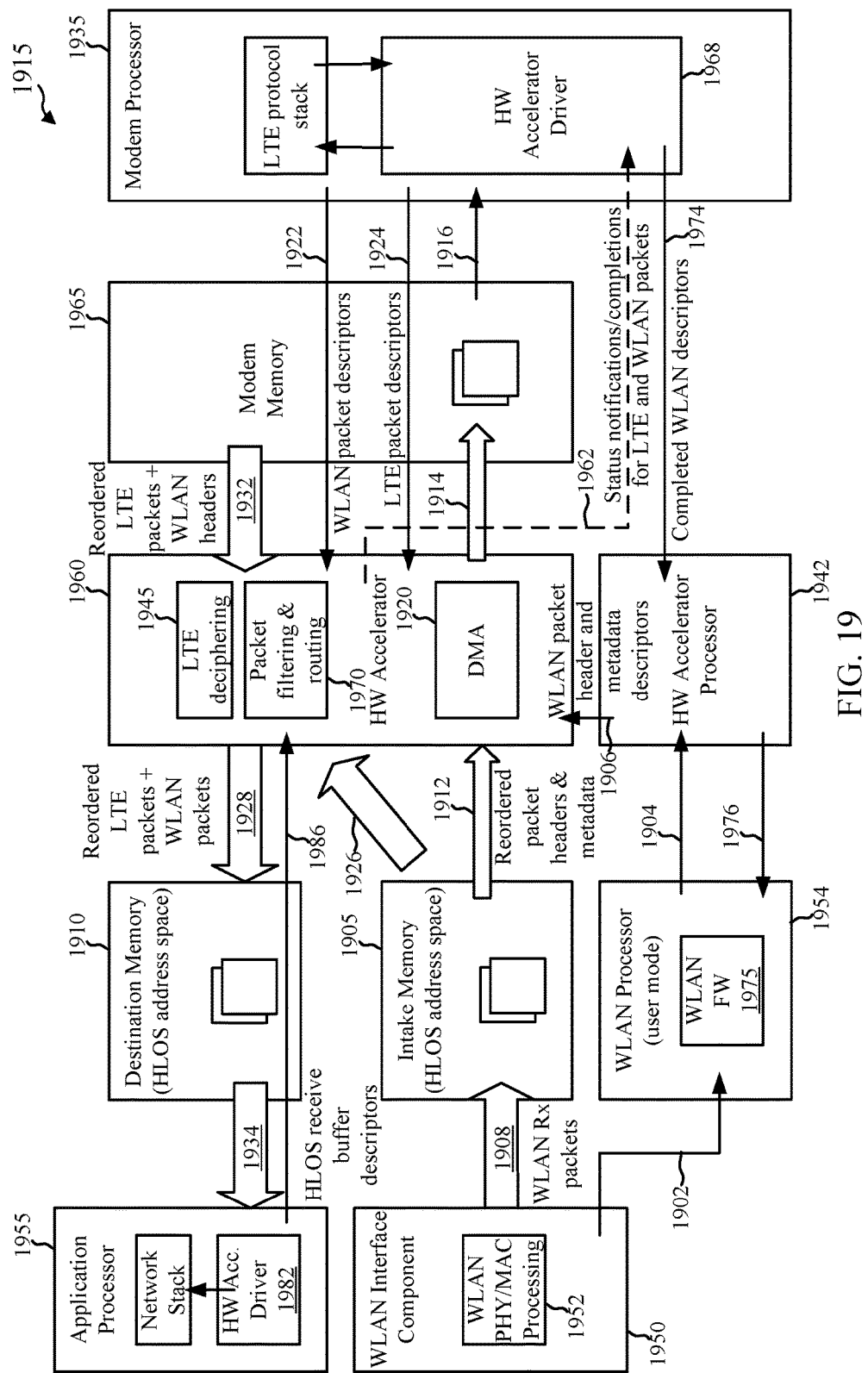
FIG. 19 shows a block diagram of a UE that receives PDCP PDUs while operating in a LWA mode, in accordance with various aspects of the present disclosure.

FIG. 19 shows a block diagram 1900 of a UE 1915 that receives PDCP PDUs while operating in a LWA mode, in accordance with various aspects of the present disclosure. The UE 1915 includes a modem processor 1935, a WLAN interface component 1950, and an application processor 1955. The UE 1915 combines (e.g., on one semiconductor device) the functions of a modem processing subsystem (including the modem processor 1935), a WLAN processing subsystem (including the WLAN interface component 1950), and an application processing subsystem (including the application processor 1955).

The UE 1915 may include a WLAN interface component 1950, an intake memory 1905, a HW accelerator 1960 (or similar functionality provided by HW, software (SW), FW, or a combination thereof), a modem memory 1965, a modem processor 1935, a destination memory 1910, and an application processor 1955. PDCP PDUs received by a LTE/LTE-A modem (not shown) may be stored in the modem memory 1965. PDCP PDUs received by the WLAN interface component 1950 may be stored in the intake memory 1905, at 1908, after initial processing (e.g., time-stamping) by the WLAN PHY/MAC processing logic 1952. Header and/or metadata descriptors of the PDCP PDUs stored in the intake memory 1905 may be passed from the WLAN interface component 1950 to the HW accelerator 1960 through a WLAN processor 1954 and a HW accelerator processor 1942 (e.g., via transfers 1902, 1904, and 1906). Upon receiving the header and/or metadata descriptors, the HW accelerator 1960 may copy PDCP PDU headers and/or metadata from the intake memory 1905 to the modem memory 1965 (e.g., at 1912 and 1914). In some examples, the physical addresses (or virtual addresses, if system memory management unit (SMMU) stage 1 is enabled) of PDCP PDU packets may be written to the modem memory 1965 (e.g., along with the associated header and/or metadata of a PDCP PDU). In some examples, the copying of the PDCP PDU headers and/or metadata may occur using a direct memory access (DMA 1920) transfer.

After PDCP PDU headers and/or metadata are copied to the modem memory 1965, the PDCP PDU headers and/or metadata may be retrieved (at 1916) and used by the modem processor 1935 to perform PDCP PDU re-ordering of PDCP PDUs received through the LTE/LTE-A modem and the WLAN interface component 1950. After re-ordering a group of PDCP PDUs, the modem processor 1935 may notify the HW accelerator 1960 (e.g., at 1922 and 1924), which may retrieve PDCP PDUs from the intake memory 1905 (at 1926) and the modem memory (at 1932) in accordance with the PDCP PDU re-ordering, perform PDCP PDU deciphering (at 1945), perform packet filtering and routing (at 1970), and write in-order IP packets into the destination memory 1910 (at 1928). In some examples, the HW accelerator 1960 may directly output deciphered data to the destination memory 1910 (e.g., using the addresses of PDCP PDUs written to the modem memory 1965). The in-order packets may be retrieved by an IP driver 1982 of the application processor 1955 at 1934, and the IP driver 1982 may provide the HW accelerator 1960 with receive buffer descriptors 1986 for locations of the destination memory 1910 that may be reused by the HW accelerator 1960.

After retrieving PDCP PDUs from the intake memory 1905, the HW accelerator 1960 may free the buffers of the intake memory 1905 that were used to store the PDCP PDUs (e.g., by notifying the modem processor 1935 at 1962. The modem processor 1935 may provide, via the HW accelerator driver 1968, completed PDCP PDU descriptors (e.g., WLAN packet descriptors) to the HW accelerator processor 1942 at 1974, and the HW accelerator processor 1942 may free the buffers of the intake memory 1905 corresponding to the PDCP PDU descriptors at 1976.

The UE 1915 avoids transferring entire PDCP PDUs from the intake memory 1905 to the modem memory 1965, and instead only copies a subset of data (e.g., PDCP PDU header and/or metadata) to the modem memory 1965, which can reduce the bandwidth requirement between the intake memory 1905 and the modem memory 1965 (e.g., bandwidth requirements of the HW accelerator, SNOC, and BIMC) and may provide more power-efficient operation of the UE 1915. In one example, 14 bytes of Ethernet address+4 bytes of LWAL/PDCP header+12 bytes of metadata may be copied from the intake memory 1905 to the modem memory 1965, instead of 14 bytes of Ethernet address+4 bytes of LWAL/PDCP header+1500 bytes of IP packet, providing a bandwidth saving of approximately 98%. In addition to reducing the bandwidth requirement between the intake memory 1905 and the modem memory 1965, the reduction in information copied from the intake memory 1905 to the modem memory 1965 can enable a reduction in the size of the modem memory 1965 (or can free modem memory for other uses). The UE 1915 may also enable the application processor 1955 to power collapse (e.g., enable a sleep mode) for remote network driver interface specification (RNDIS) tethering and/or HotSpot offload.

In comparison to the UE 1515, the UE 1915 may add an additional delay to freeing buffers of the intake memory 1905 (e.g., the buffers of the intake memory 1905 shown in FIG. 19 may not be freed until after PDCP PDU re-ordering and deciphering). The delay in freeing buffers of the intake memory 1905 may require a larger intake memory 1905 (or if the intake memory 1905 and destination memory 1910 are sub-parts of a common memory structure, more buffers of the common memory structure may need to be allocated to the intake memory 1905). In some examples, a WLAN driver (e.g., part of the WLAN framework 1975) may allocate buffers to the intake memory 1905 based on a worst case memory requirement. Alternatively, the WLAN driver may allocate buffers to the intake memory 1905 when needed, and de-allocate the buffers from the intake memory 1905 when not needed.

Figure 20:
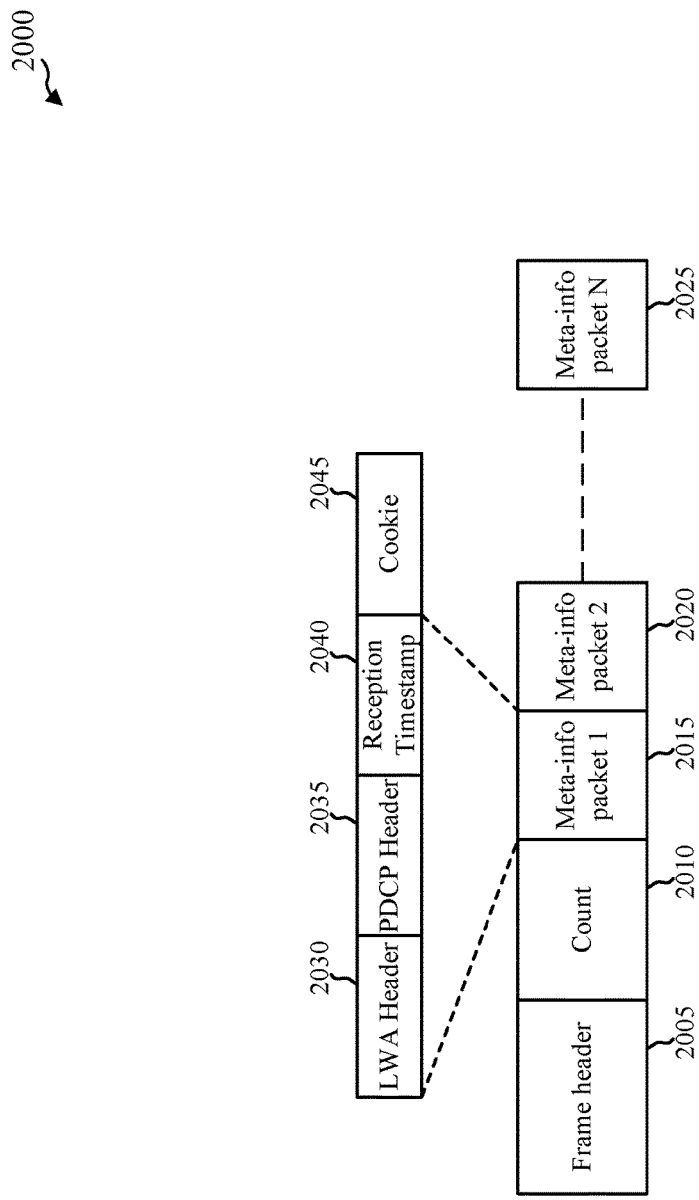
FIG. 20 illustrates an example message format in which multiple PDCP PDU headers are assembled into a message for transfer over a memory bus, in accordance with various aspects of the present disclosure.

In some examples of the UE 1915 described with reference to FIG. 19, memory bus efficiencies may be obtained by copying PDCP PDU headers and/or metadata from the intake memory 1905 to the modem memory 1965 using longer messages. In this regard, FIG. 20 illustrates an example message format 2000 in which multiple PDCP PDU headers are assembled into a message for transfer over a memory bus, in accordance with various aspects of the present disclosure. In some examples, the message format 2000 may be used to reduce the number and/or size of data transfers from the intake memory 1905 to the HW accelerator 1960 in FIG. 19 (e.g., at 1912).

The message format 2000 may include a frame header 2005, a count 2010 of metadata packets being transferred, and a plurality of metadata packets (e.g., Meta-info packet 1 2015, Meta-info packet 2 2020, . . . Meta-info packet N 2025). Each metadata packet may include, for example, a LWA header 2030, a PDCP header 2035, a PDCP PDU reception timestamp 2040, or a cookie 2045. The PDCP PDU reception timestamp 2040 may be used, in some examples, for flow control. The cookie 2045 may be used, in some examples, to track PDCP PDU reordering completions, as described with reference to FIG. 21.

In an alternative to the data flow shown within the UE 1515 or 1915 described with reference to FIG. 15 or 19, PDCP PDUs received by a LTE/LTE-A modem and the WLAN interface component may be forwarded to the destination memory prior to re-ordering, and PDCP re-ordering and deciphering may be performed by the application processor. In some examples, the application processor may rely on a modem crypto engine to perform hardware-assisted deciphering of LTE/LTE-A and WLAN packets (with the application processor may programming the hardware of the modem crypto engine to perform the deciphering).

Figure 21:
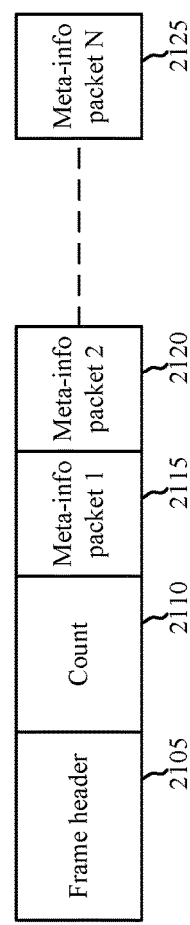
FIG. 21 illustrates an example message format in which multiple PDCP PDU headers are assembled into a message for transfer over a memory bus, in accordance with various aspects of the present disclosure.

FIG. 21 illustrates an example message format 2100 in which multiple PDCP PDU headers are assembled into a message for transfer over a memory bus, in accordance with various aspects of the present disclosure. In some examples, the message format 2100 may be used to reduce the number of occurrences or data size of signaling at 1974 or 1976 in FIG. 19.

The message format 2100 may include a frame header 2105, a count 2110 of metadata packets being transferred, and a plurality of metadata packets (e.g., Meta-info packet 1 2115, Meta-info packet 2 2120, . . . Meta-info packet N 2125). Each metadata packet may include, for example, a packet identifier, a cookie corresponding to a cookie transmitted/received in the message format 2000, or a processing timestamp. In some examples, each metadata packet may include just a packet identifier or the cookie 2045 described with reference to FIG. 20.

The message format 2000 or 2100 described with reference to FIG. 20 or 21 may increase link efficiency between components of a WWAN processing subsystem (including a modem or HW accelerator), a WLAN processing subsystem, and/or an application processing subsystem (including an application processor). The message formats 2000 and 2100 can also improve bursty performance of a UE, by allowing WLAN packet information corresponding to N WLAN packets (i.e., WLAN packet information corresponding to a block of N WLAN packets) to be transferred in a single data transfer, or by allowing M memory locations or memory resources to be freed for reuse as part of a single operation (e.g., after completion of reordering and deciphering). The message formats 2000 and 2100 can also reduce the number of interrupts to a WWAN processing subsystem, WLAN processing subsystem, and/or application processing subsystem, which can improve resource consumption (e.g., central processing unit (CPU) processing time) and power consumption at the WWAN processing subsystem, WLAN processing subsystem, and/or application processing subsystem.

Figure 22:
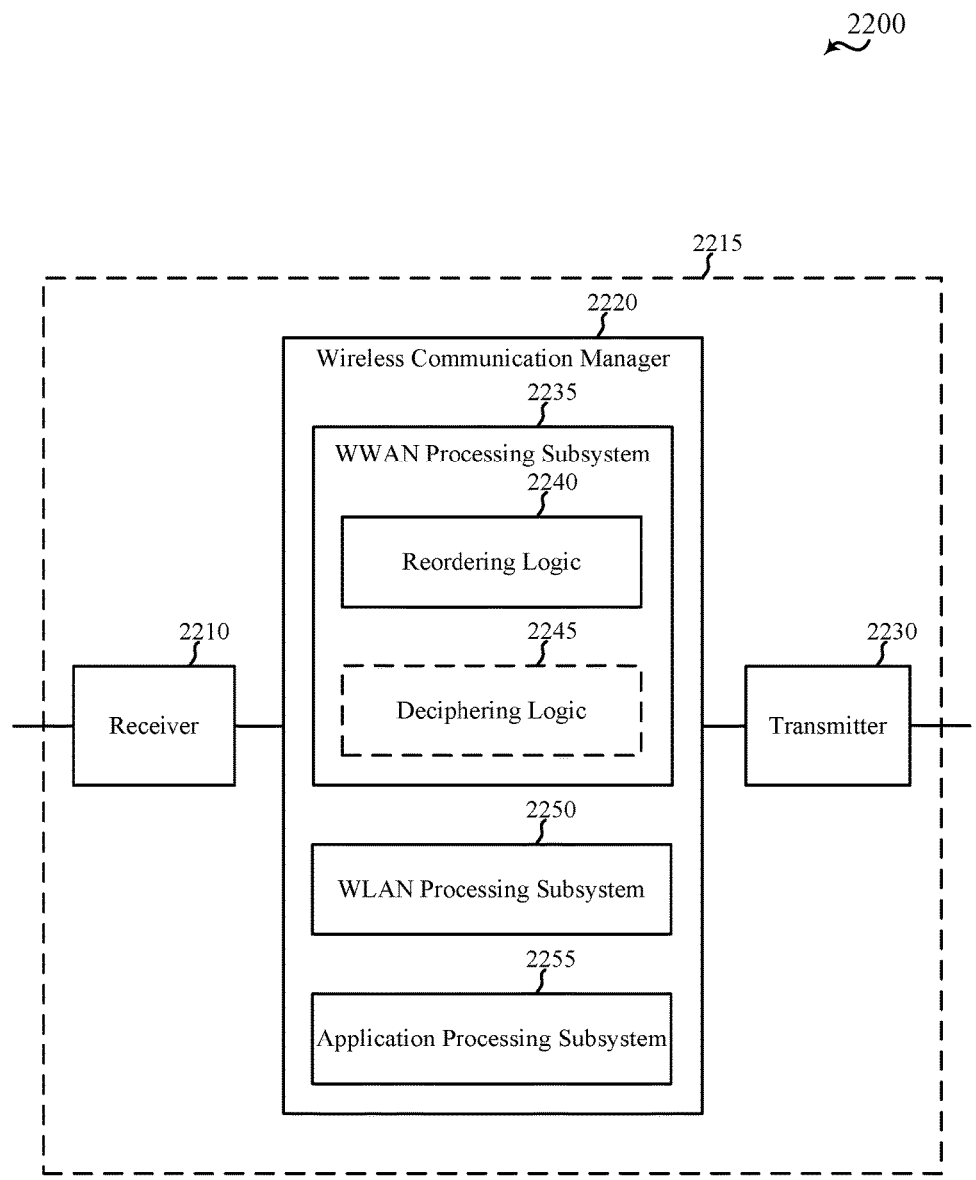
FIG. 22 shows a block diagram of an apparatus for use in wireless communication, in accordance with various aspects of the present disclosure.

FIG. 22 shows a block diagram 2200 of an apparatus 2215 for use in wireless communication, in accordance with various aspects of the present disclosure. The apparatus 2215 may be an example of aspects of one or more of the UEs 115, 215, 515, 1015, 1115, 1215, 1415, 1515, or 1615 described with reference to FIG. 1, 2, 5, 6, 10, 11, 12, 14, 15, or 16. The apparatus 2215 may also be or include a processor. The apparatus 2215 may include a receiver 2210, a wireless communication manager 2220, or a transmitter 2230. Each of these components may be in communication with each other.

The components of the apparatus 2215 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 2210 may include at least one radio frequency (RF) receiver, such as at least one RF receiver operable to receive transmissions over a dedicated radio frequency spectrum band (e.g., a radio frequency spectrum band licensed to some users for some uses) or a shared radio frequency spectrum band (e.g., a radio frequency spectrum band available for unlicensed use, such as Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications. The receiver 2210 may be used to receive various types of data or control signals (i.e., "data" or transmissions) over one or more communication links of a wireless communication system. The communication links may be established over the dedicated radio frequency spectrum band or the shared radio frequency spectrum band.

In some examples, the transmitter 2230 may include at least one RF transmitter, such as at least one RF transmitter operable to transmit over the dedicated radio frequency spectrum band or the shared radio frequency spectrum band. The transmitter 2230 may be used to transmit various types of data or control signals (i.e., "data" or transmissions) over one or more communication links of a wireless communication system. The communication links may be established over the dedicated radio frequency spectrum band or the shared radio frequency spectrum band.

In some examples, the wireless communication manager 2220 may be used to manage one or more aspects of wireless communication for the apparatus 2215. In some examples, part of the wireless communication manager 2220 may be incorporated into or shared with the receiver 2210 or the transmitter 2230. In some examples, the wireless communication manager 2220 may include a WWAN processing subsystem 2235, a WLAN processing subsystem 2250, or an application processing subsystem 2255. The WWAN processing subsystem 2235 may include reordering logic 2240 and, optionally, deciphering logic 2245.

In some examples, the WWAN processing subsystem 2235 may include a WWAN modem. The WWAN processing subsystem 2235 may be used to receive WWAN packets. The WWAN processing subsystem 2235 may also be used to transfer WLAN packet information from the WLAN processing subsystem 2250 to the WWAN processing subsystem 2235. In some examples, the WLAN packet information may be transferred from the WLAN processing subsystem 2250 to the WWAN processing subsystem 2235: under control of the WWAN processing subsystem 2235, under control of the application processing subsystem 2255, or under a combination thereof. In some examples, the WLAN packet information transferred from the WLAN processing subsystem 2250 to the WWAN processing subsystem 2235 may include PDCP information. In some examples, the WLAN packet information transferred from the WLAN processing subsystem 2250 to the WWAN processing subsystem 2235 may include WLAN packet metadata (e.g., WLAN packet headers). In some examples, the WLAN packet information may include a subset of data associated with WLAN packets. In some examples, the subset of data may be or include WLAN packet metadata, which may be or include WLAN packet headers. In some examples, the WLAN packet information transferred from the WLAN processing subsystem 2250 to the WWAN processing subsystem 2235 may include WLAN packets. In some examples, the transferred WLAN packet information may include time-stamps of receipt at the WLAN processing subsystem 2250, as described with reference to FIG. 18, for example. In some examples, the WLAN packet information may include a subset of data associated with WLAN packets. In some examples, the subset of data may be or include time-stamps of receipt at the WLAN processing subsystem 2250.

The WLAN packet information transferred to the WWAN processing subsystem 2235 may be stored, cached, or buffered in the WWAN processing subsystem 2235. In some examples, the WWAN processing subsystem 2235 may: store the WLAN packet information in a main memory of the WWAN processing subsystem 2235 while the reordering logic 2240 reorders packets; cache the WLAN packet information in a cache memory of the WWAN processing subsystem 2235 while the reordering logic 2240 reorders packets; buffer the WLAN packet information in the WWAN processing subsystem 2235 while the reordering logic 2240 reorders packets; or perform a combination thereof.

The reordering logic 2240 may be used to perform a reordering process in the WWAN processing subsystem 2235. The reordering process may be based at least in part on the received WWAN packets, and on WLAN packets that correspond to the transferred WLAN packet information. In some examples, the operation(s) performed by the reordering logic 2240 may include starting a reordering timer based at least in part on a gap in time-stamps included in the transferred WLAN packet information (e.g., as described with reference to FIG. 17 or 18). In some examples, the operation(s) performed by the reordering logic 2240 may include identifying a gap between a highest sequence number of a received WWAN packet and a lowest sequence number reference in the transferred WLAN packet information, and regulating the transfer of additional WLAN packet information from the WLAN processing subsystem 2250 to the WWAN processing subsystem 2235 based at least in part on the identified gap.

The deciphering logic 2245 may be used to decipher the WLAN packets and the WWAN packets in the WWAN processing subsystem 2235 (e.g., after the reordering performed by the reordering logic 2240, and before the WWAN processing subsystem 2235 provides an indication of the reordered WLAN packets and WWAN packets to the application processing subsystem 2255).

The WWAN processing subsystem 2235 may also be used to provide an indication of the reordered WWAN packets and the WLAN packets to the application processing subsystem 2255. In some examples, the indication of the reordered WLAN packets and WWAN packets may include ordered WLAN packet headers and WWAN packet headers and WWAN packets. In some examples, the indication of the reordered WLAN packets and WWAN packets may include ordered WLAN packets and WWAN packets. In some examples, the indication of the reordered WLAN packets and WWAN packets may include a block of in-order packet identifiers.

In some examples, the WWAN processing subsystem 2235 may signal to the WLAN processing subsystem 2250 that memory of the WLAN processing subsystem 2250 used to store WLAN packet information corresponding to WLAN packets (e.g., multiple WLAN packets or a block of information) is available for reuse. In some examples, the signaling may include at least one of: a block of multiple WLAN packet identifiers or a block of multiple memory locations.

The WLAN processing subsystem 2250 may be used to receive WLAN packets. In some examples, at least a part of the WLAN processing subsystem 2250 may be provided by the application processing subsystem 2255.

The application processing subsystem 2255 may receive in-order packets, including WWAN packets and/or WLAN packets, and may process the packets to facilitate a voice call or data transfer over a WLAN or a WWAN.

Figure 23:
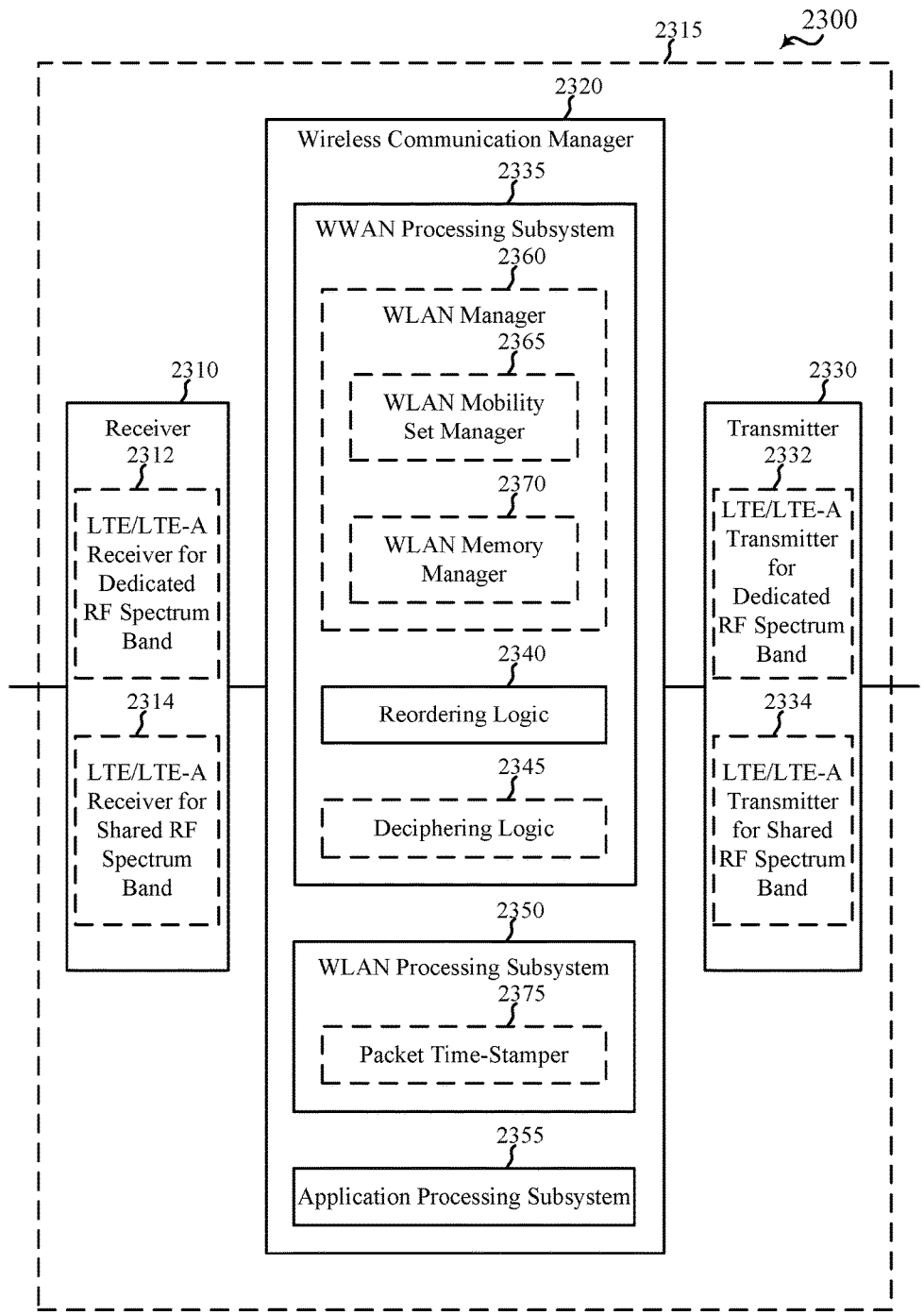
FIG. 23 shows a block diagram of an apparatus for use in wireless communication, in accordance with various aspects of the present disclosure.

FIG. 23 shows a block diagram 2300 of an apparatus 2315 for use in wireless communication, in accordance with various aspects of the present disclosure. The apparatus 2315 may be an example of aspects of one or more of the UEs 115, 215, 515, 1015, 1115, 1215, 1415, 1515, or 1615 described with reference to FIG. 1, 2, 5, 6, 10, 11, 12, 14, 15, or 16, or aspects of the apparatus 2215 described with reference to FIG. 22. The apparatus 2315 may also be or include a processor. The apparatus 2315 may include a receiver 2310, a wireless communication manager 2320, or a transmitter 2330. Each of these components may be in communication with each other.

The components of the apparatus 2315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 2310 may include at least one RF receiver, such as at least one RF receiver operable to receive transmissions over a dedicated radio frequency spectrum band (e.g., a radio frequency spectrum band licensed to some users for some uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications. The receiver 2310 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 2312), and an LTE/LTE-A receiver for communicating over the shared radio frequency spectrum band (e.g., LTE/LTE-A receiver for shared RF spectrum band 2314). The receiver 2310, including the LTE/LTE-A receiver for dedicated RF spectrum band 2312 or the LTE/LTE-A receiver for shared RF spectrum band 2314, may be used to receive various types of data or control signals (i.e., transmissions) over one or more communication links of a wireless communication system. The communication links may be established over the dedicated radio frequency spectrum band or the shared radio frequency spectrum band.

In some examples, the transmitter 2330 may include at least one RF transmitter, such as at least one RF transmitter operable to transmit over the dedicated radio frequency spectrum band or the shared radio frequency spectrum band. The transmitter 2330 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 2332), and an LTE/LTE-A transmitter for communicating over the shared RF spectrum band (e.g., LTE/LTE-A transmitter for shared RF spectrum band 2334). The transmitter 2330, including the LTE/LTE-A transmitter for dedicated RF spectrum band 2332 or the LTE/LTE-A transmitter for shared RF spectrum band 2334, may be used to transmit various types of data or control signals (i.e., "data" or transmissions) over one or more communication links of a wireless communication system. The communication links may be established over the dedicated RF spectrum band or the shared RF spectrum band.

In some examples, the wireless communication manager 2320 may be used to manage one or more aspects of wireless communication for the apparatus 2315. In some examples, part of the wireless communication manager 2320 may be incorporated into or shared with the receiver 2310 or the transmitter 2330. In some examples, the wireless communication manager 2320 may include a WWAN processing subsystem 2335, a WLAN processing subsystem 2350, or an application processing subsystem 2355. The WWAN processing subsystem 2335 may include an optional WLAN manager 2360, reordering logic 2340, or deciphering logic 2345 (which may be optional). The WLAN processing subsystem 2350 may include an optional packet time-stamper 2375.

In some examples, the WWAN processing subsystem 2335 may include a WWAN modem. The WWAN processing subsystem 2335 may be used to receive WWAN packets. The WWAN processing subsystem 2335 may also be used to transfer WLAN packet information from the WLAN processing subsystem 2350 to the WWAN processing subsystem 2335. In some examples, the WLAN packet information may be transferred from the WLAN processing subsystem to the WWAN processing subsystem in blocks of information corresponding to subsets of WLAN packets. In some examples, the blocks of information transferred from the WLAN processing subsystem to the WWAN processing subsystem may include WLAN packet metadata, which may be an example of a subset of data associated with WLAN packets. In some examples, the WLAN packet information may be transferred from the WLAN processing subsystem 2350 to the WWAN processing subsystem 2335: under control of the WWAN processing subsystem 2335, under control of the application processing subsystem 2355, or under a combination thereof. In some examples, the WLAN packet information transferred from the WLAN processing subsystem 2350 to the WWAN processing subsystem 2335 may include PDCP information. In some examples, the WLAN packet information transferred from the WLAN processing subsystem 2350 to the WWAN processing subsystem 2335 may include WLAN packet metadata (e.g., WLAN packet headers), which may be examples of a subset or subsets of data associated with WLAN packets. In some examples, the WLAN packet information transferred from the WLAN processing subsystem 2350 to the WWAN processing subsystem 2335 may include WLAN packets. In some examples, the transferred WLAN packet information may include time-stamps of receipt at the WLAN processing subsystem 2350, as described with reference to FIG. 18, for example, which may be an example of a subset of data associated with WLAN packets.

The WLAN packet information transferred to the WWAN processing subsystem 2335 may be stored, cached, or buffered in the WWAN processing subsystem 2335. In some examples, the WWAN processing subsystem 2335 may: store the WLAN packet information in a main memory of the WWAN processing subsystem 2335 while the reordering logic 2340 reorders packets; cache the WLAN packet information in a cache memory of the WWAN processing subsystem 2335 while the reordering logic 2340 reorders packets; buffer the WLAN packet information in the WWAN processing subsystem 2335 while the reordering logic 2340 reorders packets; or perform a combination thereof.

The WLAN manager 2360 may be used to manage aspects of the WLAN processing subsystem 2350 and/or the receipt or processing of WLAN packets by the WLAN processing subsystem 2350. In some examples, the WLAN manager 2360 may include an optional WLAN mobility set manager 2365 or a WLAN memory manager 2370. The WLAN mobility set manager 2365 may be used to determine a mobility set for receiving WLAN packets at the WLAN processing subsystem 2350, and to indicate the mobility set to the WLAN processing subsystem 2350. The WLAN memory manager 2370 may be used to receive, from the WLAN processing subsystem 2350, an indication of association or disassociation with a BSSID selected from the mobility set.

The reordering logic 2340 may be used to perform a reordering process in the WWAN processing subsystem 2335. The reordering process may be based at least in part on the received WWAN packets, and on WLAN packets that correspond to the transferred WLAN packet information. In some examples, the operation(s) performed by the reordering logic 2340 may include starting a reordering timer based at least in part on a gap in time-stamps included in the transferred WLAN packet information (e.g., as described with reference to FIG. 17 or 18). In some examples, the operation(s) performed by the reordering logic 2340 may include identifying a gap between a highest sequence number of a received WWAN packet and a lowest sequence number reference in the transferred WLAN packet information, and regulating the transfer of additional WLAN packet information from the WLAN processing subsystem 2350 to the WWAN processing subsystem 2335 based at least in part on the identified gap.

The deciphering logic 2345 may be used to decipher the WLAN packets and the WWAN packets in the WWAN processing subsystem 2335 (e.g., after the reordering performed by the reordering logic 2340, and before the WWAN processing subsystem 2335 provides an indication of the reordered WLAN packets and WWAN packets to the application processing subsystem 2355). In some examples, a block of information may be deciphered by the deciphering logic 2345.

The WWAN processing subsystem 2335 may also be used to provide an indication of the reordered WWAN packets and the WLAN packets to the application processing subsystem 2355. In some examples, the indication of the reordered WLAN packets and WWAN packets may include ordered WLAN packet headers and WWAN packet headers and WWAN packets. In some examples, the indication of the reordered WLAN packets and WWAN packets may include ordered WLAN packets and WWAN packets. In some examples, the indication of the reordered WLAN packets and WWAN packets may include a block of in-order packet identifiers.

In some examples, the WWAN processing subsystem 2335 may signal to the WLAN processing subsystem 2350 that memory of the WLAN processing subsystem 2350 used to store WLAN packet information corresponding to WLAN packets (e.g., multiple WLAN packets or a block of information) is available for reuse. In some examples, the signaling may include at least one of: a block of multiple WLAN packet identifiers or a block of multiple memory locations.

The WLAN processing subsystem 2350 may be used to receive WLAN packets. In some examples, at least a part of the WLAN processing subsystem 2350 may be provided by the application processing subsystem 2355. The packet time-stamper 2375 may be used to associate the WLAN packets with time-stamps of receipt at the WLAN processing subsystem 2350.

The application processing subsystem 2355 may receive in-order packets, including WWAN packets and/or WLAN packets, and may process the packets to facilitate a voice call or data transfer over a WLAN or a WWAN. In some examples, the application processing subsystem 2355 may monitor the receipt of WLAN packets at the WLAN processing subsystem, and provide a WLAN packet information block availability indicator to the WWAN processing subsystem 2335 when a block of packets (or WLAN packet information related thereto) is ready for transfer to the WWAN processing subsystem 2335.

Figure 24:
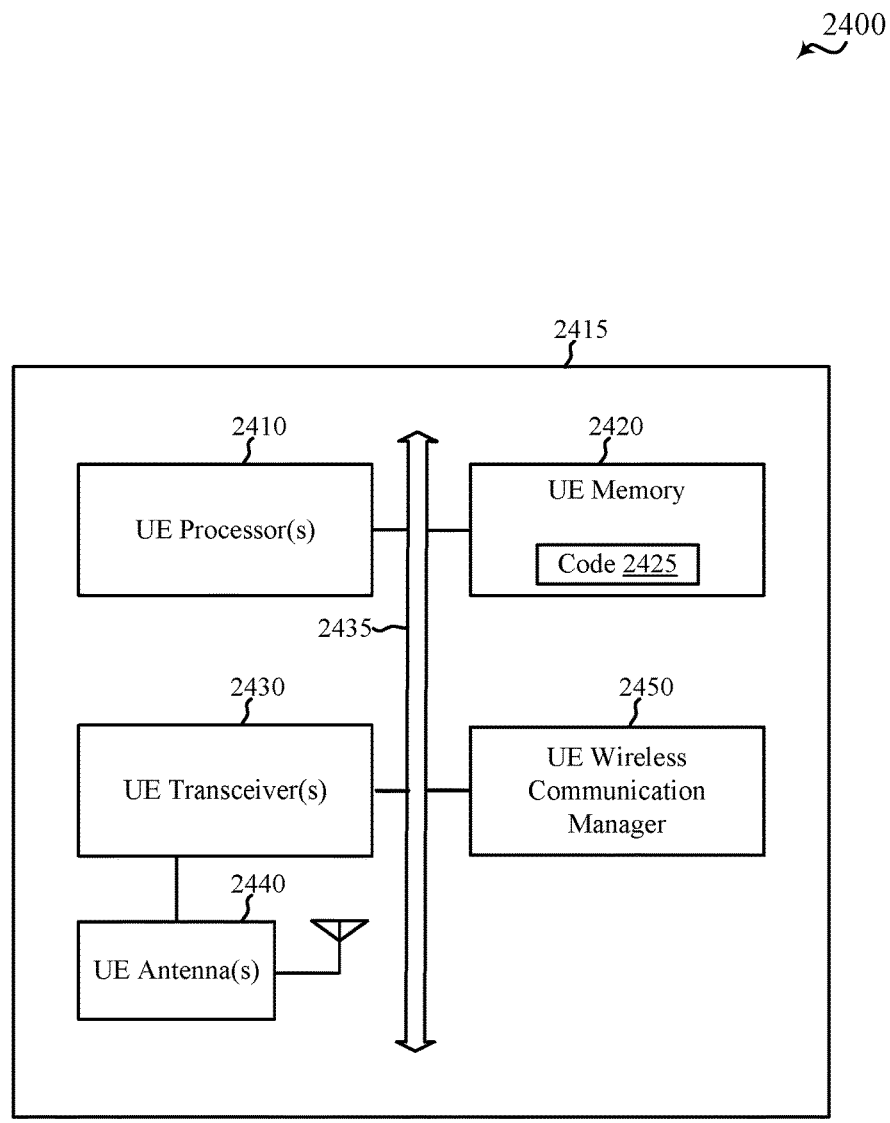
FIG. 24 shows a block diagram of a UE for use in wireless communication, in accordance with various aspects of the present disclosure.

FIG. 24 shows a block diagram 2400 of a UE 2415 for use in wireless communication, in accordance with various aspects of the present disclosure. The UE 2415 may be included or be part of a personal computer (e.g., a laptop computer, a netbook computer, a tablet computer, etc.), a cellular telephone, a smart phone, a PDA, a DVR, an internet appliance, a gaming console, an e-reader, etc. The UE 2415 may, in some examples, have an internal power supply (not shown), such as a small battery, to facilitate mobile operation. In some examples, the UE 2415 may be an example of aspects of one or more of the UEs 115, 215, 515, 1015, 1115, 1215, 1415, 1515, 1615, or 1915 described with reference to FIG. 1, 2, 5, 6, 10, 11, 12, 14, 15, 16, or 19, or aspects of one or more of the apparatuses 2215 or 2315 described with reference to FIG. 22 or 23. The UE 2415 may be configured to implement at least some of the UE or apparatus techniques and functions described with reference to other figures.

The UE 2415 may include at least one processor (represented by UE processor(s) 2410), a UE memory 2420, at least one UE transceiver (represented by UE transceiver(s) 2430), at least one antenna (represented by UE antenna(s) 2440), or a UE wireless communication manager 2450. Each of these components may be in communication with each other, directly or indirectly, over one or more buses 2435.

The UE memory 2420 may include random access memory (RAM) or read-only memory (ROM). The UE memory 2420 may store computer-readable, computer-executable code 2425 containing instructions that are configured to, when executed, cause the UE processor(s) 2410 to perform various functions described herein related to wireless communication. Alternatively, the computer-executable code 2425 may not be directly executable by the UE processor(s) 2410 but be configured to cause the UE 2415 (e.g., when compiled and executed) to perform various of the functions described herein.

The UE processor(s) 2410 may include one or more intelligent hardware devices, e.g., a CPU, a microcontroller, an ASIC, etc. The UE processor(s) 2410 may process information received through the UE transceiver(s) 2430 or information to be sent to the UE transceiver(s) 2430 for transmission through the UE antenna(s) 2440. The UE processor(s) 2410 may handle, alone or in connection with the UE wireless communication manager 2450, various aspects of communicating over (or managing communications over) one or more radio frequency spectrum bands, including, for example, one or more radio frequency spectrum bands used by a WWAN and one or more radio frequency spectrum bands used by a WLAN. In some examples, the use of a radio frequency spectrum band may be shared by a WWAN and a WLAN. In some examples, the one or more radio frequency spectrum bands may include a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to some users for some uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). In some examples, the UE processor(s) 2410 may include an application processor configured to process voice call or data traffic routed (e.g., transmitted or received) over a WLAN or a WWAN, as described, for example, with reference to FIG. 9, 14, 15, 16, or 19.

The UE transceiver(s) 2430 may include a modem (e.g., a WWAN modem or LTE/LTE-A modem) configured to modulate packets and provide the modulated packets to the UE antenna(s) 2440 for transmission. The modem may also demodulate packets received from the UE antenna(s) 2440. The UE transceiver(s) 2430 may also include a WLAN interface component configured to modulate or demodulate packets provided to or received from the UE antenna(s) 2440. In some examples, the modem or WLAN interface component may be examples of modems or WLAN interface components described with reference to FIG. 9, 14, 15, 16, or 19. The UE transceiver(s) 2430 may be configured to communicate bi-directionally, via the UE antenna(s) 2440, or with one or more base stations or WLAN access points. While the UE 2415 may include a single antenna, there may be examples in which the UE 2415 may include multiple antennas.

The UE wireless communication manager 2450 may be configured to coordinate or manage LWA communications for the UE 2415. The UE wireless communication manager 2450, or portions of it, may include a processor, or some or all of the functions of the UE wireless communication manager 2450 may be performed by one or more of the UE processor(s) 2410 or in connection with the UE processor(s) 2410. In some examples, the UE wireless communication manager 2450 may be an example of the wireless communication manager 2220 or 2320 described with reference to FIG. 22 or 23.

Figure 25:
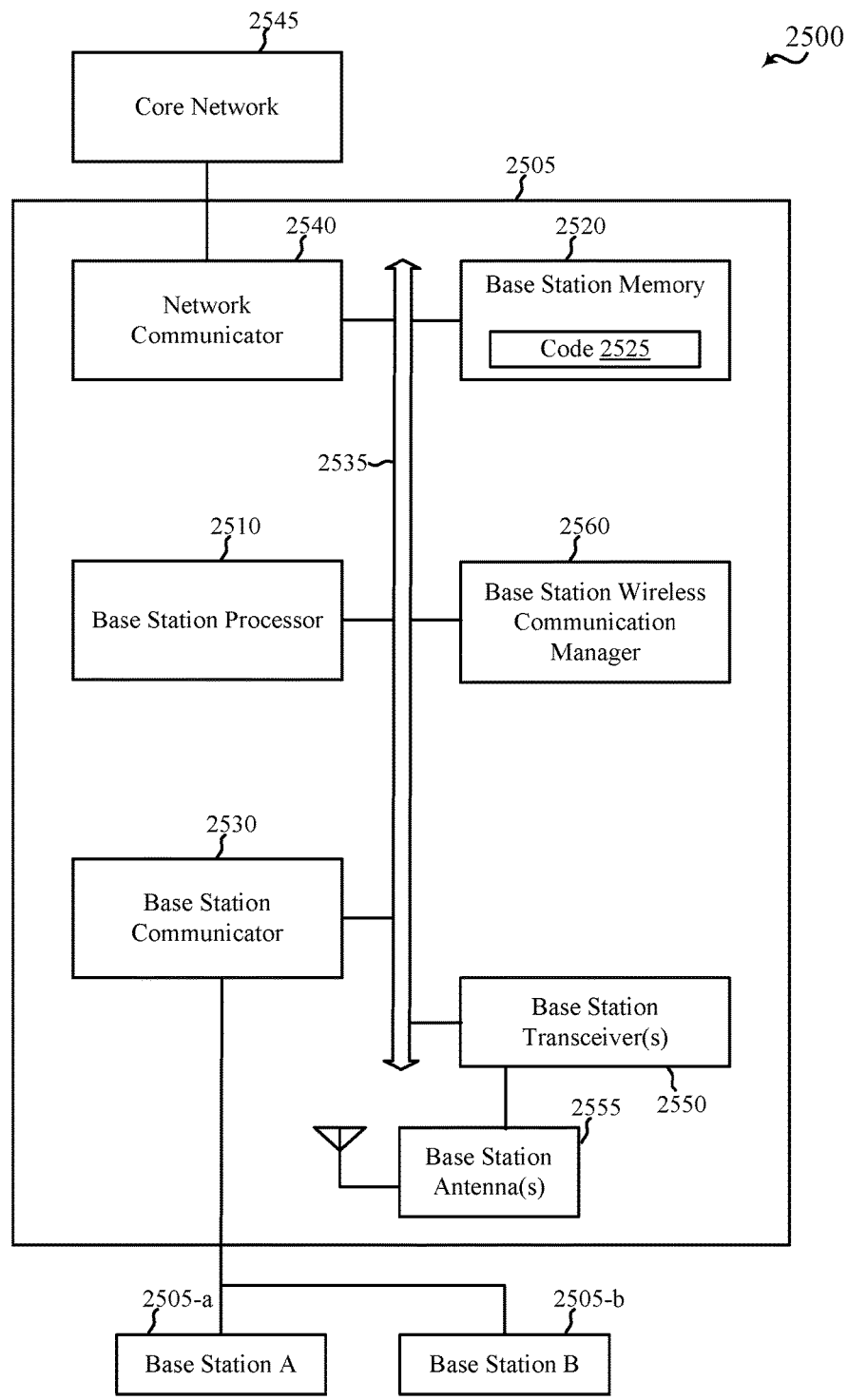
FIG. 25 shows a block diagram of a base station (e.g., a base station forming part or all of an eNB) for use in wireless communication, in accordance with various aspects of the present disclosure.

FIG. 25 shows a block diagram 2500 of a base station 2505 (e.g., a base station forming part or all of an eNB) for use in wireless communication, in accordance with various aspects of the present disclosure. In some examples, the base station 2505 may be an example of aspects of one or more of the base stations 105, 205, 305, 305-a, 405, 505-a, 705, 805, 1005, 1105, 1205, or 1405 described with reference to FIG. 1, 2, 3, 4, 5, 6, 7, 8, 10, 11, 12, or 14. The base station 2505 may be configured to implement or facilitate at least some of the base station techniques and functions described with reference to other figures.

The base station 2505 may include a base station processor 2510, a base station memory 2520, at least one base station transceiver (represented by base station transceiver(s) 2550), at least one base station antenna (represented by base station antenna(s) 2555), or a base station wireless communication manager 2560. The base station 2505 may also include one or more of a base station communicator 2530 or a network communicator 2540. Each of these components may be in communication with each other, directly or indirectly, over one or more buses 2535.

The base station memory 2520 may include RAM or ROM. The base station memory 2520 may store computer-readable, computer-executable code 2525 containing instructions that are configured to, when executed, cause the base station processor 2510 to perform various functions described herein related to wireless communication. Alternatively, the computer-executable code 2525 may not be directly executable by the base station processor 2510 but be configured to cause the base station 2505 (e.g., when compiled and executed) to perform various of the functions described herein.

The base station processor 2510 may include an intelligent hardware device, e.g., a CPU, a microcontroller, an ASIC, etc. The base station processor 2510 may process information received through the base station transceiver(s) 2550, the base station communicator 2530, or the network communicator 2540. The base station processor 2510 may also process information to be sent to the transceiver(s) 2550 for transmission through the antenna(s) 2555, to the base station communicator 2530, for transmission to one or more other base stations (e.g., base station 2505-a and base station 2505-b), or to the network communicator 2540 for transmission to a core network 2545, which may be an example of one or more aspects of the core network 130 described with reference to FIG. 1. The base station processor 2510 may handle, alone or in connection with the base station wireless communication manager 2560, various aspects of communicating over (or managing communications over) one or more radio frequency spectrum bands, such as a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to some users for some uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The base station transceiver(s) 2550 may include a modem configured to modulate packets and provide the modulated packets to the base station antenna(s) 2555 for transmission, and to demodulate packets received from the base station antenna(s) 2555. The base station transceiver(s) 2550 may, in some examples, be implemented as one or more base station transmitters and one or more separate base station receivers. The base station transceiver(s) 2550 may support communications in the dedicated radio frequency spectrum band or the shared radio frequency spectrum band. The base station transceiver(s) 2550 may be configured to communicate bi-directionally, via the antenna(s) 2555, with one or more UEs or apparatuses, such as one or more of the UEs 115, 215, 515, 1015, 1115, 1215, 1415, 1515, 1615, 1915, or 2415 described with reference to FIG. 1, 2, 5, 6, 10, 11, 12, 14, 15, 16, 19, or 24, or one or more of the apparatuses 2215 or 2315 described with reference to FIG. 22 or 23. The base station 2505 may, for example, include multiple base station antennas 2555 (e.g., an antenna array). The base station 2505 may communicate with the core network 2545 through the network communicator 2540. The base station 2505 may also communicate with other base stations, such as the base station 2505-a and the base station 2505-b, using the base station communicator 2530.

The base station wireless communication manager 2560 may be configured to perform or control some or all of the techniques or functions described with reference to other figures. The base station wireless communication manager 2560, or portions of it, may include a processor, or some or all of the functions of the base station wireless communication manager 2560 may be performed by the base station processor 2510 or in connection with the base station processor 2510.

Figure 26:
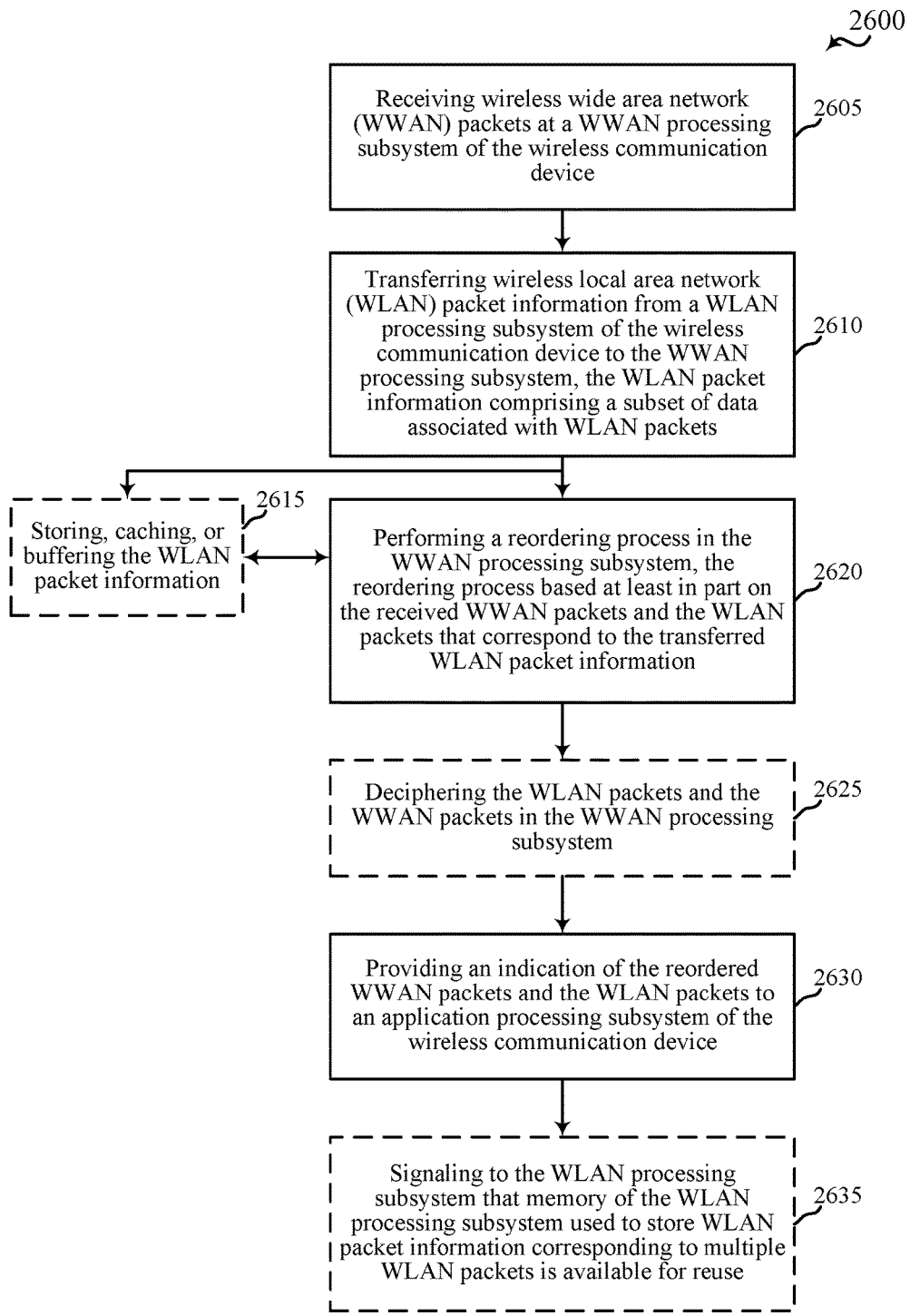
FIG. 26 is a flow chart illustrating an example of a method for wireless communication at a wireless communication device, in accordance with various aspects of the present disclosure.

FIG. 26 is a flow chart illustrating an example of a method 2600 for wireless communication at a wireless communication device, in accordance with various aspects of the present disclosure. For clarity, the method 2600 is described below with reference to aspects of one or more of the UEs 115, 215, 515, 1015, 1115, 1215, 1415, 1515, 1615, 1915, or 2415 described with reference to FIG. 1, 2, 5, 6, 10, 11, 12, 14, 15, 16, 19, or 24, or aspects of one or more of the apparatuses 2215 or 2315 described with reference to FIG. 22 or 23. In some examples, a wireless communication device (e.g., a UE or other apparatus) may execute one or more sets of codes to control the functional elements of the wireless communication device to perform the functions described below. Additionally or alternatively, the wireless communication device may perform one or more of the functions described below using special-purpose hardware.

At block 2605, the method 2600 may include receiving WWAN packets at a WWAN processing subsystem of the wireless communication device. In some examples, the WWAN processing subsystem may include a WWAN modem. The operation(s) at block 2605 may be performed using the modem 935, 1435, 1535, or 1635 described with reference to FIG. 9, 14, 15, or 16, the modem processor 1935 described with reference to FIG. 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2610, the method 2600 may include transferring WLAN packet information from a WLAN processing subsystem of the wireless communication device to the WWAN processing subsystem. In some examples, the WLAN packet information may include a subset of data associated with WLAN packets. In some examples, the subset of data may include one or more subsets of data associated with at least some, or in some cases all, of the related WLAN packets as described in and contemplated by the present disclosure. In some examples, the subset of data may include, but is not limited to, metadata, at least one packet identifier, at least one cookie, at least one packet header, PDCP information, timestamp information, other information, or some combination thereof in accordance with various aspects of the present disclosure. In some examples, the WLAN packet information may be transferred from the WLAN processing subsystem to the WWAN processing subsystem: under control of the WWAN processing subsystem, under control of the application processing subsystem, or under a combination thereof. In some examples, the WLAN packet information transferred from the WLAN processing subsystem to the WWAN processing subsystem may include PDCP information. In some examples, the WLAN packet information transferred from the WLAN processing subsystem to the WWAN processing subsystem may include WLAN packet metadata (e.g., WLAN packet headers). In some examples, the WLAN packet information transferred from the WLAN processing subsystem to the WWAN processing subsystem may include WLAN packets. In some examples, the transferred WLAN packet information may include time-stamps of receipt at the WLAN processing subsystem, as described with reference to FIG. 18, for example. In some examples, at least a part of the WLAN processing subsystem may be provided by an application processing subsystem of the wireless communication device. The operation(s) at block 2610 may be performed using the modem 935, 1435, 1535, or 1635 described with reference to FIG. 9, 14, 15, or 16, the HW accelerator 1460, 1560, 1660, or 1960 described with reference to FIG. 14, 15, 16, or 19, the modem processor 1935 or WLAN processor 1954 described with reference to FIG. 19, the application processor subsystem 1455, 1555, or 1655 described with reference to FIG. 14, 15, or 16, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2615, the method 2600 may optionally include storing, caching, or buffering the WLAN packet information in the WWAN processing subsystem. In some examples, the operation(s) at block 2615 may include at least one of: storing the WLAN packet information in a main memory of the WWAN processing subsystem while performing the reordering at block 2620; caching the WLAN packet information in a cache memory of the WWAN processing subsystem while performing the reordering; buffering the WLAN packet information in the WWAN processing subsystem while performing the reordering; or a combination thereof. The operation(s) at block 2615 may be performed using the modem 935, 1435, 1535, or 1635 described with reference to FIG. 9, 14, 15, or 16, the DDR or modem memory 1565, 1665, or 1965 described with reference to FIG. 15, 16, or 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2620, the method 2600 may include performing a reordering process in the WWAN processing subsystem. The reordering process may be based at least in part on the received WWAN packets, and on WLAN packets that correspond to the transferred WLAN packet information. In some examples, the operation(s) at block 2620 may include starting a reordering timer, at the WWAN processing subsystem, based at least in part on a gap in time-stamps included in the transferred WLAN packet information (e.g., as described with reference to FIG. 17 or 18). In some examples, the operation(s) at block 2620 may include identifying a gap between a highest sequence number of a received WWAN packet and a lowest sequence number reference in the transferred WLAN packet information, and regulating the transfer of additional WLAN packet information from the WLAN processing subsystem to the WWAN processing subsystem, at block 2610, based at least in part on the identified gap. The operation(s) at block 2620 may be performed using the modem 935, 1435, 1535, or 1635 described with reference to FIG. 9, 14, 15, or 16, the modem processor 1935 described with reference to FIG. 19, the PDCP reordering logic 1540 or 1640 described with reference to FIG. 15 or 16, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the reordering logic 2240 or 2340 described with reference to FIG. 22 or 23.

At block 2625, the method 2600 may optionally include deciphering the WLAN packets and the WWAN packets in the WWAN processing subsystem. The deciphering may be performed after the reordering performed at block 2620, as shown, or before the reordering performed at block 2620. In some examples, the deciphering may be performed before providing an indication of the reordered WLAN packets and WWAN packets to the application processing subsystem at block 2630. The operation(s) at block 2625 may be performed using the modem 935, 1435, 1535, or 1635 described with reference to FIG. 9, 14, 15, or 16, the modem processor 1935 described with reference to FIG. 19, the HW accelerator 1460, 1560, 1660, or 1960 described with reference to FIG. 14, 15, 16, or 19, the LTE deciphering logic 1945 described with reference to FIG. 19, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the deciphering logic 2245 or 2345 described with reference to FIG. 22 or 23.

At block 2630, the method 2600 may include providing an indication of the reordered WWAN packets and the WLAN packets to an application processing subsystem of the wireless communication device. In some examples, the indication of the reordered WLAN packets and WWAN packets may include ordered WLAN packet headers and WWAN packet headers and WWAN packets. In some examples, the indication of the reordered WLAN packets and WWAN packets may include ordered WLAN packets and WWAN packets. In some examples, the indication of the reordered WLAN packets and WWAN packets may include a block of in-order packet identifiers. The operation(s) at block 2630 may be performed using the modem 9, 1435, 1535, or 1635 described with reference to FIG. 9, 14, 15, or 16, the modem processor 1935 described with reference to FIG. 19, the HW accelerator 1460, 1560, 1660, or 1960 described with reference to FIG. 14, 15, 16, or 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2635, the method 2600 may optionally include signaling to the WLAN processing subsystem that memory of the WLAN processing subsystem used to store WLAN packet information corresponding to WLAN packets (e.g., multiple WLAN packets or a block of information) is available for reuse. In some examples, the signaling may include at least one of: indicating a block of multiple WLAN packet identifiers or indicating a block of multiple memory locations. In some examples, the signaling may be performed after block 2610, 2615, 2620, or 2625. The operation(s) at block 2635 may be performed using the modem 935, 1435, 1535, or 1635 described with reference to FIG. 9, 14, 15, or 16, the modem processor 1935 or HW accelerator processor 1942 described with reference to FIG. 19, the HW accelerator 1460, 1560, 1660, or 1960 described with reference to FIG. 14, 15, 16, or 19, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the WLAN manager 2360 or WLAN mobility set manager 2365 described with reference to FIG. 23.

In some examples of the method 2600, the WWAN packets may be received at the WWAN processing subsystem over a dedicated radio frequency spectrum band, and the WLAN packets may be received at the WLAN processing subsystem over a shared radio frequency spectrum band. The dedicated radio frequency spectrum band may include a radio frequency spectrum band for which transmitting apparatuses may not contend for access (e.g., a radio frequency spectrum band licensed to some users for some uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

Figure 27:
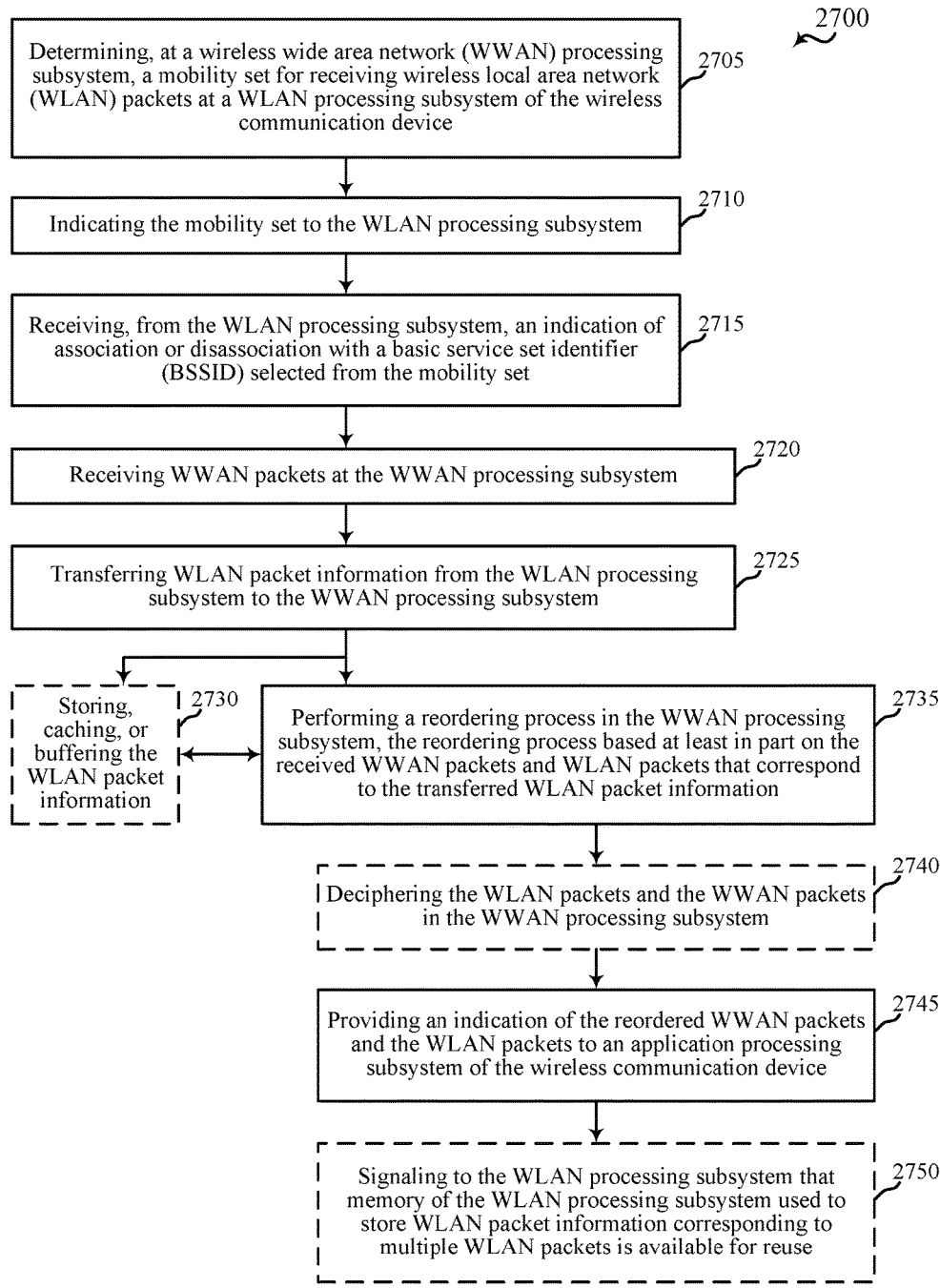
FIG. 27 is a flow chart illustrating an example of a method for wireless communication at a wireless communication device, in accordance with various aspects of the present disclosure.

FIG. 27 is a flow chart illustrating an example of a method 2700 for wireless communication at a wireless communication device, in accordance with various aspects of the present disclosure. For clarity, the method 2700 is described below with reference to aspects of one or more of the UEs 115, 215, 515, 1015, 1115, 1215, 1415, 1515, 1615, 1915, or 2415 described with reference to FIG. 1, 2, 5, 6, 10, 11, 12, 14, 15, 16, 19, or 24, or aspects of one or more of the apparatuses 2215 or 2315 described with reference to FIG. 22 or 23. In some examples, a wireless communication device (e.g., a UE or other apparatus) may execute one or more sets of codes to control the functional elements of the wireless communication device to perform the functions described below. Additionally or alternatively, the wireless communication device may perform one or more of the functions described below using special-purpose hardware.

At block 2705, the method 2700 may include determining, at a WWAN processing subsystem of a wireless communication device, a mobility set for receiving WLAN packets at a WLAN processing subsystem of the wireless communication device. In some examples, the WWAN processing subsystem may include a WWAN modem. At block 2710, the method 2700 may include indicating the mobility set to the WLAN processing subsystem. At block 2715, the method 2700 may include receiving, from the WLAN processing subsystem, an indication of association or disassociation with a BSSID selected from the mobility set. The operation(s) at block 2705, 2710, or 2715 may be performed using the modem 935, 1435, 1535, or 1635 described with reference to FIG. 9, 14, 15, or 16, the modem processor 1935 described with reference to FIG. 19, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the WLAN manager 2360 or WLAN mobility set manager 2365 described with reference to FIG. 23.

At block 2720, the method 2700 may include receiving WWAN packets at the WWAN processing subsystem. The operation(s) at block 2720 may be performed using the modem 935, 1435, 1535, or 1635 described with reference to FIG. 9, 14, 15, or 16, the modem processor 1935 described with reference to FIG. 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2725, the method 2700 may include transferring WLAN packet information from a WLAN processing subsystem of the wireless communication device to the WWAN processing subsystem. In some examples, the WLAN packet information may be transferred from the WLAN processing subsystem to the WWAN processing subsystem: under control of the WWAN processing subsystem, under control of the application processing subsystem, or under a combination thereof. In some examples, the WLAN packet information transferred from the WLAN processing subsystem to the WWAN processing subsystem may include PDCP information. In some examples, the WLAN packet information transferred from the WLAN processing subsystem to the WWAN processing subsystem may include WLAN packet metadata (e.g., WLAN packet headers). In some examples, the WLAN packet information transferred from the WLAN processing subsystem to the WWAN processing subsystem may include WLAN packets. In some examples, the transferred WLAN packet information may include time-stamps of receipt at the WLAN processing subsystem, as described with reference to FIG. 18, for example. In some examples, at least a part of the WLAN processing subsystem may be provided by an application processing subsystem of the wireless communication device. The operation(s) at block 2725 may be performed using the modem 935, 1435, 1535, or 1635 described with reference to FIG. 9, 14, 15, or 16, the HW accelerator 1460, 1560, 1660, or 1960 described with reference to FIG. 14, 15, 16, or 19, the modem processor 1935 or WLAN processor 1954 described with reference to FIG. 19, the application processor subsystem 1455, 1555, or 1655 described with reference to FIG. 14, 15, or 16, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2730, the method 2700 may optionally include storing, caching, or buffering the WLAN packet information in the WWAN processing subsystem. In some examples, the operation(s) at block 2730 may include at least one of: storing the WLAN packet information in a main memory of the WWAN processing subsystem while performing the reordering at block 2735; caching the WLAN packet information in a cache memory of the WWAN processing subsystem while performing the reordering; buffering the WLAN packet information in the WWAN processing subsystem while performing the reordering; or a combination thereof. The operation(s) at block 2730 may be performed using the modem 935, 1435, 1535, or 1635 described with reference to FIG. 9, 14, 15, or 16, the DDR or modem memory 1565, 1665, or 1965 described with reference to FIG. 15, 16, or 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2735, the method 2700 may include performing a reordering process in the WWAN processing subsystem. The reordering process may be based at least in part on the received WWAN packets, and on WLAN packets that correspond to the transferred WLAN packet information. In some examples, the operation(s) at block 2735 may include starting a reordering timer, at the WWAN processing subsystem, based at least in part on a gap in time-stamps included in the transferred WLAN packet information (e.g., as described with reference to FIG. 17 or 18). In some examples, the operation(s) at block 2735 may include identifying a gap between a highest sequence number of a received WWAN packet and a lowest sequence number reference in the transferred WLAN packet information, and regulating the transfer of additional WLAN packet information from the WLAN processing subsystem to the WWAN processing subsystem, at block 2725, based at least in part on the identified gap. The operation(s) at block 2735 may be performed using the modem 935, 1435, 1535, or 1635 described with reference to FIG. 9, 14, 15, or 16, the modem processor 1935 described with reference to FIG. 19, the PDCP reordering logic 1540 or 1640 described with reference to FIG. 15 or 16, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the reordering logic 2240 or 2340 described with reference to FIG. 22 or 23.

At block 2740, the method 2700 may optionally include deciphering the WLAN packets and the WWAN packets in the WWAN processing subsystem. The deciphering may be performed after the reordering performed at block 2735, as shown, or before the reordering performed at block 2735. In some examples, the deciphering may be performed before providing an indication of the reordered WLAN packets and WWAN packets to the application processing subsystem at block 2745). The operation(s) at block 2740 may be performed using the modem 935, 1435, 1535, or 1635 described with reference to FIG. 9, 14, 15, or 16, the modem processor 1935 described with reference to FIG. 19, the HW accelerator 1460, 1560, 1660, or 1960 described with reference to FIG. 14, 15, 16, or 19, the LTE deciphering logic 1945 described with reference to FIG. 19, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the deciphering logic 2245 or 2345 described with reference to FIG. 22 or 23.

At block 2745, the method 2700 may include providing an indication of the reordered WWAN packets and the WLAN packets to an application processing subsystem of the wireless communication device. In some examples, the indication of the reordered WLAN packets and WWAN packets may include ordered WLAN packet headers and WWAN packet headers and WWAN packets. In some examples, the indication of the reordered WLAN packets and WWAN packets may include ordered WLAN packets and WWAN packets. In some examples, the indication of the reordered WLAN packets and WWAN packets may include a block of in-order packet identifiers. The operation(s) at block 2745 may be performed using the modem 9, 1435, 1535, or 1635 described with reference to FIG. 9, 14, 15, or 16, the modem processor 1935 described with reference to FIG. 19, the HW accelerator 1460, 1560, 1660, or 1960 described with reference to FIG. 14, 15, 16, or 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2750, the method 2700 may optionally include signaling to the WLAN processing subsystem that memory of the WLAN processing subsystem used to store WLAN packet information corresponding to WLAN packets (e.g., multiple WLAN packets or a block of information) is available for reuse. In some examples, the signaling may include at least one of: indicating a block of multiple WLAN packet identifiers or indicating a block of multiple memory locations. In some examples, the signaling may be performed after block 2725, 2730, 2735, or 2740. The operation(s) at block 2750 may be performed using the modem 935, 1435, 1535, or 1635 described with reference to FIG. 9, 14, 15, or 16, the modem processor 1935 or HW accelerator processor 1942 described with reference to FIG. 19, the HW accelerator 1460, 1560, 1660, or 1960 described with reference to FIG. 14, 15, 16, or 19, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the WLAN manager 2360 or WLAN mobility set manager 2365 described with reference to FIG. 23.

In some examples of the method 2700, the WWAN packets may be received at the WWAN processing subsystem over a dedicated radio frequency spectrum band, and the WLAN packets may be received at the WLAN processing subsystem over a shared radio frequency spectrum band. The dedicated radio frequency spectrum band may include a radio frequency spectrum band for which transmitting apparatuses may not contend for access (e.g., a radio frequency spectrum band licensed to some users for some uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

Figure 28:
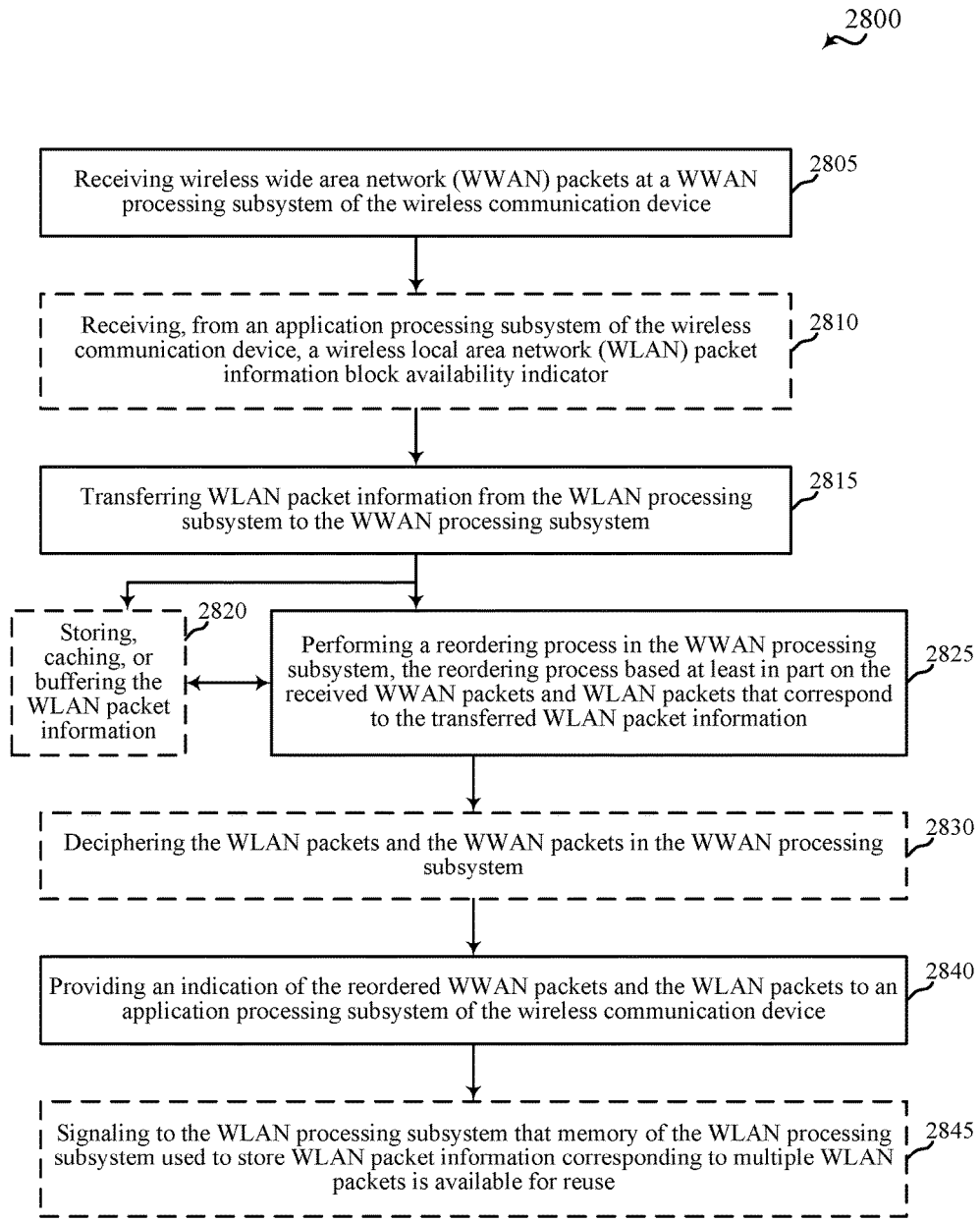
FIG. 28 is a flow chart illustrating an example of a method for wireless communication at a wireless communication device, in accordance with various aspects of the present disclosure.

FIG. 28 is a flow chart illustrating an example of a method 2800 for wireless communication at a wireless communication device, in accordance with various aspects of the present disclosure. For clarity, the method 2800 is described below with reference to aspects of one or more of the UEs 115, 215, 515, 1015, 1115, 1215, 1415, 1515, 1615, 1915, or 2415 described with reference to FIG. 1, 2, 5, 6, 10, 11, 12, 14, 15, 16, 19, or 24, or aspects of one or more of the apparatuses 2215 or 2315 described with reference to FIG. 22 or 23. In some examples, a wireless communication device (e.g., a UE or other apparatus) may execute one or more sets of codes to control the functional elements of the wireless communication device to perform the functions described below. Additionally or alternatively, the wireless communication device may perform one or more of the functions described below using special-purpose hardware.

At block 2805, the method 2800 may include receiving WWAN packets at a WWAN processing subsystem of the wireless communication device. In some examples, the WWAN processing subsystem may include a WWAN modem. The operation(s) at block 2805 may be performed using the modem 935, 1435, 1535, or 1635 described with reference to FIG. 9, 14, 15, or 16, the modem processor 1935 described with reference to FIG. 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2810, the method 2800 may include receiving, from an application processing subsystem of the wireless communication device, a WLAN packet information block availability indicator. The operation(s) at block 2810 may be performed using the modem 935, 1435, 1535, or 1635 described with reference to FIG. 9, 14, 15, or 16, the modem processor 1935 described with reference to FIG. 19, the HW accelerator 1460, 1560, 1660, or 1960 described with reference to FIG. 14, 15, 16, or 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2815, the method 2800 may include transferring WLAN packet information from a WLAN processing subsystem of the wireless communication device to the WWAN processing subsystem. In some examples, the WLAN packet information may be transferred from the WLAN processing subsystem to the WWAN processing subsystem in blocks of information corresponding to subsets of WLAN packets. In some examples, the blocks of information transferred from the WLAN processing subsystem to the WWAN processing subsystem may include WLAN packet metadata. In some examples, the WLAN packet information may be transferred from the WLAN processing subsystem to the WWAN processing subsystem: under control of the WWAN processing subsystem, under control of the application processing subsystem, or under a combination thereof. In some examples, the WLAN packet information transferred from the WLAN processing subsystem to the WWAN processing subsystem may include PDCP information. In some examples, the WLAN packet information transferred from the WLAN processing subsystem to the WWAN processing subsystem may include WLAN packet metadata (e.g., WLAN packet headers). In some examples, the WLAN packet information transferred from the WLAN processing subsystem to the WWAN processing subsystem may include WLAN packets. In some examples, the transferred WLAN packet information may include time-stamps of receipt at the WLAN processing subsystem, as described with reference to FIG. 18, for example. In some examples, at least a part of the WLAN processing subsystem may be provided by an application processing subsystem of the wireless communication device. The operation(s) at block 2815 may be performed using the modem 935, 1435, 1535, or 1635 described with reference to FIG. 9, 14, 15, or 16, the HW accelerator 1460, 1560, 1660, or 1960 described with reference to FIG. 14, 15, 16, or 19, the modem processor 1935 or WLAN processor 1954 described with reference to FIG. 19, the application processor subsystem 1455, 1555, or 1655 described with reference to FIG. 14, 15, or 16, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2820, the method 2800 may optionally include storing, caching, or buffering the WLAN packet information in the WWAN processing subsystem. In some examples, the operation(s) at block 2820 may include at least one of: storing the WLAN packet information in a main memory of the WWAN processing subsystem while performing the reordering at block 2825; caching the WLAN packet information in a cache memory of the WWAN processing subsystem while performing the reordering; buffering the WLAN packet information in the WWAN processing subsystem while performing the reordering; or a combination thereof. The operation(s) at block 2820 may be performed using the modem 935, 1435, 1535, or 1635 described with reference to FIG. 9, 14, 15, or 16, the DDR or modem memory 1565, 1665, or 1965 described with reference to FIG. 15, 16, or 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2825, the method 2800 may include performing a reordering process in the WWAN processing subsystem. The reordering process may be based at least in part on the received WWAN packets, and on WLAN packets that correspond to the transferred WLAN packet information. In some examples, the operation(s) at block 2825 may include starting a reordering timer, at the WWAN processing subsystem, based at least in part on a gap in time-stamps included in the transferred WLAN packet information (e.g., as described with reference to FIG. 17 or 18). In some examples, the operation(s) at block 2825 may include identifying a gap between a highest sequence number of a received WWAN packet and a lowest sequence number reference in the transferred WLAN packet information, and regulating the transfer of additional WLAN packet information from the WLAN processing subsystem to the WWAN processing subsystem, at block 2815, based at least in part on the identified gap. The operation(s) at block 2825 may be performed using the modem 935, 1435, 1535, or 1635 described with reference to FIG. 9, 14, 15, or 16, the modem processor 1935 described with reference to FIG. 19, the PDCP reordering logic 1540 or 1640 described with reference to FIG. 15 or 16, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the reordering logic 2240 or 2340 described with reference to FIG. 22 or 23.

At block 2830, the method 2800 may optionally include deciphering the WLAN packets and the WWAN packets in the WWAN processing subsystem. The deciphering may be performed after the reordering performed at block 2825, as shown, or before the reordering performed at block 2825. In some examples, the deciphering may be performed before providing an indication of the reordered WLAN packets and WWAN packets to the application processing subsystem at block 2835). In some examples, a block of information may be deciphered in the WWAN processing subsystem. The operation(s) at block 2830 may be performed using the modem 935, 1435, 1535, or 1635 described with reference to FIG. 9, 14, 15, or 16, the modem processor 1935 described with reference to FIG. 19, the HW accelerator 1460, 1560, 1660, or 1960 described with reference to FIG. 14, 15, 16, or 19, the LTE deciphering logic 1945 described with reference to FIG. 19, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the deciphering logic 2245 or 2345 described with reference to FIG. 22 or 23.

At block 2835, the method 2800 may include providing an indication of the reordered WWAN packets and the WLAN packets to an application processing subsystem of the wireless communication device. In some examples, the indication of the reordered WLAN packets and WWAN packets may include ordered WLAN packet headers and WWAN packet headers and WWAN packets. In some examples, the indication of the reordered WLAN packets and WWAN packets may include ordered WLAN packets and WWAN packets. In some examples, the indication of the reordered WLAN packets and WWAN packets may include a block of in-order packet identifiers. The operation(s) at block 2835 may be performed using the modem 9, 1435, 1535, or 1635 described with reference to FIG. 9, 14, 15, or 16, the modem processor 1935 described with reference to FIG. 19, the HW accelerator 1460, 1560, 1660, or 1960 described with reference to FIG. 14, 15, 16, or 19, the wireless communication manager 2220 or 2320 described with reference to FIG. 22 or 23, the UE wireless communication manager 2450 described with reference to FIG. 24, or the WWAN processing subsystem 2235 or 2335 described with reference to FIG. 22 or 23.

At block 2840, the method 2800 may optionally include signaling to the WLAN processing subsystem that memory of the WLAN processing subsystem used to store WLAN packet information corresponding to WLAN packets (e.g., multiple WLAN packets or a block of information) is available for reuse. In some examples, the signaling may include at least one of: indicating a block of multiple WLAN packet identifiers or indicating a block of multiple memory locations. In some examples, the signaling may be performed after block 2815, 2820, 2825, or 2830. The operation(s) at block 2840 may be performed using the modem 935, 1435, 1535, or 1635 described with reference to FIG. 9, 14, 15, or 16, the modem processor 1935 or HW accelerator processor 1942 described with reference to FIG. 19, the HW accelerator 1460, 1560, 1660, or 1960 described with reference to FIG. 14, 15, 16, or 19, the wireless communication manager 2220 or 2320 described with reference to FIG. 22 or 23, the UE wireless communication manager 2450 described with reference to FIG. 24, the WWAN processing subsystem 2235 or 2335 described with reference to FIG. 22 or 23, or the WLAN manager 2360 or WLAN mobility set manager 2365 described with reference to FIG. 23.

In some examples of the method 2800, the WWAN packets may be received at the WWAN processing subsystem over a dedicated radio frequency spectrum band, and the WLAN packets may be received at the WLAN processing subsystem over a shared radio frequency spectrum band. The dedicated radio frequency spectrum band may include a radio frequency spectrum band for which transmitting apparatuses may not contend for access (e.g., a radio frequency spectrum band licensed to some users for some uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

Figure 29:
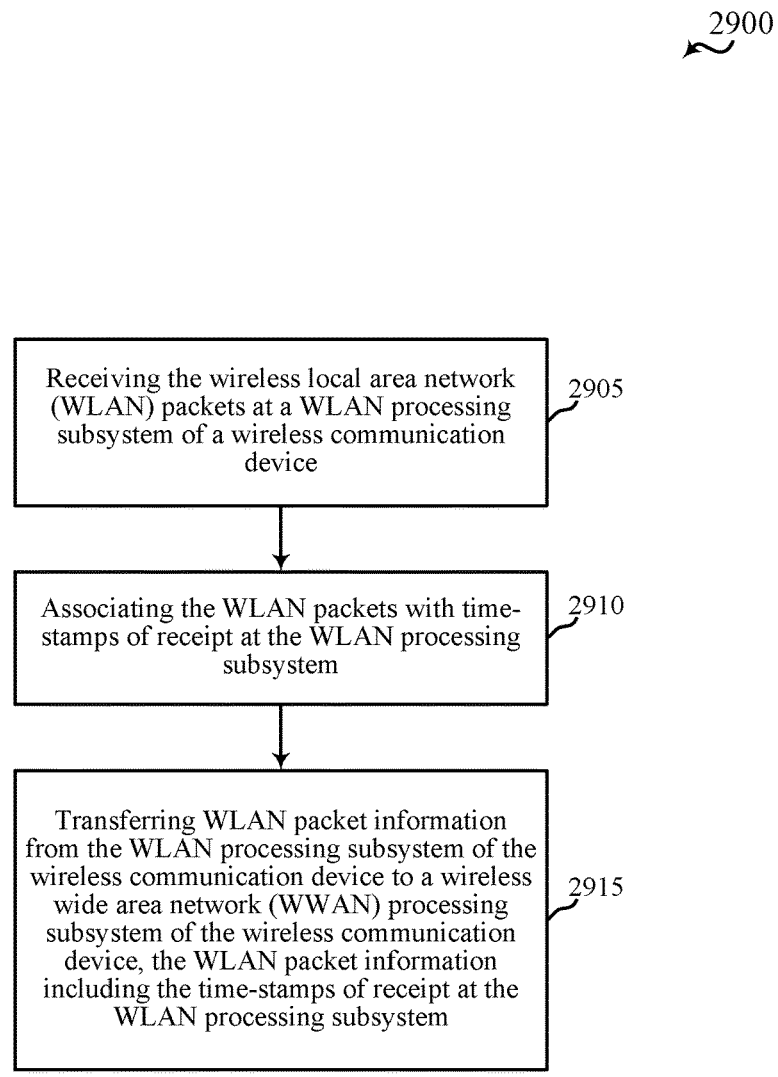
FIG. 29 is a flow chart illustrating an example of a method for wireless communication at a wireless communication device, in accordance with various aspects of the present disclosure.

FIG. 29 is a flow chart illustrating an example of a method 2900 for wireless communication at a wireless communication device, in accordance with various aspects of the present disclosure. For clarity, the method 2900 is described below with reference to aspects of one or more of the UEs 115, 215, 515, 1015, 1115, 1215, 1415, 1515, 1615, 1915, or 2415 described with reference to FIG. 1, 2, 5, 6, 10, 11, 12, 14, 15, 16, 19, or 24, or aspects of one or more of the apparatuses 2215 or 2315 described with reference to FIG. 22 or 23. In some examples, a wireless communication device (e.g., a UE or other apparatus) may execute one or more sets of codes to control the functional elements of the wireless communication device to perform the functions described below. Additionally or alternatively, the wireless communication device may perform one or more of the functions described below using special-purpose hardware.

At block 2905, the method 2900 may include receiving WLAN packets at a WLAN processing subsystem of a wireless communication device. In some examples, at least a part of the WLAN processing subsystem may be provided by an application processing subsystem of the wireless communication device. The operation(s) at block 2905 may be performed using the WLAN interface component 950 or 1950 described with reference to FIG. 9 or 19, the WLAN interface component 1450, 1550, or 1650 described with reference to FIG. 14, 15, or 16, the wireless communication manager 2220 or 2320 described with reference to FIG. 22 or 23, the UE wireless communication manager 2450 described with reference to FIG. 24, or the WLAN processing subsystem 2250 or 2350 described with reference to FIG. 22 or 23.

At block 2910, the method 2900 may include associating the WLAN packets with time-stamps of receipt at the WLAN processing subsystem. The operation(s) at block 2910 may be performed using the WLAN interface component 950 or 1950 described with reference to FIG. 9 or 19, the WLAN interface component 1450, 1550, or 1650 described with reference to FIG. 14, 15, or 16, the WLAN PHY/MAC processing logic 1952 described with reference to FIG. 19, the wireless communication manager 2220 or 2320 described with reference to FIG. 22 or 23, the UE wireless communication manager 2450 described with reference to FIG. 24, the WLAN processing subsystem 2250 or 2350 described with reference to FIG. 22 or 23, or the packet time-stamper 2375 described with reference to FIG. 23.

At block 2915, the method 2900 may include transferring WLAN packet information from the WLAN processing subsystem to a WWAN processing subsystem of the wireless communication device. In some examples, the WLAN packet information may be transferred from the WLAN processing subsystem to the WWAN processing subsystem: under control of the WWAN processing subsystem, under control of the application processing subsystem, or under a combination thereof. In some examples, the WLAN packet information transferred from the WLAN processing subsystem to the WWAN processing subsystem may include PDCP information. In some examples, the WLAN packet information transferred from the WLAN processing subsystem to the WWAN processing subsystem may include WLAN packet metadata (e.g., WLAN packet headers). In some examples, the WLAN packet information transferred from the WLAN processing subsystem to the WWAN processing subsystem may include WLAN packets. In some examples, the transferred WLAN packet information may include the time-stamps of receipt at the WLAN processing subsystem, as described with reference to FIG. 18, for example. The operation(s) at block 2910 may be performed using the modem processor 1935 or WLAN processor 1954 described with reference to FIG. 19, the HW accelerator 1460, 1560, 1660, or 1960 described with reference to FIG. 14, 15, 16, or 19, the wireless communication manager 2220 or 2320 described with reference to FIG. 22 or 23, the UE wireless communication manager 2450 described with reference to FIG. 24, or the WWAN processing subsystem 2335 or WLAN processing subsystem 2250 or 2350 described with reference to FIG. 22 or 23.

In some examples of the method 2900, the WLAN packets may be received at the WLAN processing subsystem over a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

It is noted that the methods 2600, 2700, 2800, and 2900 described with reference to FIGS. 26, 27, 28, and 29 are example implementations, and that the operations of the methods 2600, 2700, 2800, and 2900 may be rearranged or otherwise modified such that other implementations are possible. In some examples, aspects of the methods 2600, 2700, 2800, or 2900 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1×, 1×, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a wireless communication device, comprising:
   receiving wireless wide area network (WWAN) packets at a WWAN processing subsystem of the wireless communication device;
   transferring wireless local area network (WLAN) packet information from a WLAN processing subsystem of the wireless communication device to the WWAN processing subsystem, the WLAN packet information comprising a subset of data associated with WLAN packets;
   performing a reordering process in the WWAN processing subsystem, the reordering process based at least in part on the received WWAN packets and the WLAN packets that correspond to the transferred WLAN packet information; and
   providing an indication of the reordered WWAN packets and the WLAN packets to an application processing subsystem of the wireless communication device.

2. The method of claim 1, wherein the WLAN packet information is transferred from the WLAN processing subsystem to the WWAN processing subsystem:
   under control of the WWAN processing subsystem, under control of the application processing subsystem, or under a combination thereof.

3. The method of claim 1, wherein the WLAN packet information transferred from the WLAN processing subsystem to the WWAN processing subsystem comprises packet data convergence protocol (PDCP) information.

4. The method of claim 1, further comprising:
   deciphering the WLAN packets and the WWAN packets in the WWAN processing subsystem.

5. The method of claim 1, wherein the subset of data comprises WLAN packet metadata.

6. The method of claim 5, wherein the WLAN packet metadata comprises WLAN packet headers.

7. The method of claim 1, wherein the indication of the reordered WLAN packets and WWAN packets comprises ordered WLAN packet headers and WWAN packet headers and WWAN packets.

8. The method of claim 1, wherein the WLAN packet information is transferred from the WLAN processing subsystem to the WWAN processing subsystem in blocks of information corresponding to subsets of WLAN packets.

9. The method of claim 8, further comprising:
   signaling to the WLAN processing subsystem, after transferring a block of information to the WWAN processing subsystem, that memory of the WLAN processing subsystem used to store the block of information is available for reuse.

10. The method of claim 8, further comprising:
    deciphering a transferred block of information in the WWAN processing subsystem; and
    signaling to the WLAN processing subsystem, after transferring the block of information to the WWAN processing subsystem, that memory of the WLAN processing subsystem used to store the block of information is available for reuse.

11. The method of claim 8, further comprising:
    receiving, from the application processing subsystem, a WLAN packet information block availability indicator.

12. The method of claim 1, further comprising:
    identifying a gap between a highest sequence number of a received WWAN packet and a lowest sequence number reference in the transferred WLAN packet information; and
    regulating transfer of additional WLAN packet information from the WLAN processing subsystem to the WWAN processing subsystem based at least in part on the identified gap.

13. The method of claim 1, further comprising:
    receiving the WLAN packets at the WLAN processing subsystem; and
    associating the WLAN packets with time-stamps of receipt at the WLAN processing subsystem,
    wherein the transferred WLAN packet information comprises the time-stamps of receipt at the WLAN processing subsystem.

14. The method of claim 13, further comprising:
    starting a reordering timer, at the WWAN processing subsystem, based at least in part on a gap in time-stamps included in the transferred WLAN packet information.

15. The method of claim 1, further comprising at least one of:
    storing the WLAN packet information in a main memory of the WWAN processing subsystem while performing the reordering; caching the WLAN packet information in a cache memory of the WWAN processing subsystem while performing the reordering; buffering the WLAN packet information in the WWAN processing subsystem while performing the reordering; or a combination thereof.

16. The method of claim 1, wherein the indication of the reordered WLAN packets and WWAN packets comprises a block of in-order packet identifiers.

17. The method of claim 1, further comprising:
    signaling to the WLAN processing subsystem that memory of the WLAN processing subsystem used to store WLAN packet information corresponding to multiple WLAN packets is available for reuse, the signaling including at least one of: indicating a block of multiple WLAN packet identifiers or indicating a block of multiple memory locations.

18. The method of claim 1, wherein the WWAN processing subsystem comprises a WWAN modem.

19. The method of claim 1, wherein the application processing subsystem provides at least a part of the WLAN processing subsystem.

20. An apparatus for wireless communication at a wireless communication device, comprising:
means for receiving wireless wide area network (WWAN) packets at a WWAN processing subsystem of the wireless communication device;
means for transferring wireless local area network (WLAN) packet information from a WLAN processing subsystem of the wireless communication device to the WWAN processing subsystem, the WLAN packet information comprising a subset of data associated with WLAN packets;
means for performing a reordering process in the WWAN processing subsystem, the reordering process based at least in part on the received WWAN packets and the WLAN packets that correspond to the transferred WLAN packet information; and
means for providing an indication of the reordered WWAN packets and the WLAN packets to an application processing subsystem of the wireless communication device.

21. An apparatus for wireless communication at a wireless communication device, comprising:
a processor; and
memory in electronic communication with the processor; the processor and the memory configured to:
receive wireless wide area network (WWAN) packets at a WWAN processing subsystem of the wireless communication device;
transfer wireless local area network (WLAN) packet information from a WLAN processing subsystem of the wireless communication device to the WWAN processing subsystem, the WLAN packet information comprising a subset of data associated with WLAN packets;
perform a reordering process in the WWAN processing subsystem, the reordering process based at least in part on the received WWAN packets and the WLAN packets that correspond to the transferred WLAN packet information; and
provide an indication of the reordered WWAN packets and the WLAN packets to an application processing subsystem of the wireless communication device.

22. The apparatus of claim 21, wherein the WLAN packet information is transferred from the WLAN processing subsystem to the WWAN processing subsystem:
under control of the WWAN processing subsystem, under control of the application processing subsystem, or under a combination thereof.

23. The apparatus of claim 21, wherein the WLAN packet information transferred from the WLAN processing subsystem to the WWAN processing subsystem comprises packet data convergence protocol (PDCP) information.

24. The apparatus of claim 21, the processor and the memory further configured to:
decipher the WLAN packets and the WWAN packets in the WWAN processing subsystem.

25. The apparatus of claim 21, wherein the subset of data comprises WLAN packet metadata.

26. The apparatus of claim 25, wherein the WLAN packet metadata comprises WLAN packet headers.

27. The apparatus of claim 21, wherein the indication of the reordered WLAN packets and WWAN packets comprises ordered WLAN packet headers and WWAN packet headers and WWAN packets.

28. The apparatus of claim 21, wherein the WLAN packet information is transferred from the WLAN processing subsystem to the WWAN processing subsystem in blocks of information corresponding to subsets of WLAN packets.

29. The apparatus of claim 21, the processor and the memory further configured to:
identify a gap between a highest sequence number of a received WWAN packet and a lowest sequence number reference in the transferred WLAN packet information; and
regulate transfer of additional WLAN packet information from the WLAN processing subsystem to the WWAN processing subsystem based at least in part on the identified gap.

30. A non-transitory computer-readable medium storing computer-executable code for wireless communication at a wireless communication device, the code executable by a processor to:
receive wireless wide area network (WWAN) packets at a WWAN processing subsystem of the wireless communication device;
transfer wireless local area network (WLAN) packet information from a WLAN processing subsystem of the wireless communication device to the WWAN processing subsystem, the WLAN packet information comprising a subset of data associated with WLAN packets;
perform a reordering process in the WWAN processing subsystem, the reordering process based at least in part on the received WWAN packets and the WLAN packets that correspond to the transferred WLAN packet information; and
provide an indication of the reordered WWAN packets and the WLAN packets to an application processing subsystem of the wireless communication device.

* * * * *